US011760463B2

(12) United States Patent
Behzadpour et al.

(10) Patent No.: US 11,760,463 B2
(45) Date of Patent: Sep. 19, 2023

(54) STRUCTURE HAVING NET-AREA-TENSION JOINT

(71) Applicant: The Boeing Company, Chicago, IL (US)

(72) Inventors: Forouzan Behzadpour, Woodinville, WA (US); Patrick B. Stickler, Everett, WA (US)

(73) Assignee: The Boeing Company, Arlington, VA (US)

( * ) Notice: Subject to any disclaimer, the term of this patent is extended or adjusted under 35 U.S.C. 154(b) by 76 days.

(21) Appl. No.: 17/376,134

(22) Filed: Jul. 14, 2021

(65) Prior Publication Data

US 2022/0033055 A1    Feb. 3, 2022

Related U.S. Application Data

(60) Provisional application No. 63/057,948, filed on Jul. 29, 2020.

(51) Int. Cl.
*B64C 1/26* (2006.01)
*B64C 1/12* (2006.01)

(52) U.S. Cl.
CPC . *B64C 1/26* (2013.01); *B64C 1/12* (2013.01)

(58) Field of Classification Search
CPC .. B64C 1/12; B64C 1/26; B64C 1/069; B64C 3/26; F16B 5/02; F16B 2200/506
USPC ...... 244/129.1, 131, 132; 248/230.1, 240.42, 248/240.43
See application file for complete search history.

(56) References Cited

U.S. PATENT DOCUMENTS

| | | | | |
|---|---|---|---|---|
| 2,329,366 | A | * | 9/1943 | Weill ........................ B64C 1/12 428/192 |
| 4,606,961 | A | | 8/1986 | Munsen |
| 5,297,760 | A | * | 3/1994 | Hart-Smith ............... B64C 1/12 403/41 |

(Continued)

FOREIGN PATENT DOCUMENTS

| | | |
|---|---|---|
| EP | 1288124 | 3/2005 |
| EP | 2300315 B1 * | 10/2013 ........... B64C 1/1446 |

OTHER PUBLICATIONS

Richard T Barrett, Fastener Design Manual, Mar. 1990, NASA. (Year: 1990).*

(Continued)

*Primary Examiner* — Joshua J Michener
*Assistant Examiner* — Ryan Andrew Yankey

(57) ABSTRACT

A structure has a net-area-tension fastener pattern formed in the skin panel for receiving fasteners defining a net-area-tension joint for coupling a component attach fitting of a component to the skin panel. The net-area-tension fastener pattern includes two or more rows of fastener holes, including a first row and a last row. Each row is oriented generally perpendicular to a primary load direction of a load that the component is capable of exerting on the skin panel. The first row is located upstream of the last row relative to the primary load direction. The fastener holes in the first row and the last row are respectively the smallest and the largest in the net-area-tension fastener pattern. The rows are spaced apart at a spacing ratio of hole spacing to hole diameter. The spacing ratio of the first row is greater than the spacing ratio of the last row.

20 Claims, 31 Drawing Sheets

(56) References Cited

U.S. PATENT DOCUMENTS

| | | | |
|---|---|---|---|
| 5,518,208 A * | 5/1996 | Roseburg | B64C 1/064 |
| | | | 244/119 |
| 2003/0222170 A1 | 12/2003 | Wojciechowski | |
| 2011/0139932 A1 | 6/2011 | Matheson | |
| 2011/0215202 A1 * | 9/2011 | Rhoden | B64C 3/185 |
| | | | 244/131 |
| 2012/0052247 A1 | 3/2012 | Pook | |
| 2013/0099058 A1 | 4/2013 | Payne | |
| 2015/0014484 A1 * | 1/2015 | Zeon | B64C 1/26 |
| | | | 244/131 |
| 2019/0308716 A1 * | 10/2019 | Nordman | B64C 1/12 |

OTHER PUBLICATIONS

Michael Chun-Yung Niu, Composite Airframe Structures, Jan. 1992, Conmilit Press, 1st Edition, pp. 290-323. (Year: 1992).*

Surachate Chutima and Alvin P. Blackie, Effect of pitch distance, row spacing, end distance and bolt diameter on multi-fastened composite joints, 1995, Elsevier. (Year: 1995).*

Michael Chun-Yung Niu, Airframe Structural Design, Jan. 1999, Conmilit Press, 2nd Edition, pp. 207-243. (Year: 1999).*

Johan Ekh and Joakim Schoen, Finite element modeling and optimization of load transfer in multi-fastener joints using structural elements, Jan. 10, 2007, Elsevier. (Year: 2007).*

George Nadim Melhem, Aerospace Fasteners: Use in Structural Applications, 2018, Encyclopedia of Aluminum and Its Alloys (Year: 2018).*

Wikipedia, "Hardpoint," retreived on Jan. 29, 2020.

Chamis, "Simplified Composite Procedures for Designing Bolted Joints," NASA Technical Memorandum 100281; Prepared for thet 43rd Annual Conference of the Society of the Plastics Industry, Cincinnati, Ohio, Feb. 1-5, 1988.

Union College, "CE PD Composite Mechanically Fastened Joints," available at <http://rbb.union.edu/courses/FEReview/CE%20PD%20Composite%20Mechanically%20Fastened%20Joints.pdf>, retrieved on Jan. 15, 2020.

Maxpro Corporation, "Bolted Joint Design: The Difference Between Tension, Shear and Bending Joints," dated Apr. 25, 2018, available at <https://blog.maxprocorp.com/the-difference-between-tension-shear-and-bending-joints>.

* cited by examiner

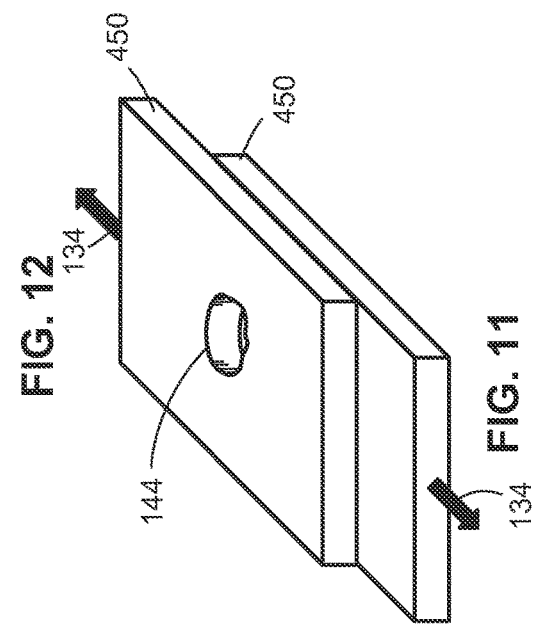
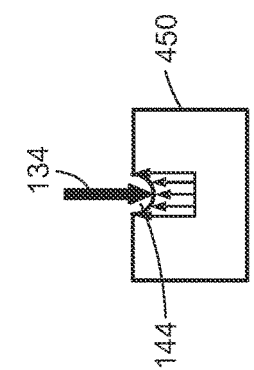
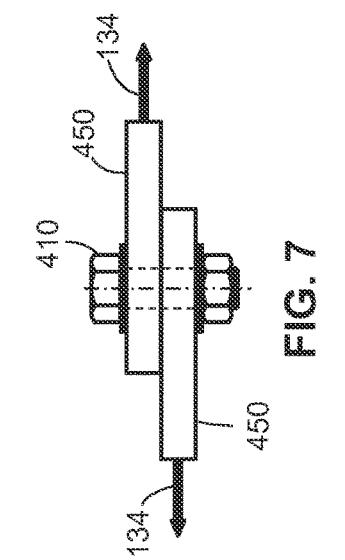
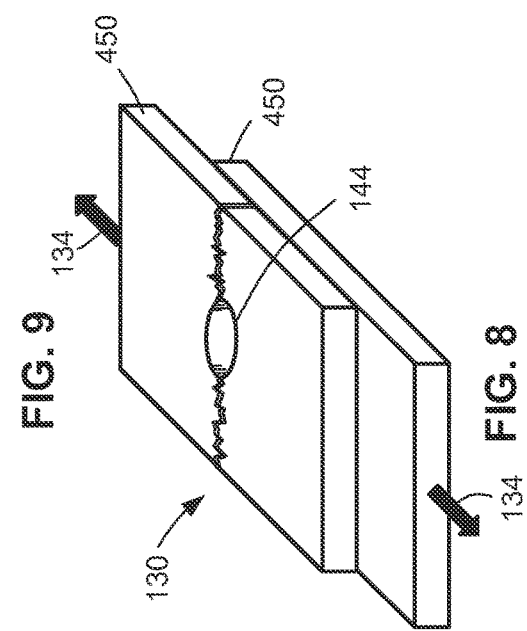
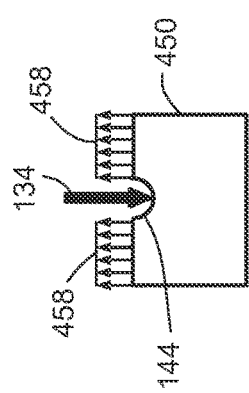

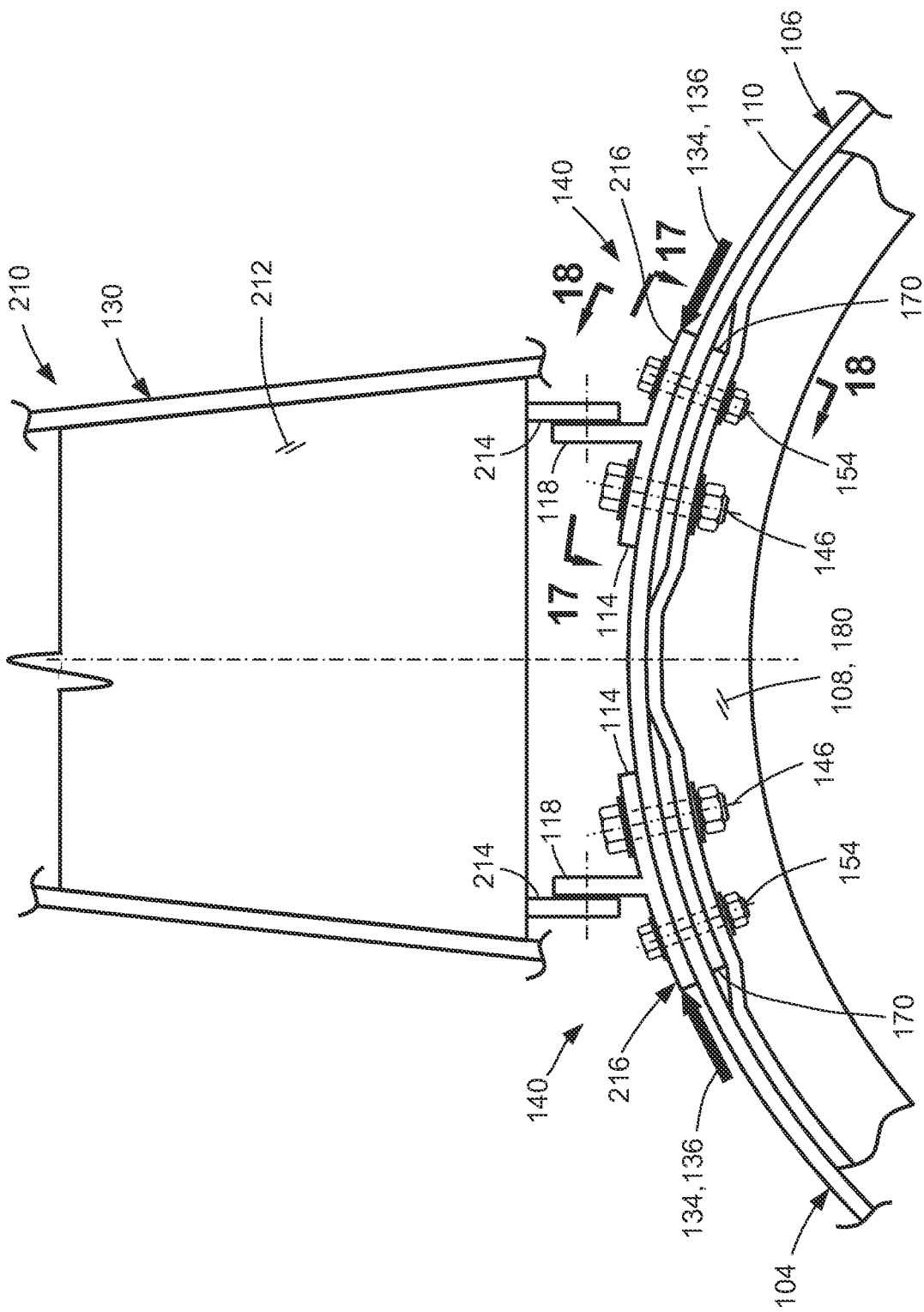

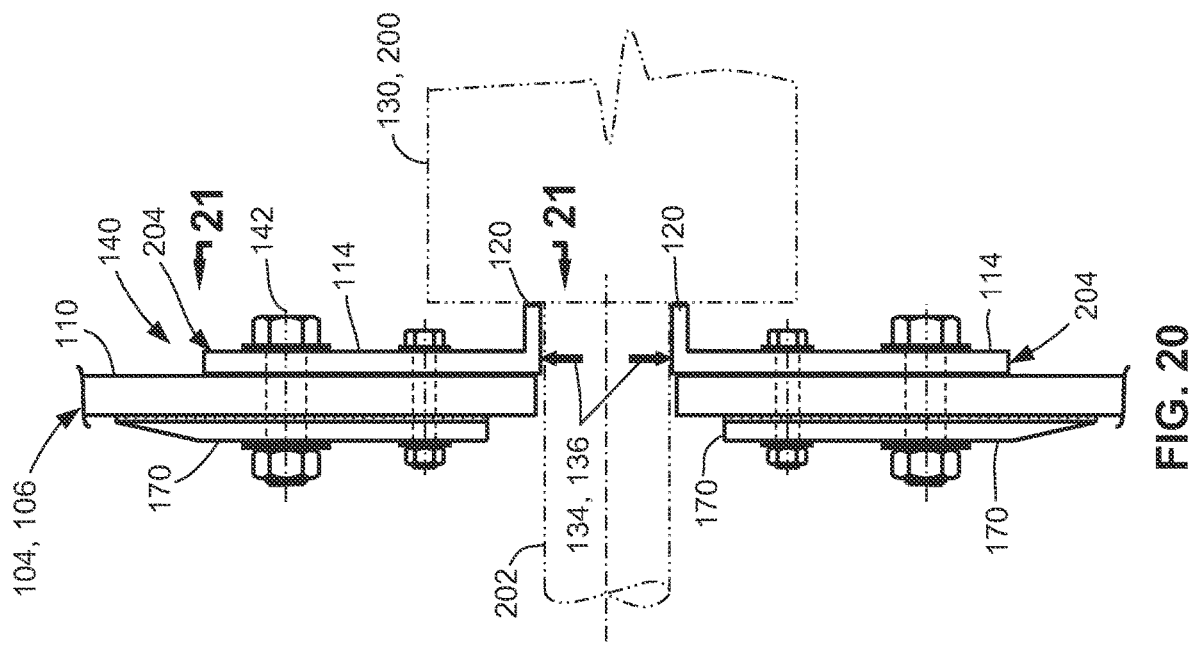
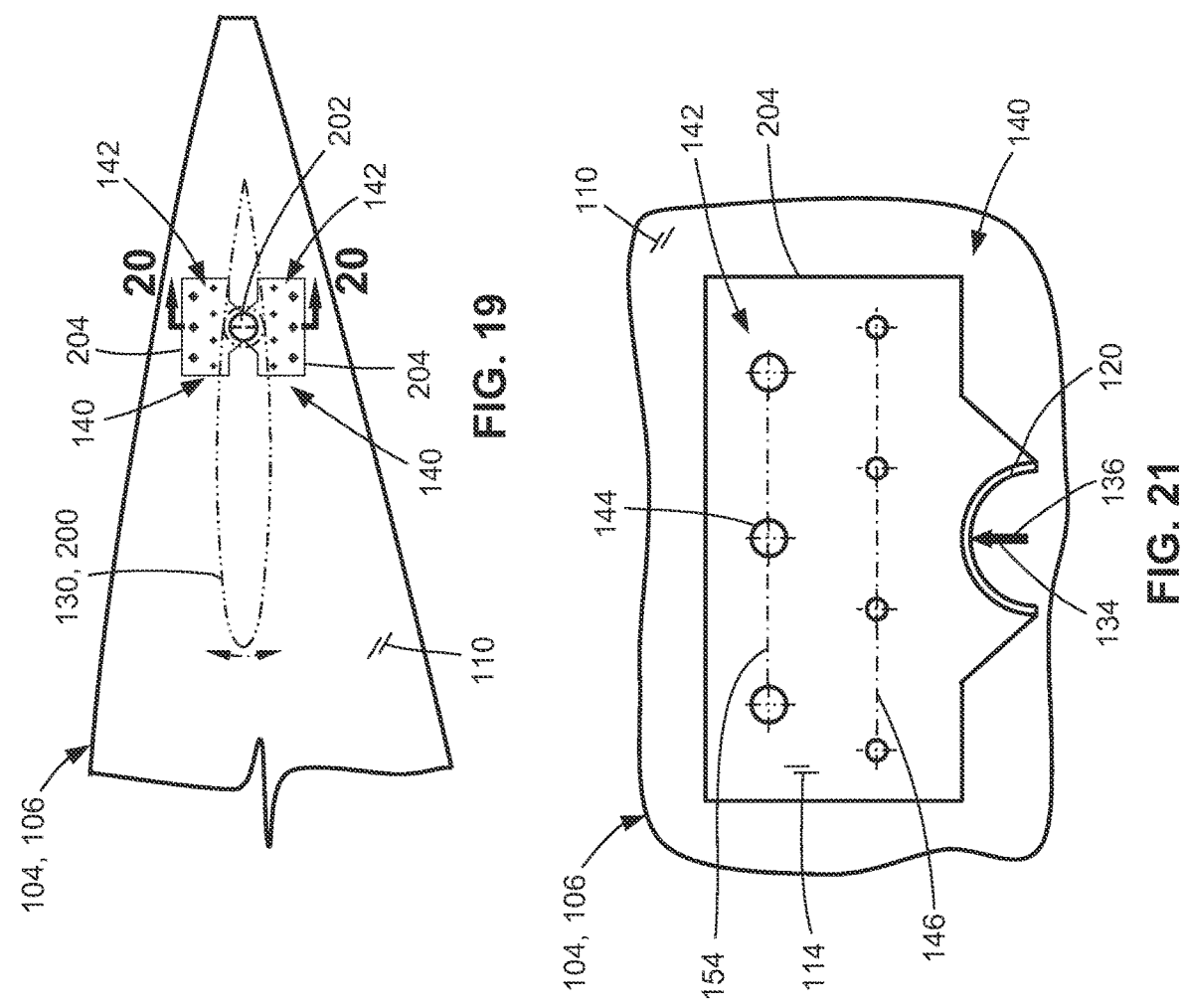

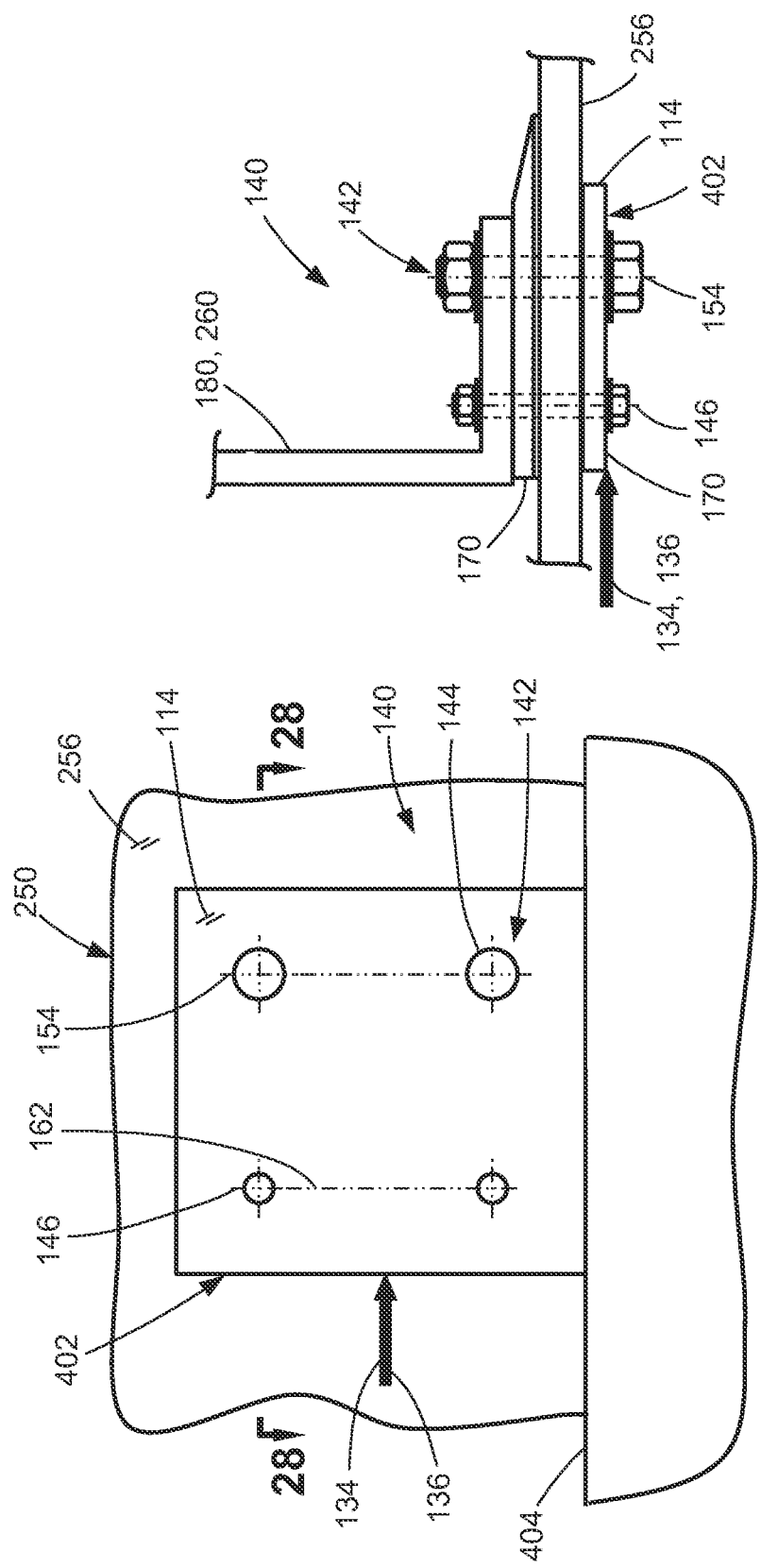

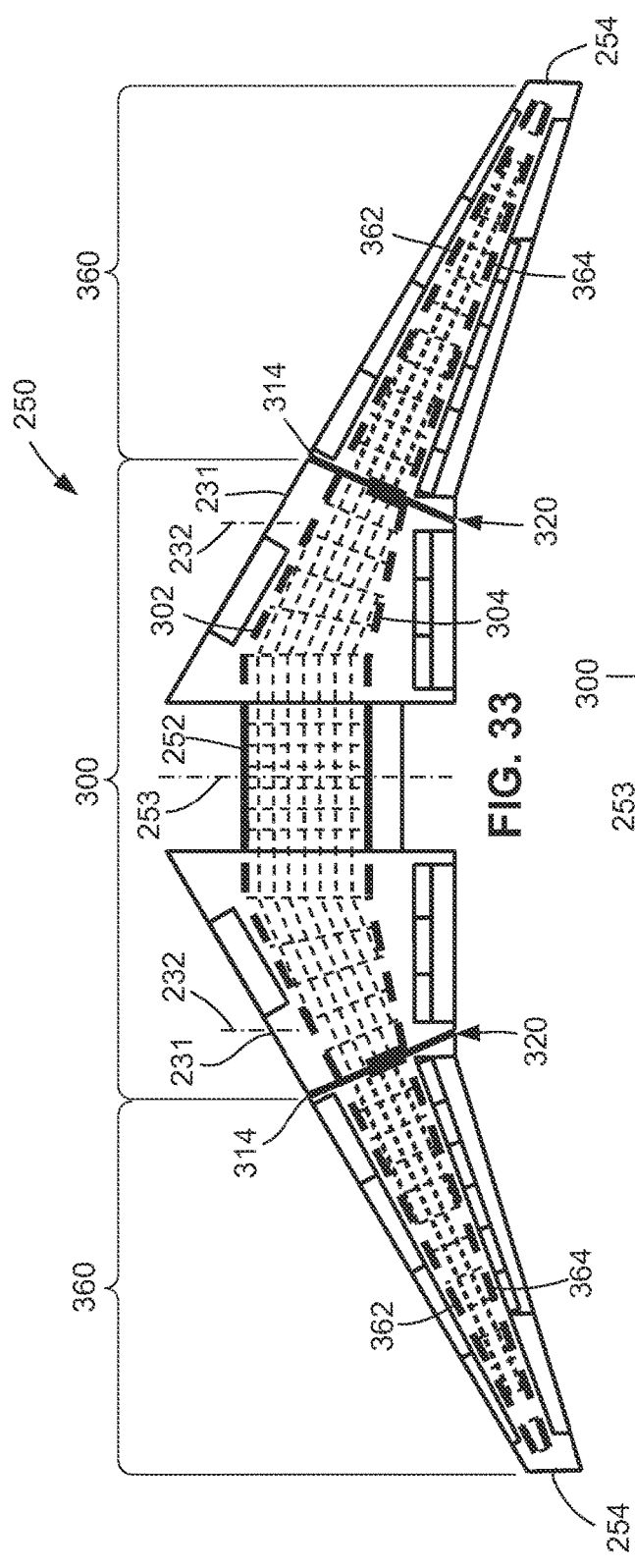

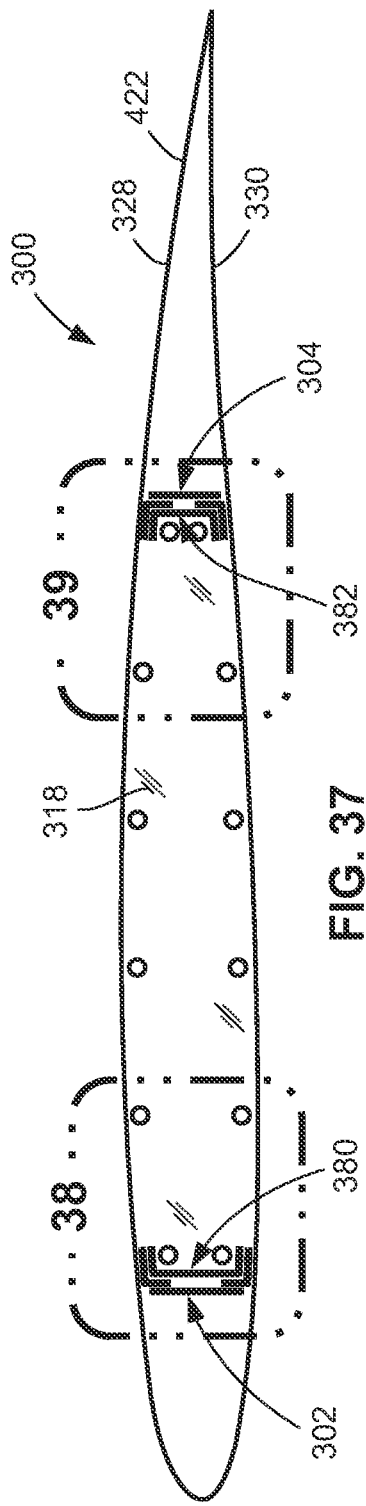
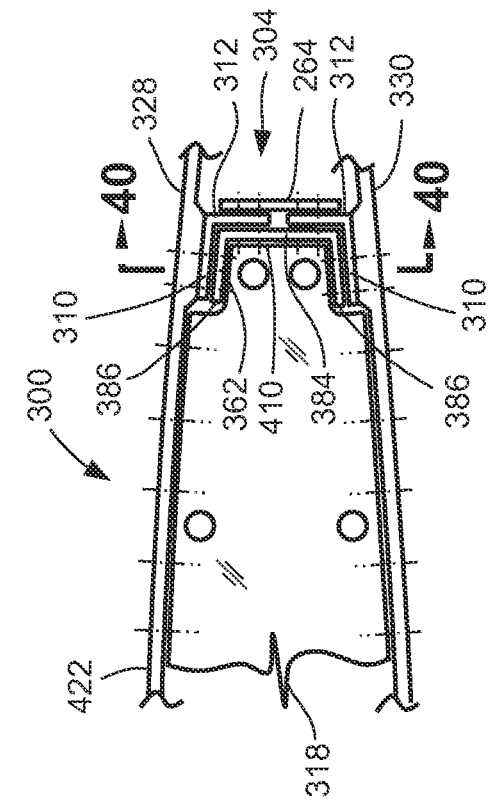
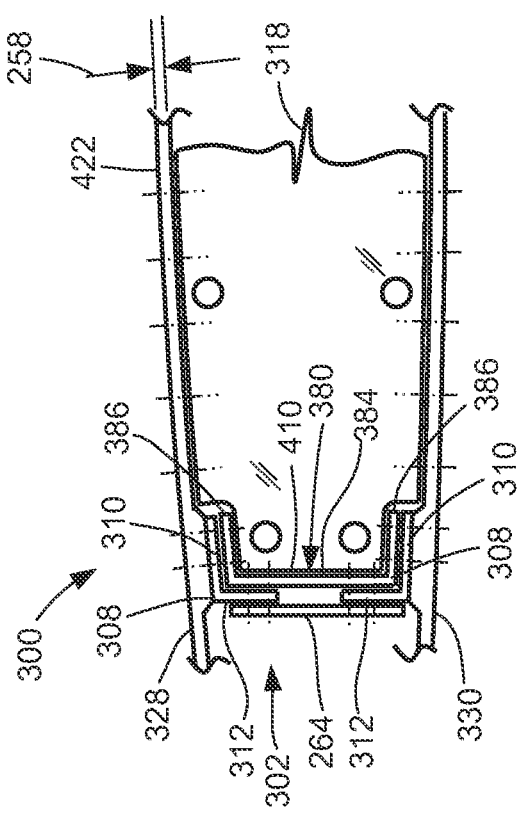
FIG. 37
FIG. 39
FIG. 38

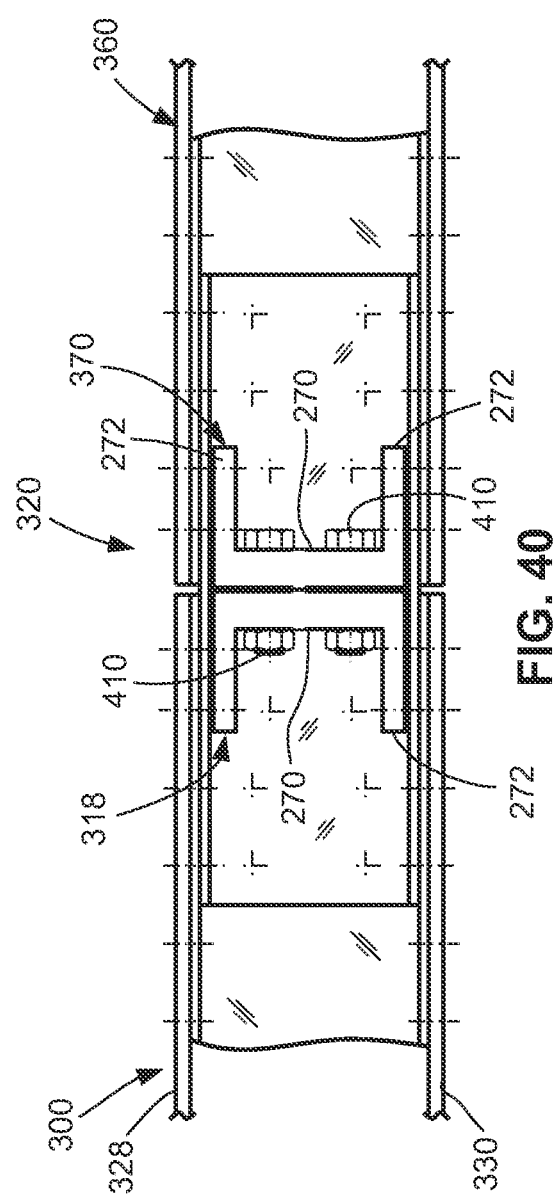

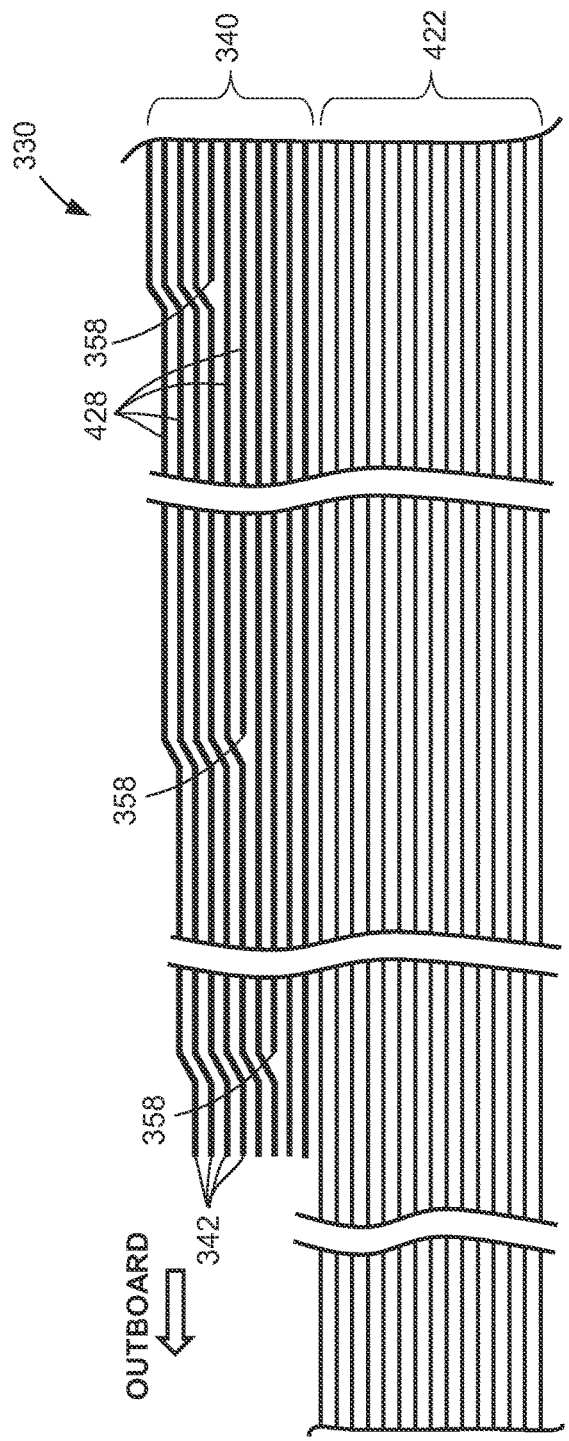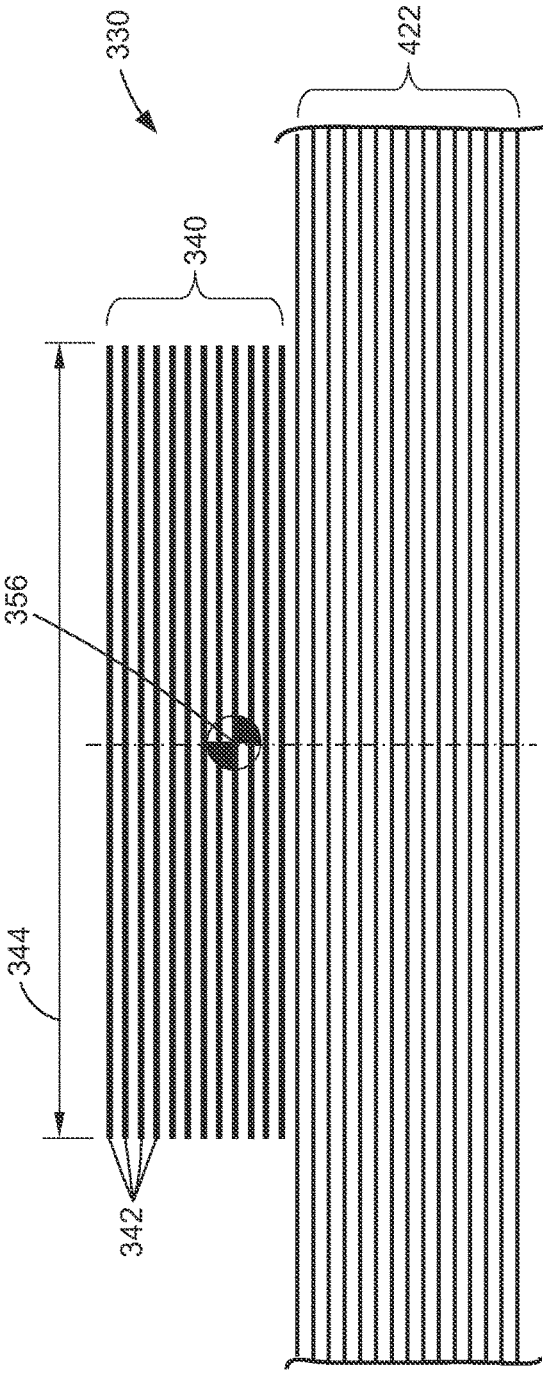
FIG. 44
FIG. 43

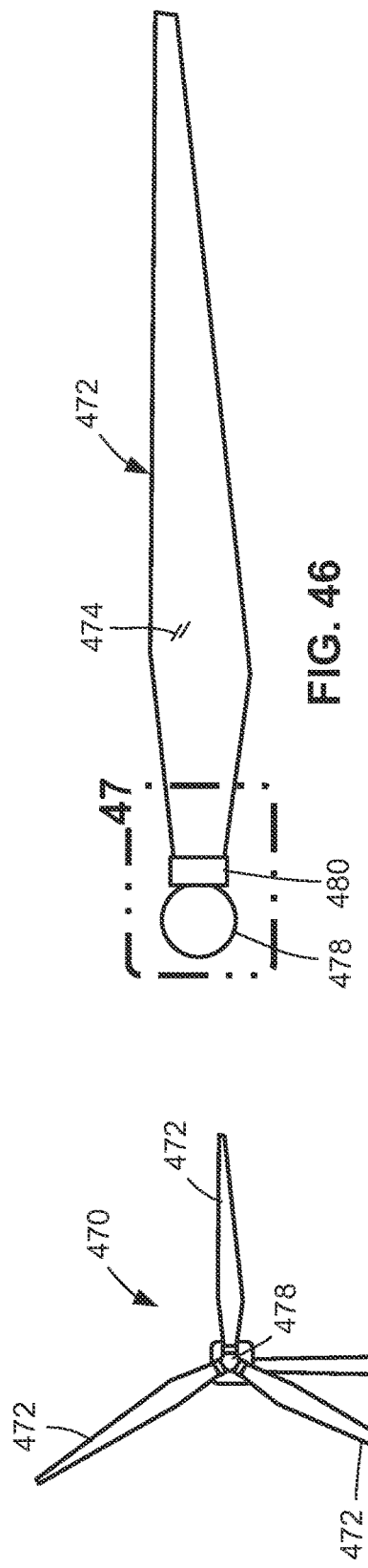
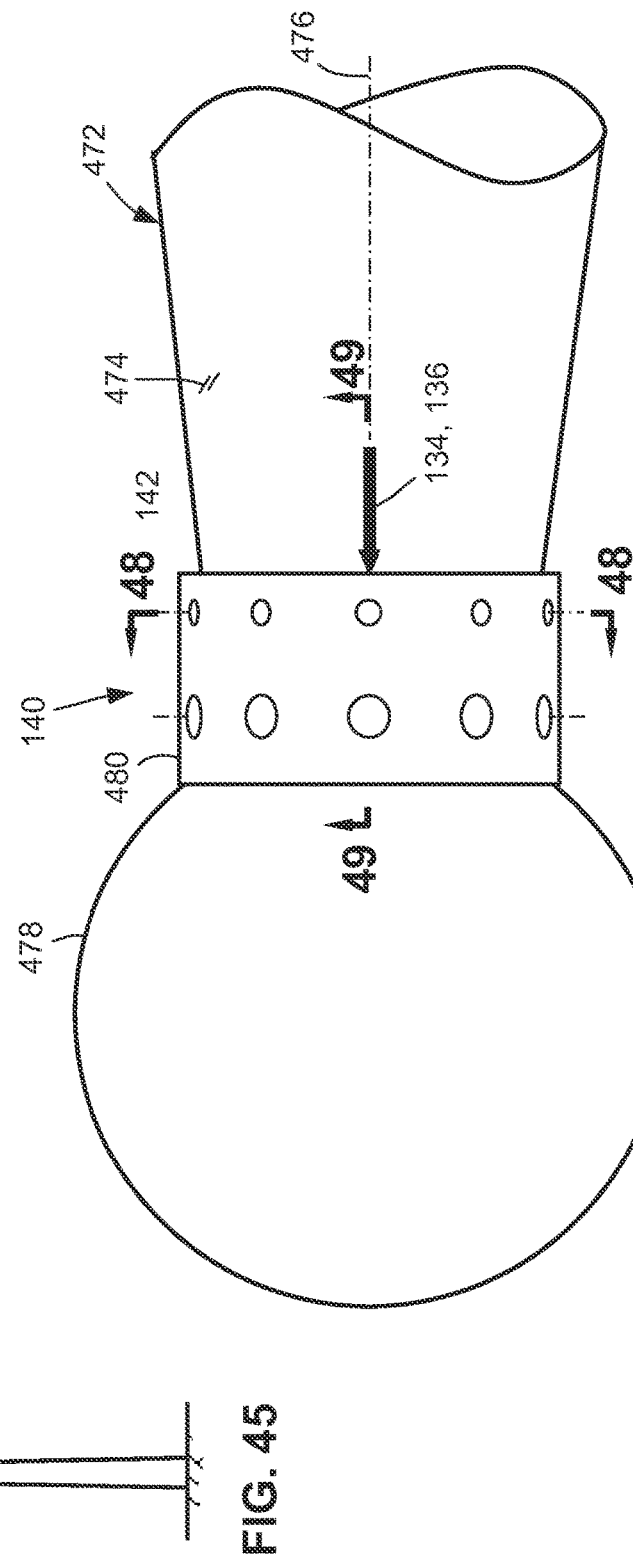

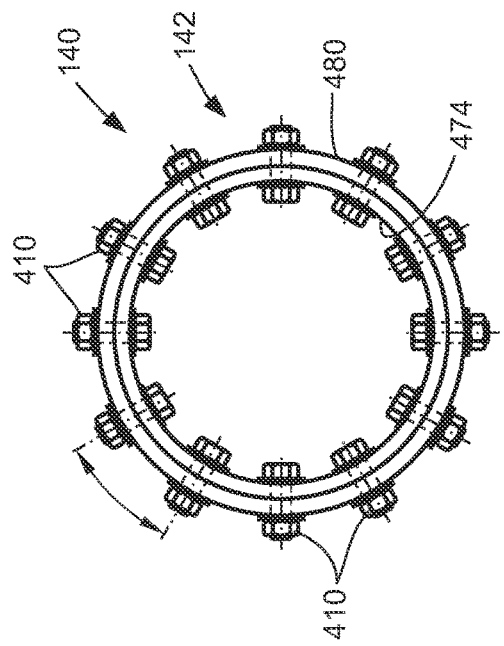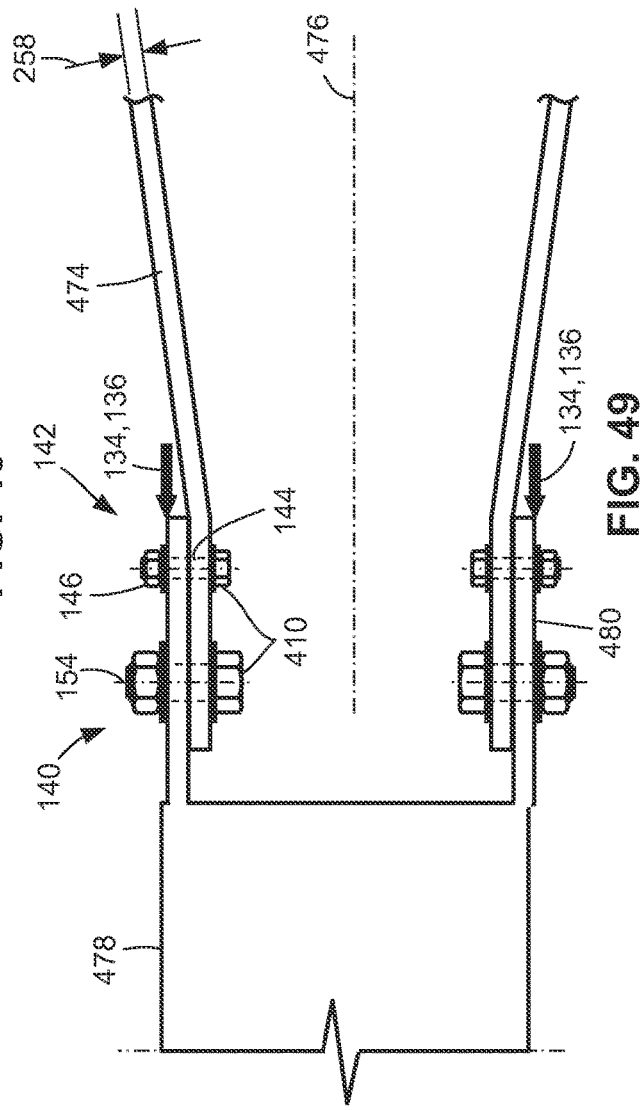

FORMING A NET-AREA-TENSION FASTENER PATTERN IN A SKIN PANEL, THE NET-AREA-TENSION FASTENER PATTERN CONFIGURED TO RECEIVE FASTENERS DEFINING A NET-AREA-TENSION JOINT COUPLING A COMPONENT ATTACH FITTING OF AN AIRCRAFT COMPONENT TO THE SKIN PANEL, THE NET-AREA-TENSION FASTENER PATTERN INCLUDING:

TWO OR MORE GENERALLY PARALLEL ROWS OF FASTENER HOLES, INCLUDING A FIRST ROW AND A LAST ROW, EACH ROW ORIENTED GENERALLY PERPENDICULAR TO A PRIMARY LOAD DIRECTION OF A LOAD THAT THE AIRCRAFT COMPONENT IS CAPABLE OF EXERTING ON THE SKIN PANEL VIA THE NET-AREA-TENSION FASTENER JOINT, THE FIRST ROW LOCATED UPSTREAM OF THE LAST ROW RELATIVE TO THE PRIMARY LOAD DIRECTION;

EACH ROW HAVING AT LEAST TWO FASTENER HOLES, THE DIAMETER OF THE FASTENER HOLES IN THE FIRST ROW AND THE LAST ROW BEING RESPECTIVELY THE SMALLEST AND THE LARGEST IN THE NET-AREA-TENSION FASTENER PATTERN, THE DIAMETER OF THE FASTENER HOLES IN SUBSEQUENT ROWS INCREMENTALLY INCREASING IN SIZE ALONG THE PRIMARY LOAD DIRECTION; AND

THE FASTENER HOLES IN EACH OF THE ROWS BEING SPACED APART AT A SPACING RATIO OF HOLE SPACING TO HOLE DIAMETER, THE SPACING RATIO OF THE FIRST ROW BEING GREATER THAN THE SPACING RATIO OF THE LAST ROW

FIG. 50

STRUCTURE HAVING NET-AREA-TENSION JOINT

CROSS-REFERENCE TO RELATED APPLICATIONS

The application claims priority to U.S. Provisional Application Ser. No. 63/057,948, filed Jul. 29, 2020, which is incorporated herein by reference in its entirety.

FIELD

The present disclosure relates generally to structural joints and, more particularly, to a structure, such as an aircraft structure, having one or more net-area-tension joints for attaching a component, such as an aircraft component, to the structure.

BACKGROUND

In aircraft manufacturing, a structural joint for joining two or more components may include a plurality of mechanical fasteners installed in fastener holes formed in the components. The load path for transferring load between the components is through the shanks of the mechanical fasteners, which prevent lateral movement of the components relative to each other. Examples of mechanical fasteners may include rods, pins, and bolts. Conventionally, structural joints in aircraft are configured as bearing critical joints in which the shanks of the mechanical fasteners bear against the sides of the fastener holes.

In a bearing critical joint for joining two composite laminates of a composite assembly, the strength capability of the structural joint may be primarily a function of the bearing capability of the fastener holes in the composite laminates. Composite laminates in general have a relatively low compressive load-carrying capability. As a result, the failure mode for a bearing critical joint of composite laminates is deformation or local crushing of the inside surface of each fastener hole. Local crushing may occur progressively as the shanks of the fasteners apply bearing pressure to the inside surface of the fastener holes.

One method for increasing the load-carrying capability of bearing critical joints is to reduce the bearing stress at each fastener hole by increasing the bearing area defined by the inside surface of the holes. Increasing the bearing area may be achieved by increasing the size (e.g., diameter) of the mechanical fasteners and/or by increasing the thickness of each composite laminate at the location of the fasteners holes. Increasing the size of the mechanical fasteners increases the structural mass of the joint, which is undesirable in weight-sensitive applications such as aircraft. Increasing the local thickness of each composite laminate also increases the structural mass, and additionally presents manufacturing and assembly challenges as a result of laminate warpage and interlaminar stresses that develop during the process of curing thick composite laminates.

A further drawback associated with bearing critical joints in composite assemblies is that fastener holes loaded in compression exhibit non-linear behavior as a result of the local crushing (i.e., bearing failure) that occurs on the sides of the fastener holes when subjected to bearing loads. The behavior is non-linear in the sense that, during application of the load in which the load magnitude increases at a linear rate, the deformation (e.g., local crushing of the fastener holes) of the composite laminate occurs at a non-linear rate. Such non-linear behavior represents uncertainty in the load-carrying response of the composite laminate, which necessitates the use of higher factors of safety in the strength analysis and sizing of the structural components (e.g., composite laminates, fasteners) that make up bearing critical joints. Higher safety factors undesirably result in increased structural mass of the aircraft structure.

As can be seen, there exists a need in the art for a structural joint for composite assemblies that avoids the above-mentioned challenges associated with bearing critical joints.

SUMMARY

The above-noted needs associated with structural joints in aircraft are specifically addressed by the present disclosure which provides an aircraft structure having a skin panel and a net-area-tension fastener pattern formed in the skin panel. The net-area-tension fastener pattern is configured to receive fasteners defining a net-area-tension joint for coupling a component attach fitting of an aircraft component to the skin panel. The net-area-tension fastener pattern includes two or more generally parallel rows of fastener holes, including a first row and a last row. Each row is oriented generally perpendicular to a primary load direction of a load that the aircraft component is capable of exerting on the skin panel via the net-area-tension joint. The first row is located upstream of the last row relative to the primary load direction. Each row has at least two fastener holes. The diameter of the fastener holes in the first row and the last row are respectively the smallest and the largest in the net-area-tension fastener pattern. The fastener holes in each row are spaced apart at a spacing ratio of hole spacing to hole diameter. The spacing ratio of the first row is greater than the spacing ratio of the last row.

Also disclosed is a structure having a skin panel, and a net-area-tension fastener pattern formed in the skin panel. The net-area-tension fastener pattern is configured to receive fasteners defining a net-area-tension joint for coupling a component attach fitting of a component to the skin panel. The net-area-tension fastener pattern has two or more generally parallel rows of fastener holes, including a first row and a last row. Each row is oriented generally perpendicular to a primary load direction of a load that the component is capable of exerting on the skin panel via the net-area-tension joint. The first row is located upstream of the last row relative to the primary load direction. Each row has at least two fastener holes. The diameter of the fastener holes in the first row and the last row are respectively the smallest and the largest in the net-area-tension fastener pattern. The fastener holes in each row are spaced apart at a spacing ratio of hole spacing to hole diameter. The spacing ratio of the first row is greater than the spacing ratio of the last row.

Additionally, disclosed is a method of manufacturing an aircraft structure of an aircraft. The method includes forming a net-area-tension fastener pattern, as described above, in a skin panel. The net-area-tension fastener pattern is configured to receive fasteners defining a net-area-tension joint coupling a component attach fitting of an aircraft component to the skin panel.

Also disclosed is a method of transferring load into an aircraft structure of an aircraft. The method includes applying a load from an aircraft component onto a skin panel of the aircraft structure having the above-described net-area-tension fastener pattern of fastener holes formed in the skin panel and a component attach fitting of the aircraft component. In addition, the method includes transferring, via fasteners installed in the net-area-tension fastener pattern, the load into the skin panel along a primary load direction oriented locally parallel to the skin panel.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 7 is a side view of two specimen plates joined by a single fastener subjected to a shear load;

FIG. 8 is a perspective view of the specimen plates of FIG. 7 after removal of the fastener from the fastener hole, and illustrating failure of the top specimen plate as a result of tension stress;

FIG. 9 is a top view of the top specimen plate of FIG. 8 showing tension failure of the top specimen plate involving fracturing of the specimen plate cross-sectional areas on opposite sides of the fastener hole;

FIG. 10 is a schematic illustration of a portion of the top specimen plate of FIG. 8 showing the tension stress on opposite sides of the fastener hole;

FIG. 11 is a perspective view of the specimen plates of FIG. 7 after removal of the fastener from the fastener hole, and illustrating failure of the fastener hole in the top specimen plate as a result of bearing stress;

FIG. 12 is a top view of the top specimen plate of FIG. 11 showing bearing failure of the top specimen plate due to local crushing of one side of the fastener hole;

FIG. 13 is a schematic illustration of a portion of the top specimen plate of FIG. 11 showing bearing stress on one side of the fastener hole;

FIG. 16 is a sectional view of a portion of the fuselage and vertical stabilizer taken along line-16-16 of FIG. 14 and illustrating an example of a pair of vertical stabilizer attach fittings each incorporating a net-area-tensioner fastener pattern for joining the vertical stabilizer attach fittings to a fuselage skin panel and fuselage frame of the fuselage;

FIG. 19 is a side view of a portion of the aircraft taken along line 19-19 of FIG. 15 and illustrating an example of an opposing pair of horizontal stabilizer attach fittings each incorporating a net-area-tension fastener pattern for coupling the vertical stabilizer to the fuselage;

FIG. 20 is a sectional view of the aircraft taken along line 20-20 of FIG. 19 and illustrating the horizontal stabilizer attach fittings incorporating the net-area-tension fastener pattern for coupling the vertical stabilizer to the fuselage;

FIG. 21 is a side view of a portion of the fuselage taken along line 21-21 of FIG. 20 and illustrating one of the horizontal stabilizer attach fittings each incorporating the net-area-tension fastener pattern for joining the horizontal stabilizer to the fuselage;

FIG. 31 is a magnified view of the portion of the wing assembly identified by reference numeral 31 of FIG. 30 and illustrating an example of the store attach fitting incorporating the net-area-tension fastener pattern;

FIG. 32 is a sectional view of the wing assembly taken along line 32-32 of FIG. 31 and illustrating an example of the net-area-tension fastener pattern for coupling the store attach fitting to the wing assembly;

FIG. 33 is a plan view of an example of a wing assembly having a center wing structure and a pair of outer wing structures configured to be removably coupled to the center wing structure;

FIG. 34 is an exploded view of the wing assembly of FIG. 33 showing the outer wing structures separated from the center wing structure;

FIG. 37 is a sectional view of the center wing structure taken along line 41-41 of FIG. 35 and illustrating an example of a center wing stout rib configured to be fastened to an outer wing stout rib at a wing joint coupling the outer wing structure to the center wing structure;

FIG. 38 is a magnified view of the portion of the center wing stout rib identified by reference numeral 38 of FIG. 37 and illustrating an example of the center wing stout rib coupled to the center wing skin panels and the center wing front spar;

FIG. 39 is a magnified view of the portion of the center wing stout rib identified by reference numeral 39 of FIG. 37 and illustrating an example of the center wing stout rib coupled to the center wing skin panels and the center wing rear spar;

FIG. 40 is a sectional view taken along line 40-40 of FIG. 39 and illustrating an example of a rear spar splice plate coupling the outer wing rear spar to the center wing rear spar;

FIG. 43 is a magnified view of the portion of the center wing lower skin panel identified by reference numeral 43 of FIG. 42 and illustrating an example of a stack of plank plies of one of the planks bonded to the center wing lower skin panel;

FIG. 44 is a sectional view of the center wing lower skin panel taken along line 44-44 of FIG. 35 and illustrating an example of plank plies bonded to the constant-thickness acreage plies of the center wing lower skin panel;

FIG. 45 is an example of a wind turbine that may implement one or more net-area-tension joints;

FIG. 46 shows an example of one of the blades of the wind turbine of FIG. 45;

FIG. 47 is a magnified view of the portion of the blade identified by reference numeral 47 of FIG. 46, and illustrating an example of a net-area-tension fastener pattern extending circumferentially around a hub attach fitting of the blade hub for coupling the blade to the hub of the wind turbine;

FIG. 48 is a sectional view of the blade hub taken along lines 48-48 of FIG. 47 and illustrating the fastener holes of the net-area-tension fastener pattern extending through the hub attach fitting and into the blade skin panel;

FIG. 49 is a sectional view of the blade hub taken along lines 49-49 of FIG. 47 and illustrating fasteners installed in the net-area-tension fastener pattern for coupling the blade to the blade hub;

FIG. 50 is a flowchart of operations included in a method of manufacturing an aircraft structure;

DETAILED DESCRIPTION

Figure 1:
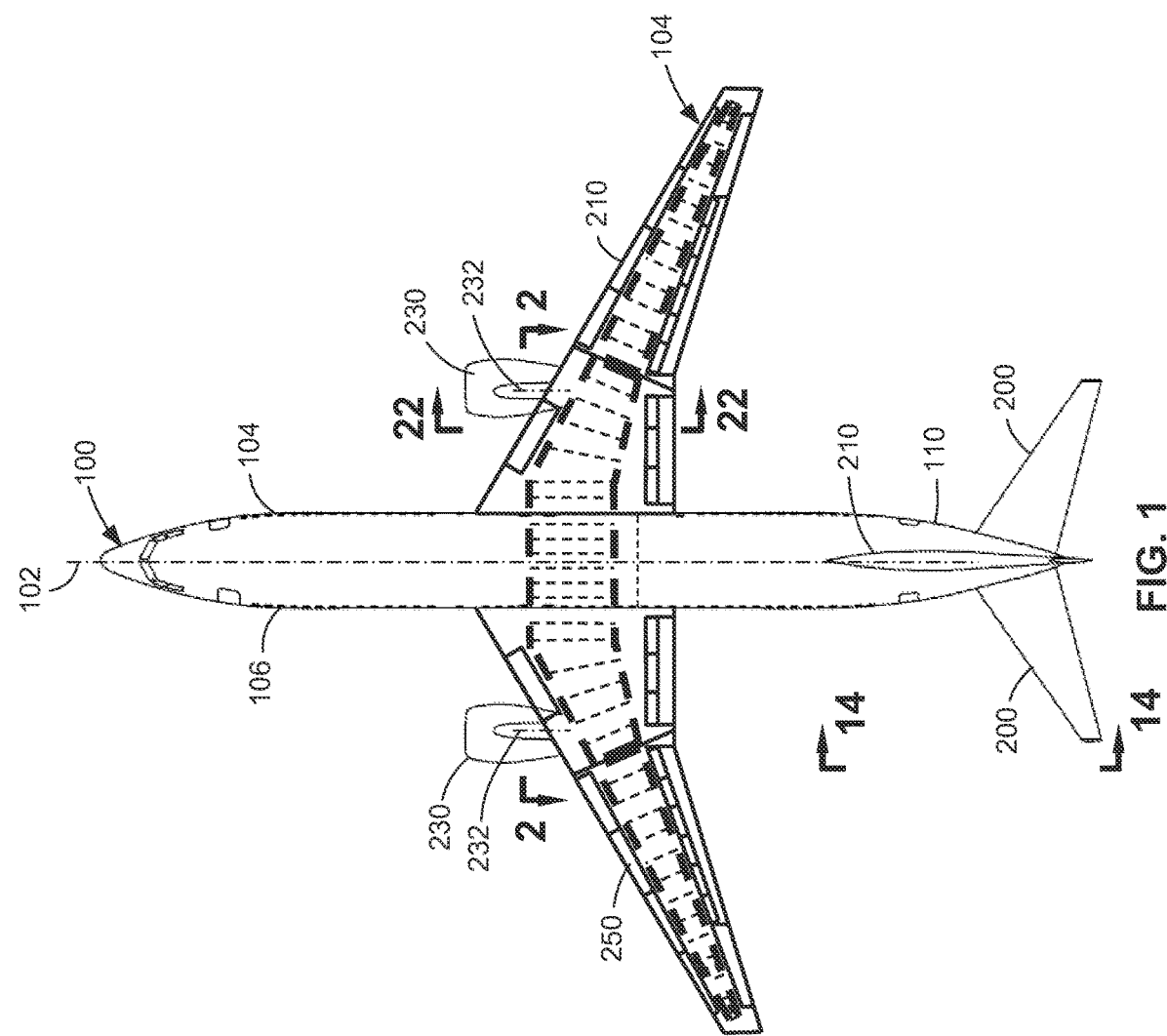
FIG. 1 is a top view of an example of an aircraft.

Referring now to the drawings which illustrate various examples of the disclosure, shown are examples of a structure 103 (e.g., FIG. 4) having a skin panel 105, and a net-area-tension fastener pattern 142 formed in the skin panel 105. The net-area-tension fastener pattern 142 is configured to receive fasteners 410 defining a net-area-tension joint 140 for coupling a component attach fitting of a component 128 to the skin panel 105. As described below, the net-area-tension fastener pattern 142 includes two or more generally parallel rows of fastener holes 144, including a first row 146 and a last row 154. Each row is oriented generally perpendicular to a primary load direction 136 of a load 134 that the component 128 is capable of exerting on the skin panel 105 via the net-area-tension joint 140. The first row 146 is located upstream of the last row 154 relative to the primary load direction 136. Each row has at least two fastener holes 144. The diameter of the fastener holes 144 in the first row 146 and the last row 154 are respectively the smallest and the largest in the net-area-tension fastener pattern 142. The fastener holes 144 in each row are spaced apart at a spacing ratio of hole spacing 156 to hole diameter 158. The spacing ratio of the first row 146 is greater than the spacing ratio of the last row 154. The presently-disclosed net-area-tension fastener pattern 142 may be implemented in any one of a variety of different types of structures 103 for coupling a component 128 to the structure 103.

Figure 2:
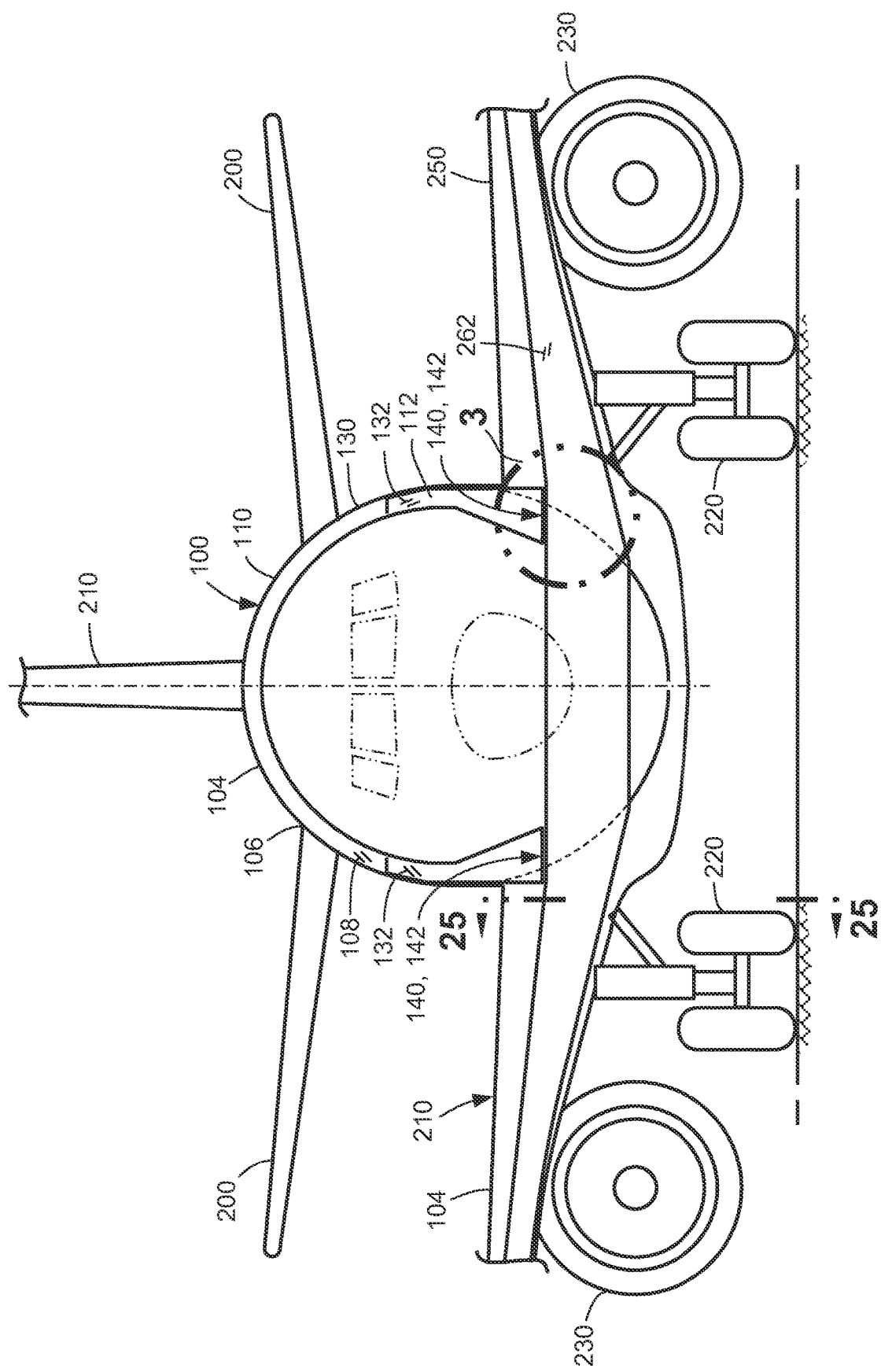
FIG. 2 is a transverse sectional view of the aircraft taken along line 2-2 of FIG. 1 and which may include one or more net-area-tension joints coupling an aircraft component (e.g., a fuselage) to an aircraft structure (e.g. a wing assembly)

For example, referring to FIGS. 1-2, shown is an aircraft 100 made up of a plurality of aircraft structures 104 formed of composite material. Such aircraft structures 104 may include a composite fuselage 106, a composite wing assembly 250, or other types of aircraft structures 104. Each aircraft structure 104 includes at least one net-area-tension fastener pattern 142 (FIG. 5) formed in a composite skin panel 105 (FIG. 5) of the aircraft structure 104. Each net-area-tension fastener pattern 142 is configured to receive fasteners 410 (FIG. 5) such as bolts, studs, pins or any other type of elongate member having a cylindrical shaft.

Figure 3:
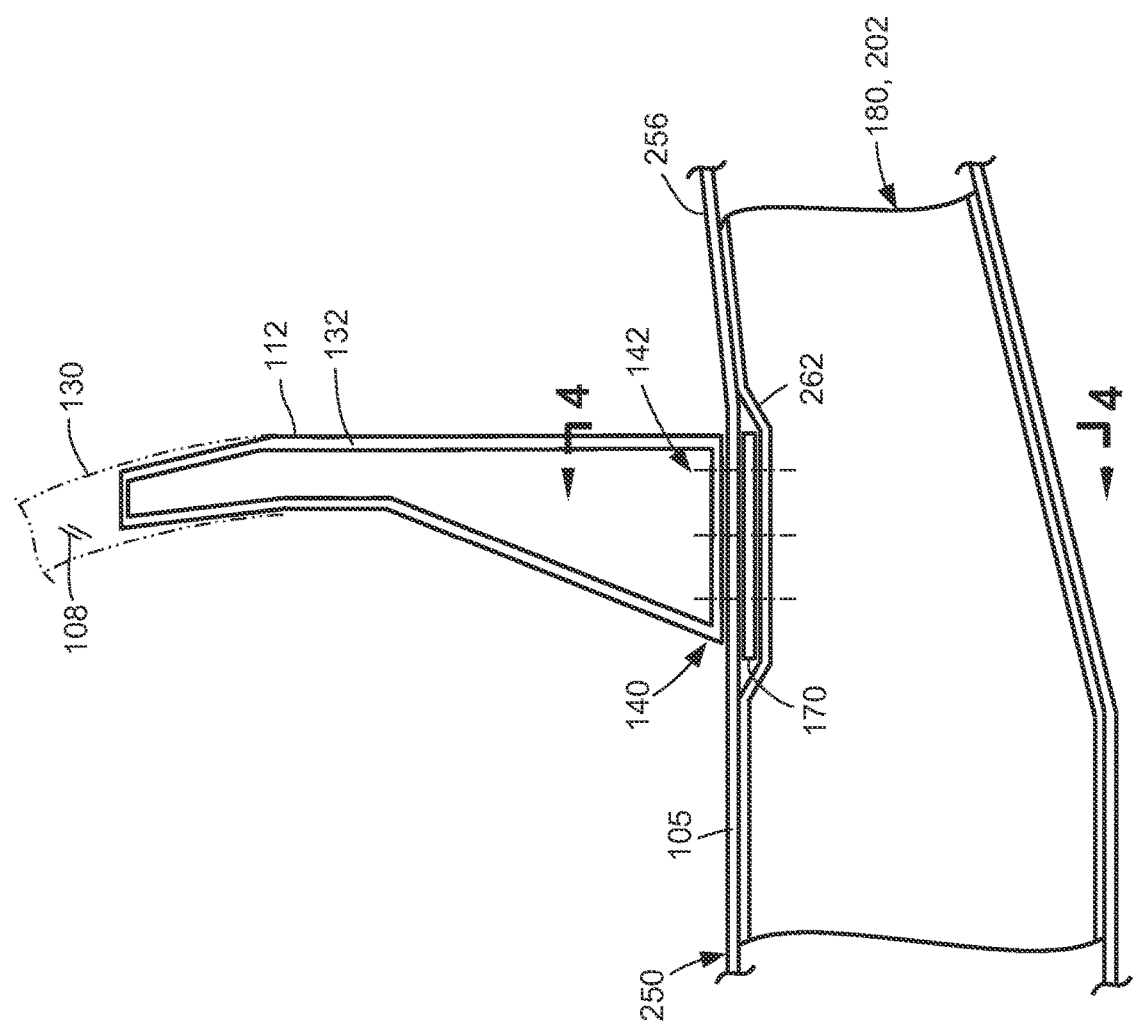
FIG. 3 is a magnified view of the portion of the aircraft identified by reference numeral 3 of FIG. 2 and illustrating an example of a net-area-tension joint coupling a fuselage attach fitting to a wing assembly skin panel and rear spar.

Referring to FIGS. 1-3, the fasteners 410 in the net-area-tension fastener pattern 142 define a net-area-tension joint 140 for coupling an aircraft component 130 (FIG. 4) to the aircraft structure 104. More specifically, each net-area-tension joint 140 couples a component attach fitting 132 of the aircraft component 130 to the skin panel 105 (FIG. 5) of the aircraft structure 104. The component attach fitting 132 may distribute the out-of-plane component (not shown) of the load into the aircraft structure 104, and may also efficiently transfer the in-plane component of the load 134 (FIG. 5) along a primary load direction 136 (e.g., FIG. 1) into the aircraft structure 104 via the net-area-tension fastener pattern 142.

Figure 4:
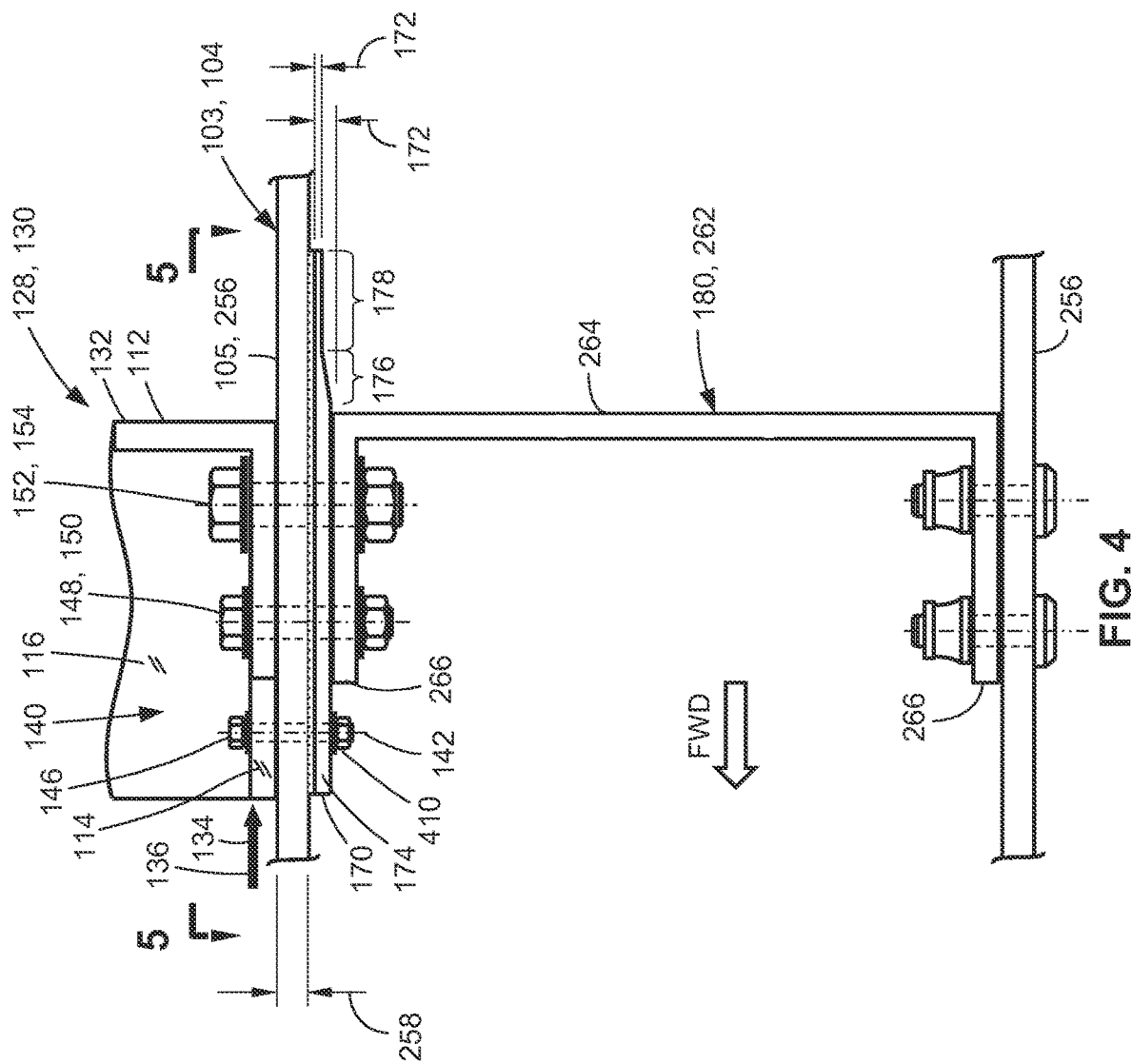
FIG. 4 is a sectional view taken along line 4-4 of FIG. 3 and illustrating the example of the net-area-tension joint coupling the fuselage attach fitting to the fuselage skin panel and rear spar.
Figure 5:
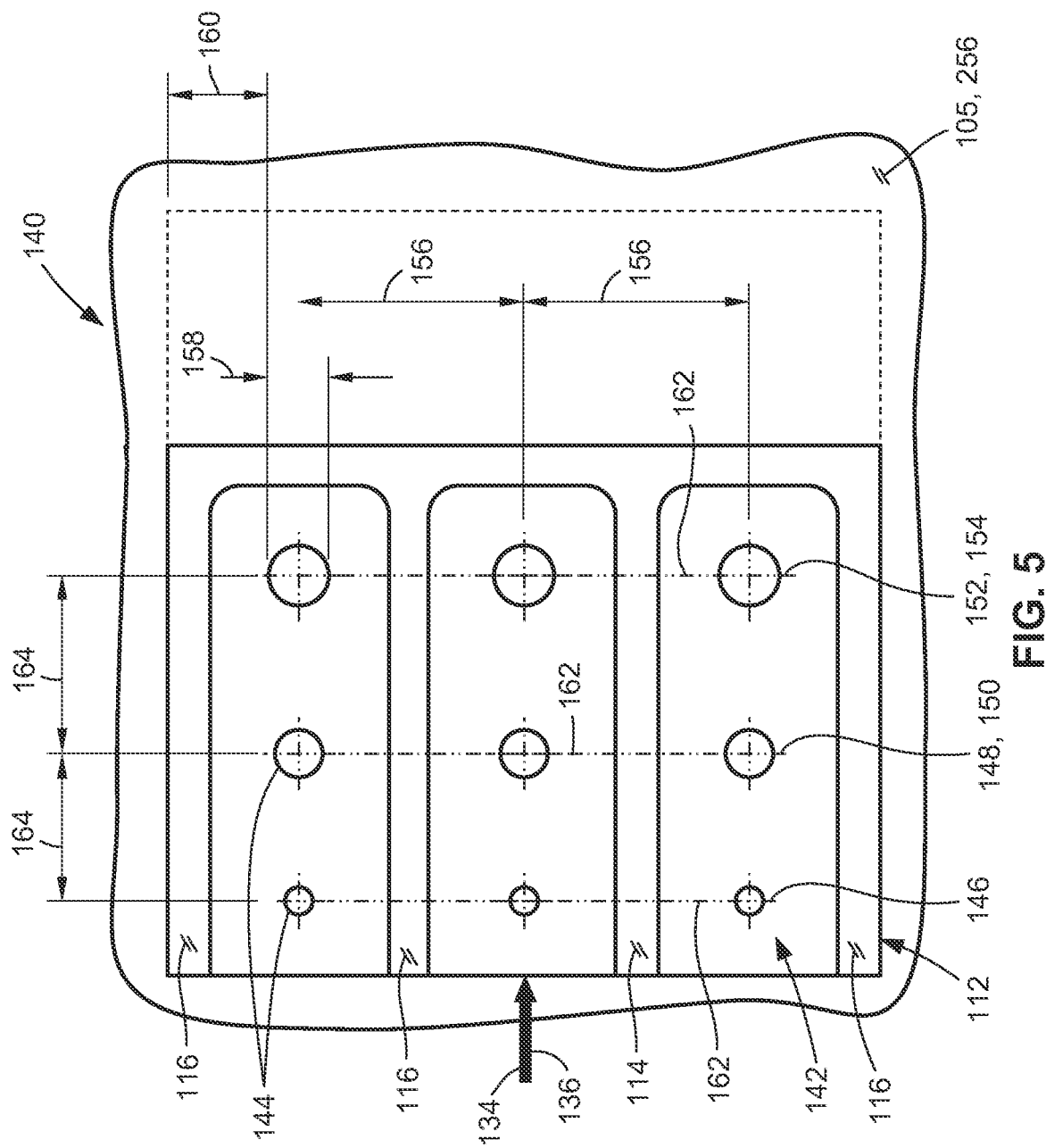
FIG. 5 is a top-down view of the net-area-tension joint taken along line 5-5 of FIG. 4 and illustrating a net-area-tension fastener pattern formed in the fuselage attach fitting and the wing assembly skin panel.

Referring to FIGS. 4-5, as described in greater detail below, the net-area-tension fastener pattern 142 of a net-area-tension joint 140 includes two or more generally parallel rows of fastener holes 144, including a first row 146 and a last row 154 (e.g., FIG. 5). Each row of fastener holes 144 is oriented generally perpendicular to the primary load direction 136 (FIG. 5) of a load 134 that the aircraft component 130 is capable of exerting on the skin panel 105 of the aircraft structure 104 via the net-area-tension joint 140. Each row of fastener holes 144 may be generally straight, and each row is generally perpendicular to the in-plane component of the load 134 which is oriented locally parallel to the plane of the skin panel 105 at the location of net-area-tension fastener pattern 142.

The first row 146 of fastener holes 144 is located upstream of the last row 154 relative to the primary load direction 136. Each row of the net-area-tension fastener pattern 142 has at least two fastener holes 144. The fastener holes 144 in each row may be of equal diameter or slightly different diameter. The diameter of the fastener holes 144 in the first row 146 and the last row 154 are respectively the smallest and the largest in the net-area-tension fastener pattern 142. The fastener holes 144 in each row are spaced apart at a spacing ratio of hole spacing 156 to hole diameter 158. The spacing ratio of the first row 146 is greater than the spacing ratio of the last row 154. As described in greater detail below, the arrangement of the net-area-tension fastener pattern 142 of a net-area-tension joint 140 is structurally more efficient than other types of joints, such as the above-mentioned bearing critical joint 454 described below and shown in FIGS. 11-13.

In some examples (e.g., FIGS. 5, 24, 27), a net-area-tension fastener pattern 142 may include at least one intermediate row 148 of fastener holes 144 located between the first row 146 and the last row 154. The diameter of the fastener holes 144 in the first row 146, intermediate row(s) 148, and last row 154 are of incrementally increasing size along the primary load direction 136. For example, the diameter of the fastener holes 144 in the first row 146 are the smallest, the diameter of the fastener holes 144 in the last row 154 are the largest, and the diameter of the fastener holes 144 in an intermediate row 148 are larger than the fastener holes 144 of the first row 146, and smaller than the fastener holes 144 of the last row 154, as described in greater detail below.

Figure 30:
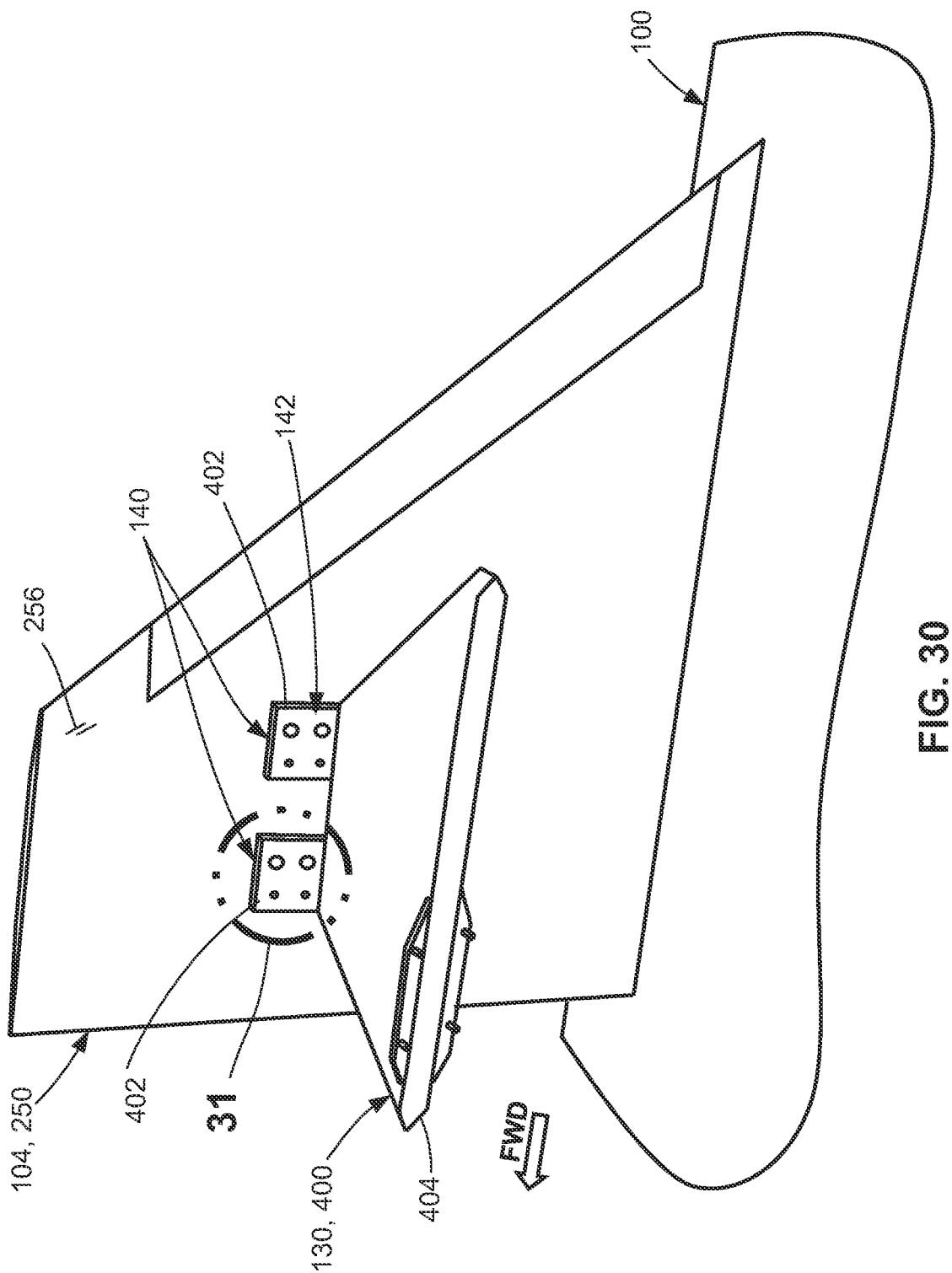
FIG. 30 is a perspective view of an underside of a portion of a wing assembly illustrating an example of a store pylon coupled to the wing assembly via one or more store attach fittings each incorporating a net-area-tension fastener pattern.

The presently-disclosed net-area-tension fastener pattern 142 may be implemented in any one of a variety of different types of aircraft structures 104. In one example, the aircraft structure 104 may be a fuselage 106 (FIGS. 1-2) having a fuselage skin panel 110 (FIGS. 1-2) having one or more net-area-tension fastener patterns 142 for receiving fasteners 410 for coupling one or more aircraft components 130 to the fuselage 106. Non-limiting examples of aircraft components 130 that may be attached to the fuselage 106 via one or more net-area-tension fastener patterns 142 include a vertical stabilizer 210 (FIGS. 1-2) and a horizontal stabilizer 200 (FIGS. 1-2). In another example, the aircraft structure 104 may be a wing assembly 250 (FIG. 3) having a wing assembly skin panel 256 (FIG. 3) having one or more net-area-tension fastener patterns 142 (FIG. 3) for receiving fasteners 410 (FIG. 4) for coupling one or more aircraft components 130 to the wing assembly 250. Examples of aircraft components 130 that may be attached to the wing assembly 250 via one or more net-area-tension fastener patterns 142 include a fuselage 106, a landing gear 220 (FIG. 2), an engine 230 (FIGS. 1-2), and a store mounting mechanism 400 (FIG. 30). As may be appreciated, the aircraft structure 104 may be provided in any one of a variety of configurations, and is not limited to a fuselage 106 or a wing assembly 250. Similarly, the types of aircraft components 130 that may be coupled to an aircraft structure 104 via net-area-tension fastener patterns 142 are not limited to the above-described aircraft components 130, and may include any one of a variety of alternative types of aircraft components 130.

As mentioned above, the aircraft structure 104 is formed of composite material. The composite material used in manufacturing the aircraft structure 104 may be in the form of composite plies 420 (e.g., FIG. 29) of fiber-reinforced polymer matrix material (e.g., carbon fiber-epoxy resin material). The composite plies 420 may be laid up in a stacked formation and cured to form a composite laminate in the form of a skin panel 105 (FIG. 3), a doubler 170 (e.g., FIGS. 4, 18, 20, 23). Each composite ply may have a thickness of 0.005 inch or more. The polymer matrix material of the composite plies 420 may be a thermosetting resin or a thermoplastic resin. The fibers of the composite plies 420 may be carbon fibers or the fibers may be formed of alternative materials such as glass, boron, aramid, ceramic or other non-metallic materials or metallic materials. Advantageously, aircraft structures 104 formed of composite material have improved corrosion resistance and improved fatigue strength relative to the corrosion resistance and fatigue strength of aircraft structures 104 formed of metallic materials (e.g., aluminum).

The composite plies 420 of an aircraft structure 104 may be unidirectional plies and/or fabric plies. For example, a fuselage skin panel 110 (FIG. 16) or a wing assembly skin panel 256 (FIG. 3) may be comprised primarily of unidirectional plies. Each unidirectional ply may contain a plurality of generally parallel fibers oriented in a single direction. The unidirectional plies of a skin panel may include 0-degree plies, +45-degree plies, −45-degree plies, and 90-degree plies, and/or other fiber orientations. In other examples, an aircraft structure 104 may be comprised primarily of fabric plies. For example, the fuselage frames 108 (FIG. 16) of the fuselage 106 (FIG. 16), and/or the front spars, rear spars, and/or wing ribs of the wing assembly 250 may be comprised primarily of fabric plies. In the present disclosure, a fabric ply may be described as having multi-directional fibers. For example, a fabric ply may include a woven arrangement of bi-directional fibers wherein the fibers are oriented perpendicular to each other.

The aircraft components 130 that may be attached to an aircraft structure 104 via one or more net-area-tension joints 140 may be formed of metallic material and/or non-metallic material. For example, the component attach fitting 132 (FIG. 3) of an aircraft component 130 (FIG. 3) may be formed of aluminum, titanium, or other metallic material that is preferably compatible with the composite material of the aircraft structure 104. However, in other examples, a component attach fitting 132 may be formed of composite material, such as the above-described fiber-reinforced polymer matrix material.

Referring to FIG. 2-5, shown in FIG. 2 is a sectional view of an example of a wing assembly 250 having at least one net-area-tension joint 140 on each side of the fuselage 106 for coupling the wing assembly 250 to the fuselage 106. In the example shown, the aircraft structure 104 is the wing assembly 250, and the aircraft component 130 is the fuselage 106. The component attach fitting 132 comprises a fuselage attach fitting 112 which may be coupled to and/or extend downwardly from a fuselage frame 108 of the fuselage 106. In the example of FIG. 2, the fuselage 106 may have a fuselage attach fitting 112 on each side of the fuselage 106 at each location where the wing assembly front spar 260 and wing assembly rear spar 262 would be when the wing assembly 250 is coupled to the fuselage 106.

Referring to FIG. 3, shown is a magnified view of an example of a fuselage attach fitting 112 extending downwardly from a fuselage frame 108. The fuselage attach fitting 112 is shown coupled to the wing assembly 250 via a net-area-tension fastener pattern 142 formed in the wing assembly skin panel 256. In addition, the net-area-tension fastener pattern 142 may extend through an internal doubler 170 and into an internal structural member 180 of the wing assembly 250.

Referring to FIGS. 4-5, shown in FIG. 4 is an example of the net-area-tension joint 140 coupling the fuselage attach fitting 112 to the wing assembly skin panel 256. The fuselage attach fitting 112 is shown having several attach fitting webs 116 and an attach fitting base 114. The net-area-tension fastener pattern 142 is shown extending through the attach fitting base 114, the wing assembly skin panel 256 and may also extend through an internal doubler 170 and into an internal structural member 180 of the wing assembly 250. In the example shown, the internal structural member 180 may comprise a spar flange 266 of the wing assembly rear spar 262.

FIG. 5 is a top-down view of the net-area-tension joint 140 with the fasteners 410 (FIG. 4) removed and showing the net-area-tension fastener pattern 142 formed in the attach fitting base 114 and the wing assembly skin panel 256. In the example shown, the net-area-tension fastener pattern 142 has three rows of fastener holes 144 with each row having three fastener holes 144. However, in any net-area-tension joint 140 disclosed herein, the net-area-tension fastener pattern 142 has two or more rows of fastener holes 144, and each row has two or more fastener holes 144.

In FIGS. 4-5, the primary load direction 136 (i.e., in the in-plane direction) at the net-area-tension fastener pattern 142 is generally parallel to the longitudinal axis 102 (FIG. 1) of the fuselage 106 (FIG. 1), and is pointed in an aft direction. For an aircraft 100 (FIG. 1) having engines 230 (FIG. 1) mounted on the wing assembly 250 (FIG. 1), the aft-facing direction of the load 134 may be the result of aerodynamic drag generated by the fuselage 106 as the wing-mounted engines 230 propel the aircraft 100 forward. As mentioned above, the primary load direction 136 at a net-area-tension joint 140 may be described as the in-plane component (i.e., locally at the skin panel) of the total load 134 that the aircraft component 130 (e.g., the fuselage 106) is capable of exerting on the aircraft structure 104 (e.g., the wing assembly 250). As mentioned above, in a net-area-tension joint 140, each row of fastener holes 144 is oriented generally perpendicular to the primary load direction 136 which, in FIGS. 4-5, is the primary load direction 136 of the load 134 on the wing assembly skin panel 256 and a wing assembly rear spar 262 at the location of the net-area-tension fastener pattern 142. The first row 146 of fastener holes 144 is located upstream of the last row 154 relative to the primary load direction 136. As shown in FIGS. 4-5, the diameter of the fastener holes 144 in the first row 146 and the last row 154 are respectively the smallest and the largest in the net-area-tension fastener pattern 142.

Referring still to FIGS. 4-5, as mentioned above, a net-area-tension fastener pattern 142 may include one or more intermediate rows 148 of fastener holes 144 located between the first row 146 and the last row 154. In the example shown, the net-area-tension fastener pattern 142 includes a first row 146, a second row 150, and a third row 152 of fastener holes 144. The first row 146 is immediately adjacent to the second row 150, and the second row 150 is immediately adjacent to the third row 152, with no intervening fasteners 410 between the first row 146 and the second row 150, and no intervening fasteners 410 between the second row 150 and the third row 152. As mentioned above, the diameter of the fastener holes 144 in each subsequent row incrementally increase along the primary load direction 136.

In this regard, in a net-area-tension fastener pattern 142 having one or more intermediate rows 148, the diameter of the fastener holes 144 in the first row 146 are smaller than the diameter of the fastener holes 144 in the intermediate row 148 immediately-adjacent to the first row 146, and the diameter of the fastener holes 144 in the last row 154 are larger than the diameter of the fastener holes 144 in the intermediate row 148 immediately-adjacent to the last row 154. In the example of FIG. 5, the diameter of the fastener holes 144 in the first row 146 is smaller than the diameter of the fastener holes 144 in the second row 150, and the diameter of the fastener holes 144 in the second row 150 is smaller than the diameter of the fastener holes 144 in the third row 152.

As also mentioned above, the fastener holes 144 in a given row of a net-area-tension fastener pattern 142 are spaced apart at a spacing ratio of hole spacing 156 to hole diameter 158. The hole spacing 156 in each row is measured from hole center to hole center. The spacing ratio of the first row 146 is greater than the spacing ratio of the last row 154. For a net-area-tension fastener pattern 142 having intermediate rows 148, the spacing ratio of each subsequent row incrementally decreases along the primary load direction 136. In this regard, the spacing ratio of the first row 146 is greater than the spacing ratio of the intermediate row 148 immediately-adjacent to the first row 146, and the spacing ratio of the fastener holes 144 in the last row 154 are smaller than the spacing ratio of the fastener holes 144 in the intermediate row 148 immediately-adjacent to the last row 154. In the example of FIG. 5, the spacing ratio of the first row 146 is greater than the spacing ratio of the second row 150, which is greater than the spacing ratio of the third row 152.

Advantageously, by configuring the net-area-tension fastener pattern 142 such that the fastener holes 144 in the first row 146 have the smallest diameter and the largest hole spacing 156, the fasteners 410 in the first row 146 are exposed to a relatively low percentage of the total load 134 that the aircraft component 130 applies to the aircraft structure 104. In this regard, the relatively small diameter and relatively large hole spacing 156 of the first row 146 results in a relatively large portion (e.g., a majority) of the load bypassing the first row 146 of fasteners 410, which minimizes the magnitude of bearing stress on the first row 146 of fastener holes 144, thereby reducing or preventing bearing failure (e.g., local crushing due to micro-buckling of the composite material) of the first row 146 of fastener holes 144 in the skin panel 105.

The portion of the load bypassing the first row 146 of fasteners 410 is transferred into the last row 154 of fasteners 410 and any one or more intermediate rows 148 that may be located between the first row 146 and the last row 154. The relatively larger hole diameter 158 and smaller hole spacing 156 of the last row 154 of fastener holes 144 ensures that the remaining portion of the load 134 from the aircraft component 130 is picked up by the last row 154 fasteners 410 and transferred into the skin panel 105 and optional internal doubler 170. By preventing bearing failure in the first row 146 of fastener holes 144, and by gradually distributing the remaining load into the skin panel 105 via the increasingly larger fasteners 410 in the last row 154 (and any intermediate rows 148), the load-carrying capability of a net-area-tension joint 140 becomes a function of the tension capability of the composite skin panel 105 at the cross-sectional areas between the fastener holes 144 in each row.

Advantageously, composite laminates under tension exhibit linearly elastic behavior due to a relatively high ultimate tension load-carrying capability of the fibers, and also due to a reduction in stress concentrations in the composite laminate relative to stress concentrations that occur in composite laminates under compression. The linear elastic behavior of a composite laminate under tension allows for more precision is determining the load-carrying capability of the composite laminate (e.g., a composite skin panel), which allows for increased accuracy of structural analysis and a reduction in safety factors when sizing the components of a net-area-tension joint 140. Sizing of the components may include selecting the quantity and stacking sequence (i.e., fiber orientations) of the composite plies 420 (FIG. 29) that make up the composite laminate. The increased accuracy of structural analysis and the reduced safety factors translates into a reduction in thickness requirements for the skin panel 105, which results in reduced structural mass of an aircraft structure 104. Due to the above-described advantages, the presently-disclosed net-area-tension joint 140 has a more structurally efficient load carrying capability than other types of joints. For example, the presently-disclosed net-area-tension joint 140 is structurally more efficient than the below-described bearing critical joint 454 (FIGS. 11-13) for which a majority of the load is picked up by the first row of fasteners of the bearing critical joint 454, necessitating locally thickened skin padups (not shown) and large diameter fasteners to avoid bearing failure (i.e., local crushing) of the sides of the fastener holes.

Figure 6:
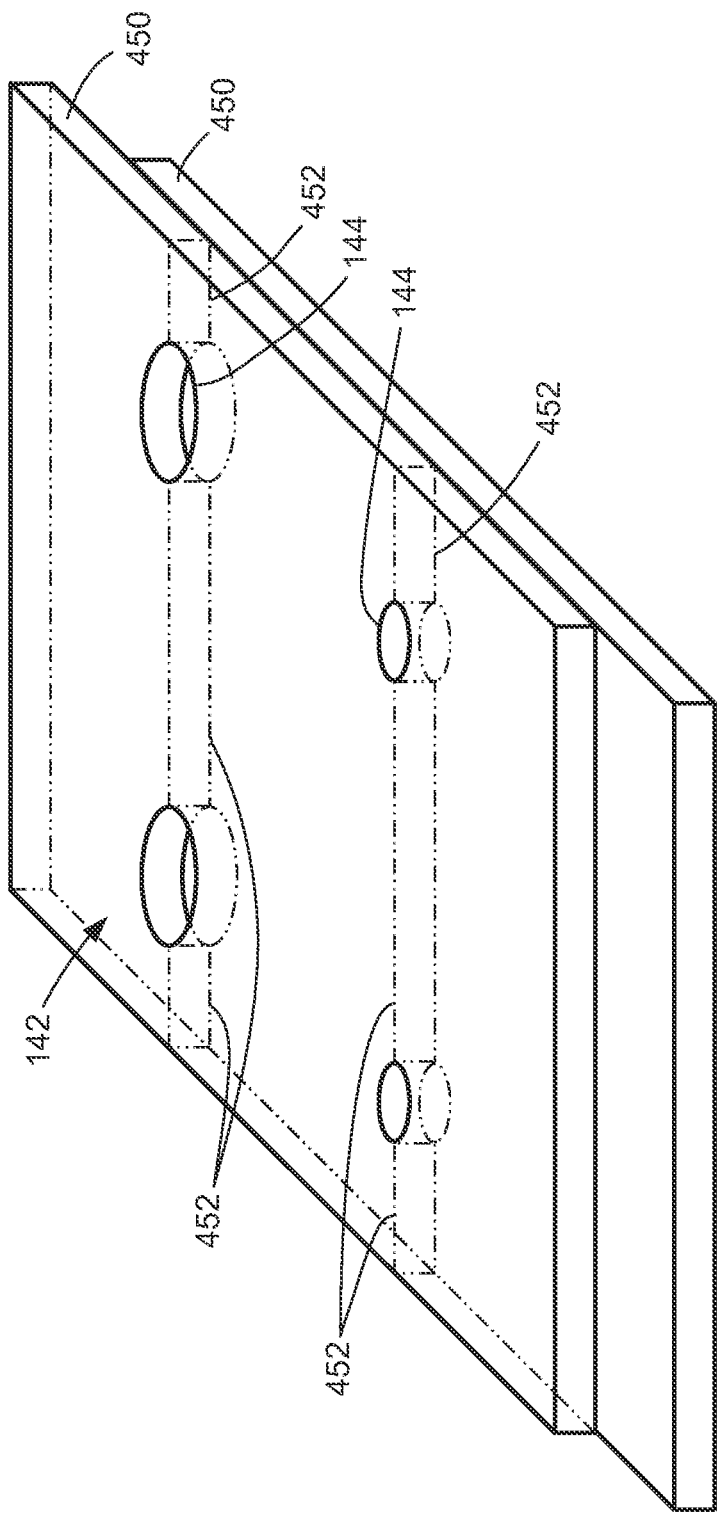
FIG. 6 is a perspective view of a net-area-tension fastener pattern formed in a top specimen plate formed as a composite laminate and subjected to a primary load direction (i.e., a shear load) applied by a bottom specimen plate which may be formed of metallic material, and showing the net-area-tension fastener pattern having 2 parallel rows of fastener holes oriented perpendicular to the primary load direction, and further illustrating (in phantom lines) the boundaries of the cross-sectional areas on opposite sides of the fastener holes of the top specimen plate.
Figure 15:
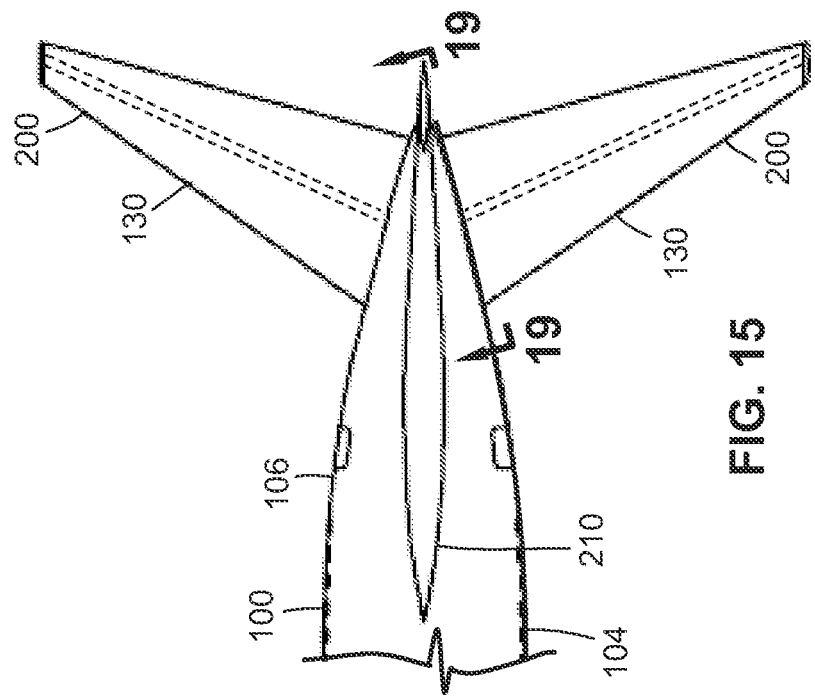
FIG. 15 is a top-down view of the vertical stabilizer taken along line 15-15 of FIG. 14.

Referring briefly to FIGS. 6-13, shown in FIG. 6 is an example of a net-area-tension fastener pattern 142 formed in a top specimen plate 450 and a bottom specimen plate 450 configured to be joined by fasteners 410 (e.g., FIG. 7), which are omitted for clarity. The top specimen plate 450 may be a composite laminate configured to be subjected to a load 134 (FIG. 7) applied along a primary load direction 136 (FIG. 7). The bottom specimen plate 450 may be formed of metallic material and/or may have a greater load-carrying capability than the top specimen plate 450. The net-area-tension fastener pattern 142 has two parallel rows of fastener holes 144 oriented perpendicular to the primary load direction 136. The phantom lines in the top specimen plate 450 represent the boundaries of the cross-sectional areas 452 on opposite sides of the fastener holes 144 of the top specimen plate 450. In a given row, the net cross-sectional area is the total cross-sectional area of the specimen plate 450 (e.g., at a non-row location) minus the combined cross-sectional area of the two fastener holes 144 in the row. As described below, in a net-area-tension joint 140, the load 134 applied to the top specimen plate 450 is reacted by tension stress 458 (FIG. 10) distributed across the net cross-sectional area of the top specimen plate 450 at each row.

FIGS. 7-10 are provided to illustrate the stress response and failure characteristics of a net-area-tension joint 140 subjected to a load 134. FIG. 7 is a side view of a top specimen plate 450 and a bottom specimen plate 450 joined by a fastener 410, which is in shear as a result of the in-plane load 134 on the specimen plates 450. The top specimen plate 450 may be formed of composite material. The bottom specimen plate 450 may be formed of metallic material and/or may have a greater load-carrying capability than the top specimen plate 450, as mentioned above for the example of FIG. 6. FIG. 8 is a perspective view of the specimen plates 450 with the fastener removed, and illustrating the failure mode of the net-area-tension joint 140 in the form of tension failure manifested as fracturing and/or at least partial separation of the top specimen plate 450. FIG. 9 is a top view of the top specimen plate 450 showing the separation of the top specimen plate 450 into two pieces as a result of tension stress 458 along the cross-sectional areas on opposite sides of the fastener hole 144 due to the load. FIG. 10 shows the distribution of tension stress 458 along the cross-sectional areas on opposite sides of the fastener hole 144 during application of the load 134.

FIGS. 11-13 are provided to illustrate the stress response and failure mode of a bearing critical joint 454 as is conventionally implemented in an aircraft 100. FIG. 11 is a perspective view of the specimen plates 450 with the fastener removed, and illustrating the failure mode of the bearing critical joint 454 which is manifested as local crushing on one side of the fastener hole 144 due to pressure applied by the shank of a fastener (not shown). FIG. 12 is a top view of the specimen plate 450 showing the local crushing on one side of the fastener hole 144 due to the load 134 applied by the shank of the fastener. FIG. 13 shows the distribution of bearing stress 456, which is concentrated on one side of the fastener hole 144 during application of the load. For a bearing critical joint 454 having multiple row of fastener holes 144 of the same diameter in a composite skin panel, a majority of the load would be picked up by a first row of fasteners, necessitating increased skin thickness in order to avoid bearing failure (i.e., local crushing) of the sides of the fastener holes.

As mentioned above, the presently-disclosed net-area-tension joint 140 is structurally more efficient than the above-described bearing critical joint 454 due to the avoidance of bearing failure in the fastener holes 144. In a net-area-tension joint 140 (FIG. 5), a majority of the load 134 (FIG. 5) bypasses the first row 146 (FIG. 5) of fasteners 410 (FIG. 4) of the joint due to the relatively small diameter of the fastener holes 144 in the first row 146 and the relatively large spacing ratio between the fastener holes 144. Furthermore, as mentioned above, the portion of load 134 that bypasses the first row 146 of fasteners 410 is uniformly distributed into subsequent rows, which include a last row 154 of fasteners 410 and may optionally include one or more intermediate rows 148 located between the first row 146 and the last row 154.

Referring briefly back to FIG. 5, in any one of the presently-disclosed examples of a net-area-tension fastener pattern 142, the fastener holes 144 in the first row 146 may have a spacing ratio of less than 5. For example, the spacing ratio of the fastener holes 144 in the first row 146 may be approximately in the range of 5-6. The spacing ratio of the fastener holes 144 in the last row 154 are preferably no less than 3. In one example, the spacing ratio of the fastener holes 144 in the last row 154 may be approximately 3 (e.g., ±30 percent). For a net-area-tension fastener pattern 142 having one or more intermediate rows 148, the spacing ratio of each intermediate row 148 is preferably greater than 3 and less than 5. For example, the spacing ratio of an intermediate row 148 of a net-area-tension fastener pattern 142 may be approximately 4.

Referring still to the example of FIG. 5, the rows in a net-area-tension fastener pattern 142 may be spaced apart by a row spacing 164. The row spacing 164 between adjacent rows may be measured from row centerline 162 to row centerline 162. The row spacing 164 between immediately adjacent rows of a net-area-tension fastener pattern 142 may be at least two times the diameter of the fastener holes 144 of the row that has the larger diameter fastener holes 144.

Referring to FIG. 4, in any one of the examples of the net-area-tension fastener pattern 142, the fastener holes 144 in the first row 146 may have a diameter that is approximately (e.g., within 30 percent) equivalent to the skin thickness 258 of the skin panel 105. The skin thickness 258 may measured at the location of the fastener holes 144 in the first row 146. However in other examples, the diameter of the fastener holes 144 in the first row 146 may be greater than the skin thickness 258 of the skin panel 105 at the location of the fastener holes 144. By maintaining the diameter of the fastener holes 144 in the first row 146 equal to or greater than the skin thickness 258, bearing failure of the fastener holes 144 in the first row 146 may be avoided.

Figure 29:
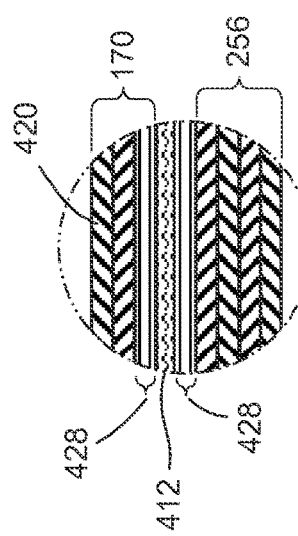
FIG. 29 is a magnified view of a portion of the wing assembly identified by reference numeral 29 of FIG. 28 and illustrating an arrangement of composite plies at the interface between the skin panel of the wing assembly and an internal doubler located opposite the landing gear attach fitting.

Referring still to FIG. 4, in some net-area-tension joint 140 examples, a discrete doubler 170 may be included on a side of the skin panel 105 opposite the mounting location of the component attach fitting 132. The doubler 170 may facilitate the distribution of the load 134 into the skin panel 105. The doubler 170 may be formed as a composite laminate. For example the doubler 170 may be formed of unidirectional plies and/or the doubler 170 may include fabric plies. In one example, the doubler 170 may be laid up and bonded to the inner surface of the skin panel 105 opposite the location of the component attach fitting 132. The doubler 170 may be co-bonded to the skin panel 105, or the doubler 170 may be secondary bonded to the skin panel 105 via an adhesive layer 412 (FIG. 29).

Advantageously, a doubler 170 may improve the structural efficiency of the net-area-tension joint by locally increasing the thickness of the skin panel 105 to assist in transferring load 134 from an aircraft component 130 into a skin panel 105 at a net-area-tension joint 140. In addition, a doubler 170 may be more easily manufactured, repaired, and/or replaced relative to a localized composite padup region (not shown) which is typically laid up during layup of a skin panel 105 for a conventional bearing critical joint 454. The use of an internal doubler 170 as part the presently disclosed net-area-tension joint 140 avoids the manufacturing challenges such as laminate warpage and interlaminar stresses typically associated with thick padup regions of a conventional skin panel. In this regard, the use of internal doublers 170 (as an alternative to localized padups) allows the skin panels 105 to have a substantially constant thickness, which significantly reduces manufacturing cost and complexity. For examples where a net-area-tension joint 140 is at a location where the skin panel 105 defines the outer mold line of the aircraft structure 104, the doubler 170 may be mounted on the inner surface of the skin panel 105 to preserve the aerodynamic contour of the outer mold line.

In the example of FIG. 4, the doubler 170 is shown bonded to the inner surface of the wing assembly skin panel 256. The doubler 170 may have a footprint (e.g., size and shape) that is complementary to the footprint of the attach fitting base 114 of the component attach fitting 132. In this regard, the double may have a length measured parallel to the primary load direction 136, and a width measured perpendicular to the primary load direction 136. In any one of the examples disclosed herein, the length and/or the width of the doubler 170 may be at least as long and as wide respectively as the length and width of the attach fitting base 114 of the component attach fitting 132. In this regard, the doubler 170 may be provided in a size (e.g., length and width) such that every fastener hole 144 of the net-area-tension fastener pattern 142 that extends to the skin panel 105 also extends through the doubler 170.

In FIG. 4, the doubler 170 may have a doubler thickness 172 that may be no greater than the skin thickness 258 of the skin panel 105 at the location of the net-area-tension fastener pattern 142. In some examples, the doubler thickness 172 may be less than the skin thickness 258 to ensure that the doubler stiffness is lower than the skin thickness 258 at the net-area-tension fastener pattern 142. Providing the doubler 170 in a doubler thickness 172 that is lower than the skin thickness 258 may reduce or minimize the magnitude of peel stresses in the bondline between the doubler 170 and the skin panel 105. Such peel stresses may be highest at the perimeter edges of the doubler 170. Advantageously, minimizing peel forces may minimize or prevent the occurrence of crack initiation in the bondline between the doubler 170 and the skin panel 105.

In the example of FIG. 4, the doubler 170 has a doubler main portion 174 and a doubler tapered portion 176 extending from the doubler main portion 174. The doubler tapered portion 176 may extend downstream of the last row 154 of fastener holes 144 relative to the primary load direction 136. The doubler tapered portion 176 may provide additional area over which the load 134 may be distributed into the skin panel 105, and may thereby reduce the magnitude of the peel stress in the bondline (e.g., adhesive layer 412—FIG. 29) between the doubler 170 and the skin panel 105. In the example shown, the double may be configured such that the last row 154 of fastener holes 144 in the net-area-tension fastener pattern 142 extends through the doubler main portion 174, and not the doubler tapered portion 176. The perimeter edge of the doubler tapered portion 176 may be generally parallel to the last row 154 of fastener holes 144 of the net-area-tension fastener pattern 142. The doubler thickness 172 may taper from a full thickness of the doubler main portion 174, to a reduced doubler thickness 172 of less than 0.25 inch at the perimeter edge of the doubler 170. In some examples, the doubler tapered portion 176 may be configured to form a taper angle of no greater than 45 degrees relative to the inner surface of the skin panel 105, more preferably, the taper angle is between approximately 15-30 degrees.

Referring still to FIG. 4, in some examples, a net-area-tension joint 140 may include a doubler reduced thickness portion 178 extending in a downstream direction (i.e., relative to the primary load direction 136) from the doubler tapered portion 176. In the example shown, the doubler reduced thickness portion 178 may have a constant thickness (i.e., the reduced doubler thickness 172). The doubler reduced thickness portion 178 may provide additional distance over which the peel forces in the bondline may diminish, and may further reduce the occurrence of cracking in the bondline between the doubler 170 to the skin panel 105 due to peel forces.

Referring to FIG. 5, the double may be sized and configured such that each of the fastener holes 144 of the net-area-tension fastener pattern 142 in the doubler 170 has an edge distance 160 of at least two diameters. The edge distance 160 of each fastener hole 144 in the doubler 170 may be measured from hole center to the perimeter edge of the doubler 170. Providing a minimum edge distance 160 for the fastener holes 144 in the double reduces the risk of a fastener pulling out of the side of the doubler 170.

Referring to FIGS. 4-5, in any one of the examples disclosed herein, one or more of the fastener holes 144 of a net-area-tension fastener pattern 142 may extend through an internal structural member 180 of the aircraft structure 104, as mentioned above. The internal structural member 180 may be formed of composite material, and may be located on the side of the skin panel 105 opposite the component attach fitting 132. For example, in FIGS. 4-5, two rows of the fastener holes 144 extend through a spar flange 266 of the wing assembly rear spar 262. However, in other examples, a net-area-tension joint 140 may be configured such that only a single row of fastener holes 144 extends through an internal structural member 180. For examples of the net-area-tension joint 140 that include a doubler 170, the doubler 170 may be positioned between the skin panel 105 and the internal structural member 180. However, in other examples not shown, the doubler 170 may be omitted, and the net-area-tension fastener pattern 142 may extend through the skin panel 105 and into an internal structural member 180 of the aircraft structure 104.

Figure 14:
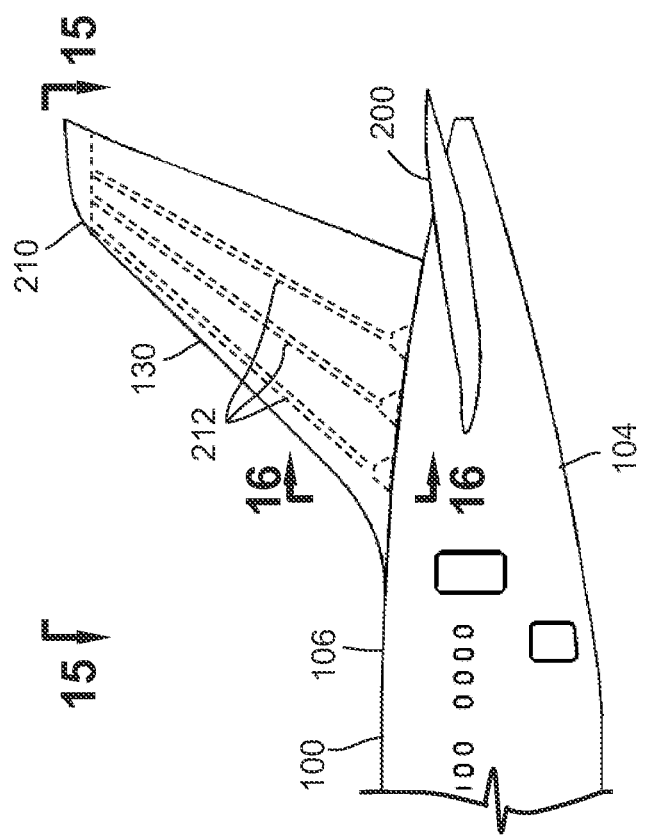
FIG. 14 is a side view of the aircraft taken along line 14-14 of FIG. 1 and illustrating an example of a vertical stabilizer joined to the fuselage via one or more net-area-tension joints.
Figure 18:
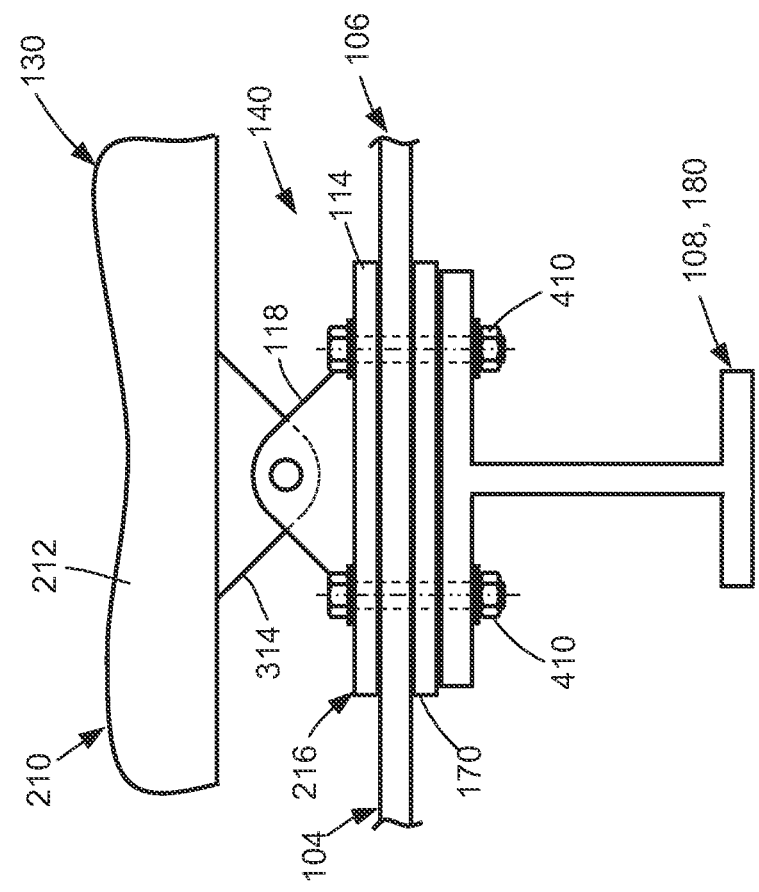
FIG. 18 is a sectional view taken along line 18-18 of FIG. 16 and illustrating a vertical stabilizer attach fitting at the net-area-tension joint.

Referring to FIGS. 14-32, shown are examples of net-area-tension implemented at different locations on an aircraft 100 (FIG. 1). FIGS. 14 and 16-18 show an example of an implementation of net-area-tension joints 140 coupling a vertical stabilizer 210 to a fuselage 106. In the example shown, the fuselage 106 is the aircraft structure 104 and the vertical stabilizer 210 is the aircraft component 130 that is being coupled to the aircraft structure 104. FIG. 14 is a side view of an example of a vertical stabilizer 210. The vertical stabilizer 210 includes a plurality of vertical stabilizer spars 212. As shown in FIGS. 16 and 18, each one of the vertical stabilizer spars 212 may include one or more downwardly-protruding spar tabs 214. Each pair of spar tabs 214 may be coupled (e.g., mechanically fastened) respectively to a pair of attach fitting lugs 118 protruding upwardly from the attach fitting base 114 of each of a respective pair of vertical stabilizer attach fittings 216 mounted to opposite sides of the fuselage 106. Each one of the vertical stabilizer attach fittings 216 may be mechanically fastened to the fuselage skin panel 110 of the fuselage 106 via a net-area-tension fastener pattern 142 in the fuselage skin panel 110.

Figure 17:
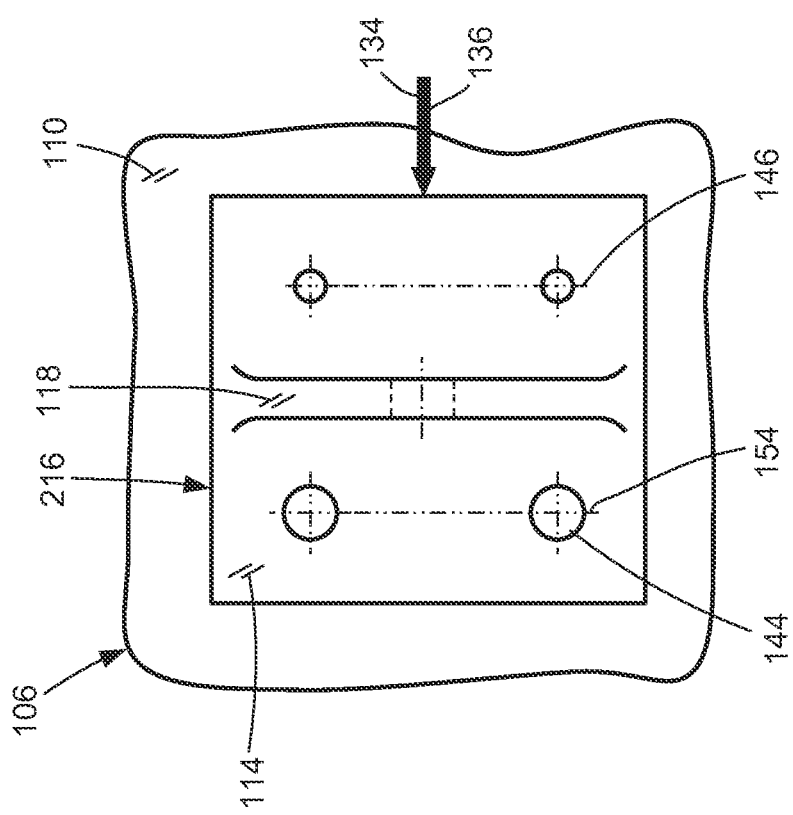
FIG. 17 is a top-down view of the aircraft taken along line 17-17 of FIG. 16 and illustrating an example of one of the vertical stabilizer attach fittings incorporating the net-area-tension fastener pattern for joining the vertical stabilizer to the fuselage.

FIGS. 16-17 show the primary load direction 136 of the load 134 that each vertical stabilizer attach fitting 216 applies to the fuselage 106. The load 134 applied by each vertical stabilizer attach fitting 216 on the fuselage 106 may be generally oriented in a lateral direction (i.e., horizontal and perpendicular to the longitudinal axis 102) and/or in a circumferential direction, and may be the result of aerodynamic loads on the sides of the vertical stabilizer 210 and/or rudder (not shown) during any one or more phases of flight including cruise flight and/or landing and takeoff.

In the example of FIGS. 16-18, each net-area-tension fastener pattern 142 and associated mechanical fasteners 410 (FIGS. 16-18) extend through the attach fitting base 114 of the vertical stabilizer attach fitting 216, and into the fuselage skin panel 110, the internal doubler 170, and a circumferential fuselage frame 108. The circumferential fuselage frame 108 may comprise an internal structural member 180 of the net-area-tension joint 140. However, the internal structural member 180 you may be provided in other configurations. For example, the internal structural member 180 may be a longitudinal fuselage stringer (not shown). As indicated above, in some examples, the internal double may be omitted from the net-area-tension joint 140.

Referring to FIGS. 16-17 the net-area-tension fastener pattern 142 includes exactly two rows of fastener holes 144 including a first row 146 and a last row 154. Each row includes exactly two fastener holes 144. However, as indicated above, a net-area-tension fastener pattern 142 may include any number of rows greater than a single row. In addition, each row may include any number of fastener holes 144 greater than a single fastener hole 144. As shown in FIG. 17, each row of each net-area-tension fastener pattern 142 is oriented generally perpendicular to the primary load direction 136 of the load 134 applied by the vertical stabilizer attach fitting 216 on the fuselage 106. The first row 146 of fastener holes 144 have the smaller diameter, and are located upstream of the last row 154 relative to the primary load direction 136. As mentioned above, by configuring the net-area-fastener pattern such that the diameter of the fastener holes 144 in the first row 146 are the smallest, and the diameter of the fastener holes 144 in the last row 154 the largest, bearing failure (e.g., local crushing) of the first row 146 of fastener holes 144 may be avoided. In addition, locating the larger diameter fastener holes 144 in the last row 154 ensures that the load that bypasses the first row 146 of fasteners 410 is transferred into the fuselage skin panel 110 by the larger diameter fasteners 410 in the last row 154 of the net-area-tension fastener pattern 142.

Referring now to FIGS. 19-21, shown is an example of a pair of net-area-tension joints 140 coupling a horizontal stabilizer 200 to one side of the fuselage 106. In the example shown, the fuselage 106 is the aircraft structure 104 and the horizontal stabilizer 200 is the aircraft component 130 that is being coupled to the aircraft structure 104. FIG. 19 is a side view of an aft portion of the fuselage 106 showing a pair of horizontal stabilizer attach fittings 204 coupled to the fuselage 106. The pair of horizontal stabilizer attach fittings 204 include an upper and a lower horizontal stabilizer attach fitting. Each horizontal stabilizer attach fitting 204 is configured to be fastened to the fuselage skin panel 110 via a net-area-tension fastener pattern 142.

As shown in FIGS. 20-21, the horizontal stabilizer 200 may include a horizontal stabilizer spar 202. The pair of horizontal stabilizer attach fittings 204 may be mechanically fastened to the fuselage skin panel 110 respectively above and below the horizontal stabilizer 200 in a manner allowing the horizontal stabilizer spar 202 to pivot, as may be required for adjusting the angle of attack of the horizontal stabilizer 200 for trimming the aircraft 100 during flight. In this regard, each horizontal stabilizer attach fitting 204 may include an attach fitting flange 120 that is shaped complementary to bear against the outer surface of the horizontal stabilizer spar 202, and thereby prevent movement of the horizontal stabilizer spar 202 during pivoting motion. The primary load direction 136 of the load 134 that each horizontal stabilizer attach fitting 204 applies to the fuselage 106 may be vertically oriented, and/or generally perpendicular to the longitudinal axis 102 (FIG. 1) of the aircraft 100 (FIG. 1). For example, when the aircraft 100 is flying straight and level, the primary load direction 136 on the upper horizontal stabilizer attach fitting 204 may be upwardly directed as a result of an aerodynamic force on the lower side of the horizontal stabilizer 200 during flight. The primary load direction 136 on the lower horizontal stabilizer attach fitting 204 may be downwardly directed as a result of an aerodynamic force on the upper side of the horizontal stabilizer 200 during flight.

In FIGS. 20-21, each net-area-tension fastener pattern 142 extends through the attach fitting base 114 of the horizontal stabilizer attach fitting 204, and into the fuselage skin panel 110, and an internal doubler 170. Although not shown, the fuselage 106 may include a fuselage frame 108 (FIG. 16) or other internal structural member 180 (FIG. 16) at the location of the horizontal stabilizer attach fitting 204 for receiving one or more of the fastener holes 144 of the net-area-tension fastener pattern 142. In the example shown, the net-area-tension fastener pattern 142 at each horizontal stabilizer attach fitting 204 includes exactly two rows of fastener holes 144 including a first row 146 and a last row 154. The first row 146 includes four fastener holes 144. The last row 154 includes three fastener holes 144 which are staggered in relation to the four fastener holes 144 of the first row 146. However, as indicated above, the net-area-tension fastener pattern 142 may include any number of rows greater than one row, with each row having any number of fastener holes 144 greater than one fastener hole 144. In this regard, in any example of a net area-tension fastener pattern disclosed herein, the fastener holes 144 in any one or more pairs of immediately-adjacent rows may be aligned with each other. In addition, the fastener holes 144 in any or more pairs of immediately-adjacent rows may be offset or staggered relative to each other.

In FIGS. 20-21, each row is oriented generally perpendicular to the primary load direction 136 of the load 134 applied by the horizontal stabilizer attach fitting 204 to the fuselage 106. As shown in FIG. 21, the first row 146 of fastener holes 144 have the smaller diameter, and are located upstream (i.e., relative to the primary load direction 136) of the last row 154 of fastener holes 144 which have the larger diameter.

Figure 22:
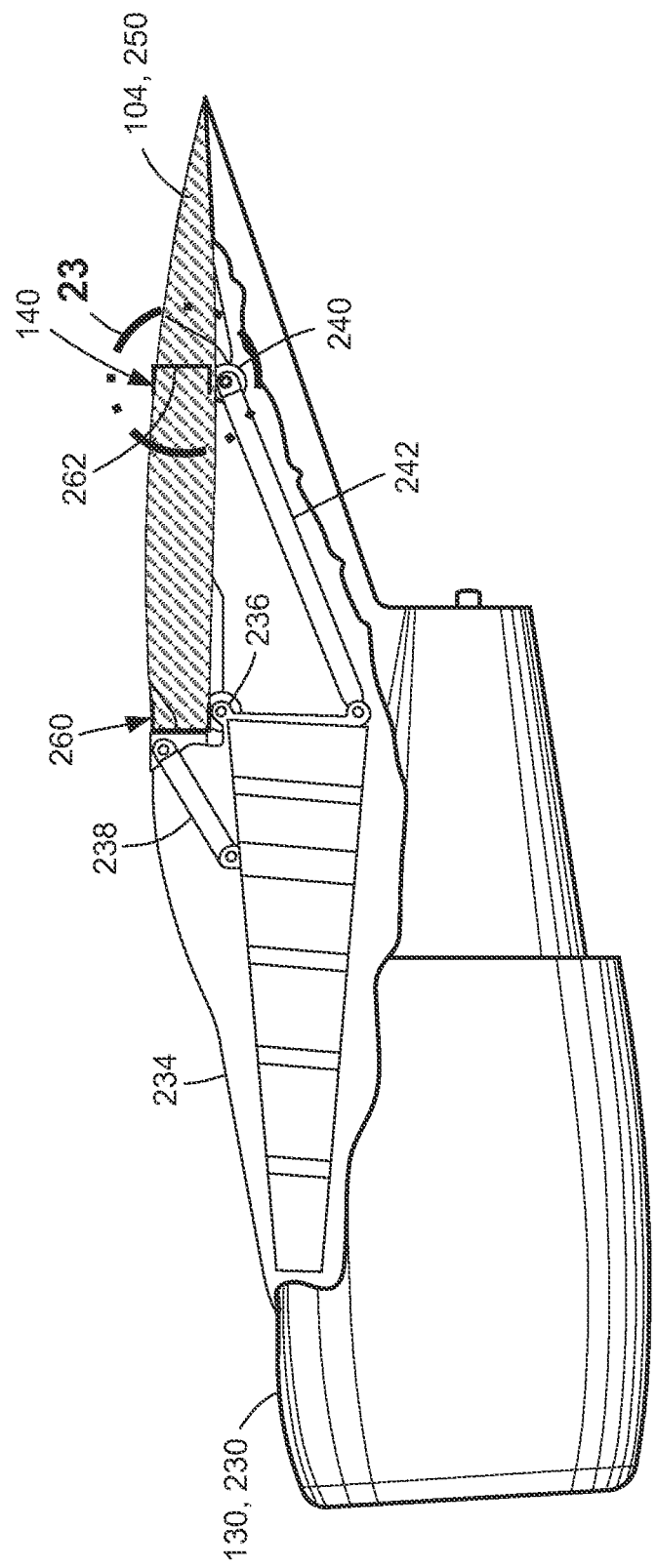
FIG. 22 is a side view of the aircraft taken along line 22-22 of FIG. 1 and illustrating an example of an engine pylon for coupling an engine to the wing assembly.
Figure 23:
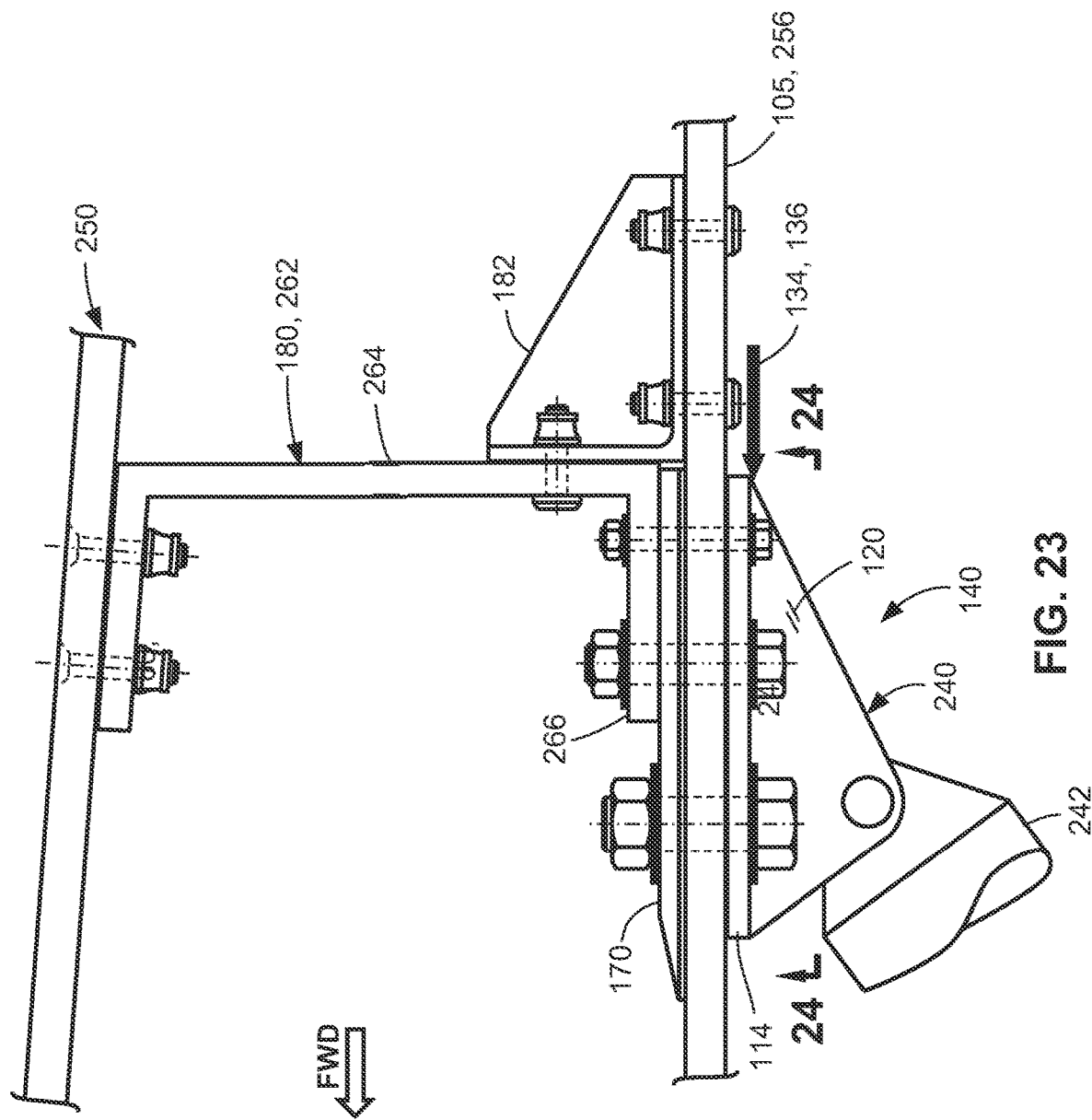
FIG. 23 is a magnified view of the portion of the wing assembly identified by reference numeral 23 of FIG. 22 and illustrating an example of an engine attach fitting incorporating a net-area-tension fastener pattern for coupling the engine to the wing assembly.
Figure 24:
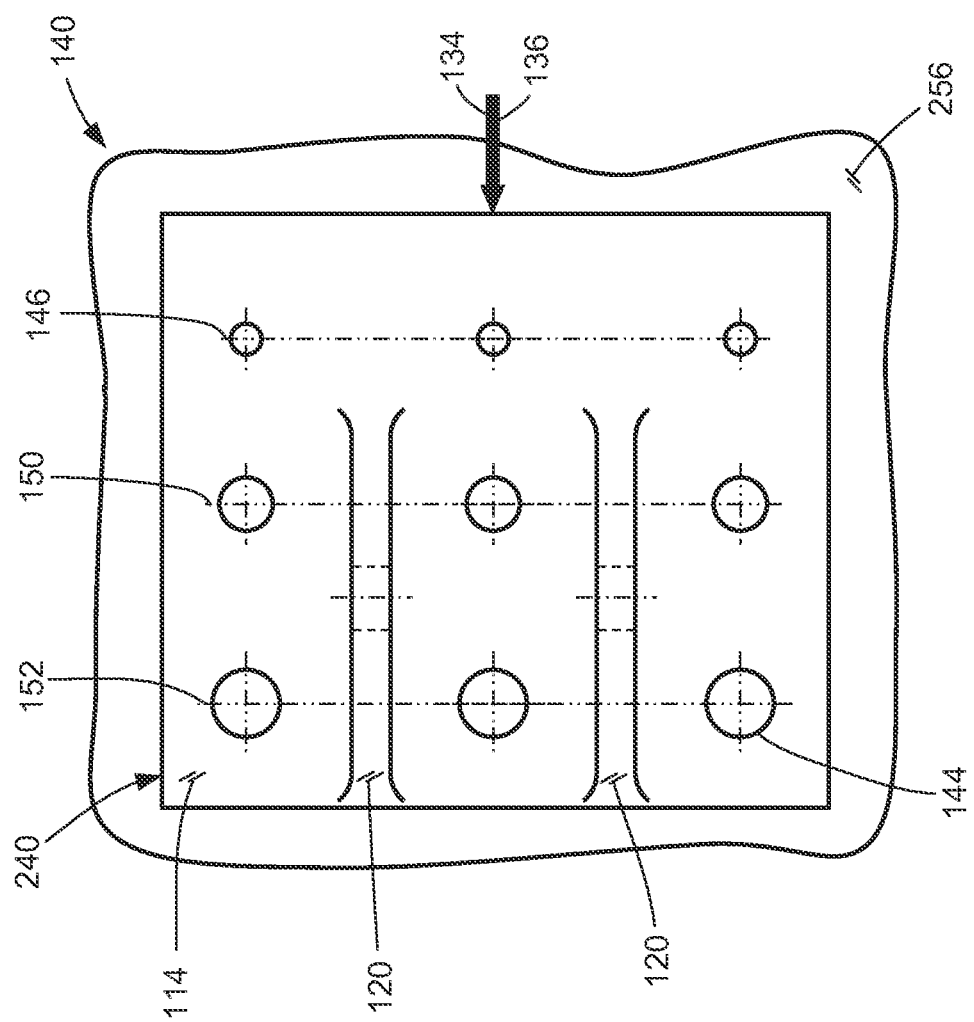
FIG. 24 is a bottom-up view of the wing assembly taken along line 24-24 of FIG. 23 and illustrating an example of a net-area-tension fastener pattern in the engine attach fitting.

Referring to FIGS. 22-24, shown is an example of one or more net-area-tension joints 140 (FIGS. 23-24) coupling an engine 230 to the wing assembly 250. In the example shown, the wing assembly 250 is the aircraft structure 104, and the engine 230 is the aircraft component 130 that is being coupled to the aircraft structure 104. FIG. 22 is a side view of the aircraft 100 showing an engine pylon 234 coupling the engine 230 to the wing assembly 250. The engine pylon 234 may include an engine front attach fitting 236 coupling a front portion of the engine 230 to the wing assembly front spar 260 via a front strut 238. In addition, the engine pylon 234 may include an engine rear attach fitting 240 coupling a rear portion of the engine 230 to the wing assembly rear spar 262 via a rear strut 242. The engine front attach fitting 236 and the engine rear attach fitting 240 may each include an attach fitting base 114 having one or more attach fitting flanges 120 for respectively coupling to the front strut 238 and rear strut 242. Each attach fitting base 114 may be mechanically fastened to the wing assembly 250 via a net-area-tension fastener pattern 142 formed in the wing assembly skin panel 256.

Referring to FIG. 23, the wing assembly 250 may further include a backup fitting 182 coupled to the wing assembly skin panel 256 and the wing assembly rear spar 262 to assist in transferring load 134 from the wing assembly skin panel 256 to the internal structure of the wing assembly 250. In the example shown, the backup fitting 182 may be coupled to the wing assembly skin panel 256 and the spar web 264 of the wing assembly rear spar 262 or other internal structural member 180. In some examples not shown, the backup fitting 182 may be configured as a bathtub fitting configured to be coupled to the skin panel 105 and to or more different internal structural members 180. For example, a bathtub fitting may have three sides respectively coupled to the wing assembly skin panel 256, the spar web 264, and a wing rib (not shown) of the wing assembly 250. As may be appreciated, a backup fitting 182 may be provided in any one of a variety of different configurations of a net-area-tension joint 140, and may be coupled to any one of a variety of different types of internal structural members 180 of the aircraft structure 104, in addition to being coupled to the skin panel 105.

In FIGS. 23-24, the net-area-tension fastener pattern 142 extends into the wing assembly skin panel 256, internal doubler 170, and the spar flange 266 of the wing assembly rear spar 262. The primary load direction 136 of the load 134 that the engine rear attach fitting 240 applies to the wing assembly 250 may be oriented generally parallel to the engine centerline 232 (FIG. 1) and is pointed in a forward direction as a result of the aft direction of the thrust generated by the engine 230. The net-area-tension fastener pattern 142 includes three rows including a first row 146, a second row 150, and a third row 152, with each row including three fastener holes 144. However, as indicated above, a net-area-tension fastener pattern 142 for coupling the engine 230 to the wing assembly 250 may include any number of rows (greater than one) and any number of fastener holes 144 (greater than one) in each row. In FIGS. 23-24, each of the rows is oriented generally perpendicular to the primary load direction 136 of the load 134 applied by the engine 230 attach fitting to the wing assembly 250.

Figure 25:
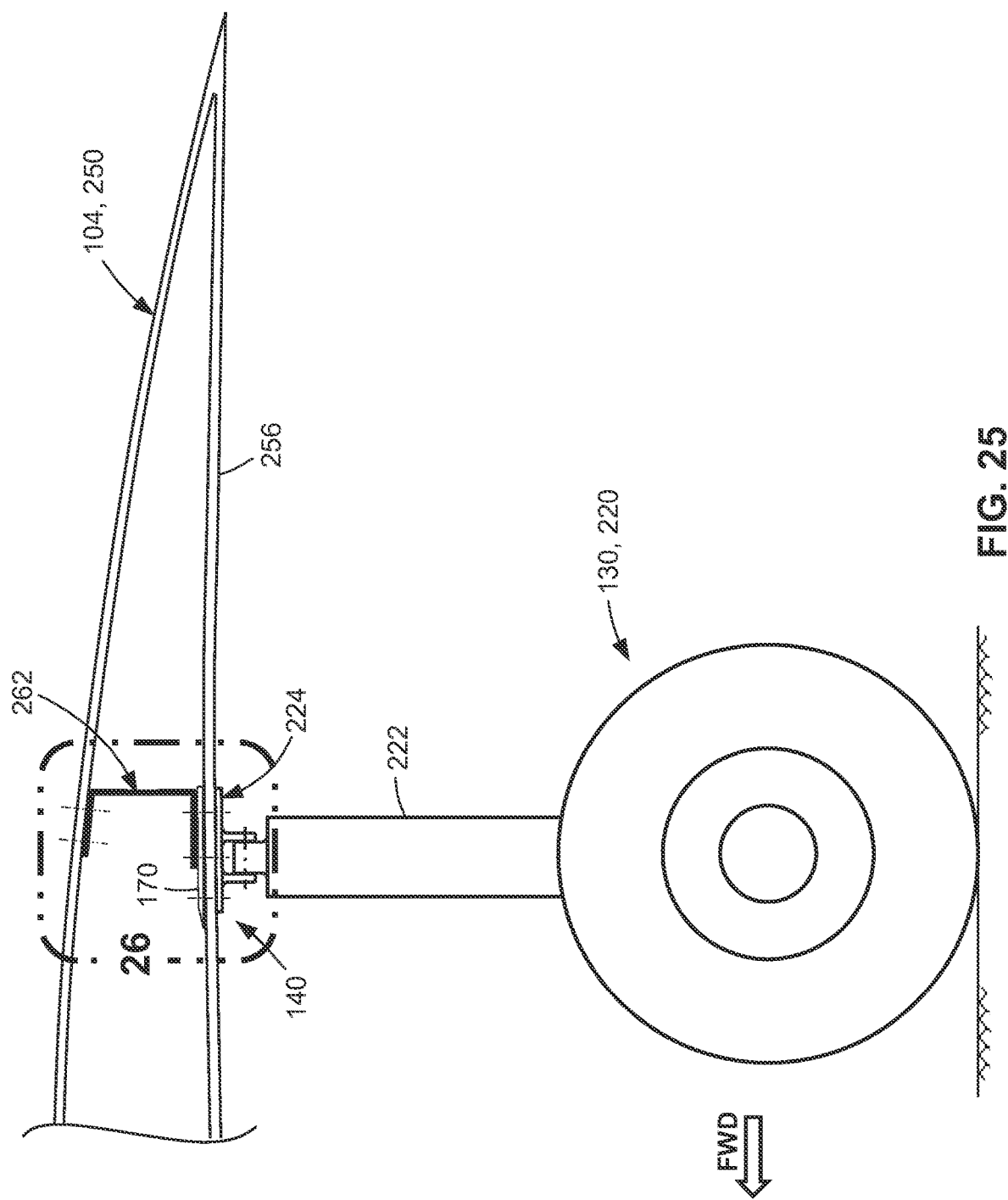
FIG. 25 is a sectional view of the aircraft taken along line 25-25 of FIG. 1 and illustrating an example of a landing gear coupled to the wing assembly via a net-area-tension joint.
Figure 26:
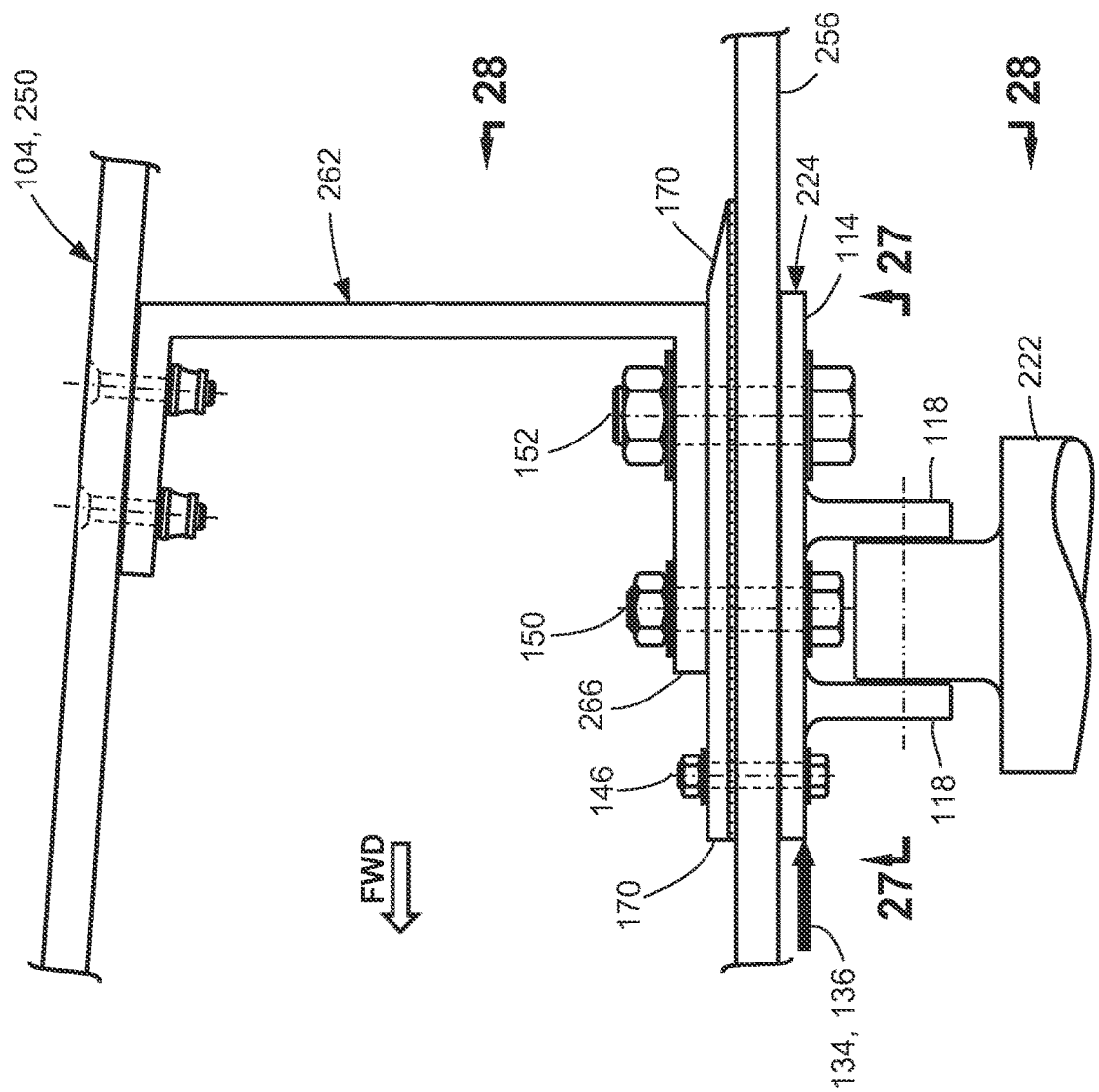
FIG. 26 is a magnified view of the portion of the wing assembly identified by reference numeral 26 of FIG. 25 and illustrating an example of a landing gear attach fitting incorporating a net-area-tension fastener pattern for joining the landing gear to the wing assembly.

Referring to FIGS. 25-29, shown is an example of a net-area-tension joint 140 coupling a landing gear 220 (i.e., a main landing gear) to the wing assembly 250. In the example shown, the wing assembly 250 is the aircraft structure 104 and the landing gear 220 is the aircraft component 130 that is being coupled to the aircraft structure 104. Although not shown, the nose landing gear of the aircraft 100 (FIG. 1) may be coupled to the fuselage 106 (FIG. 1) via a net-area-tension joint 140. FIGS. 25-26 show a generally vertically-oriented landing gear strut 222 (e.g., a landing gear trunnion) coupled to the underside of the wing assembly 250. The landing gear 220 may include a landing gear attach fitting 224 mounted on top of the landing gear strut 222. The landing gear attach fitting 224 may include an attach fitting base 114 and one or more attach fitting lugs 118 for coupling to the upper end of the landing gear strut 222.

Figure 27:
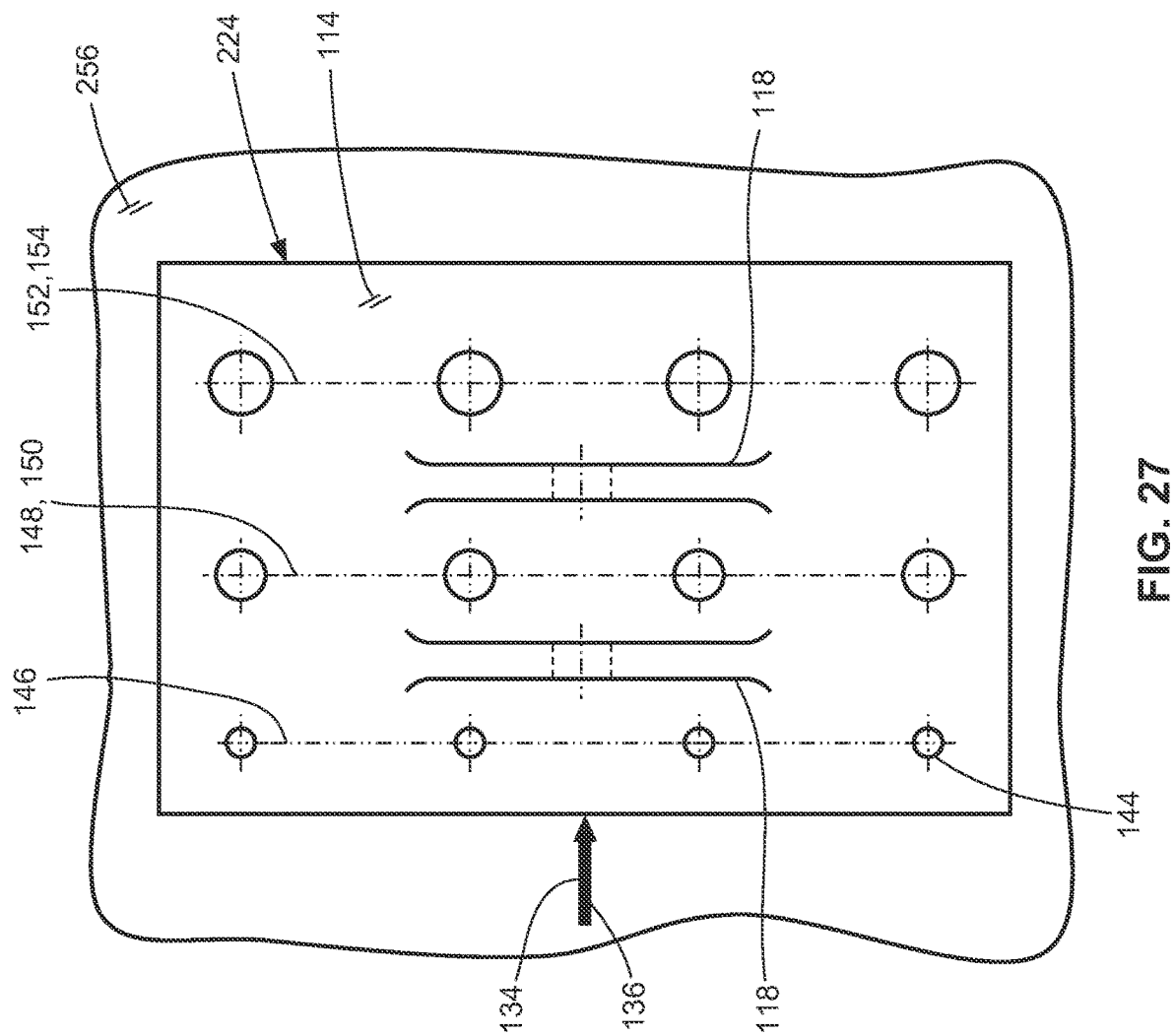
FIG. 27 is a bottom-up view of the landing gear attach fitting of FIG. 28 and illustrating an example of a net-area-tension fastener pattern incorporated into the attach fitting base.
Figure 28:
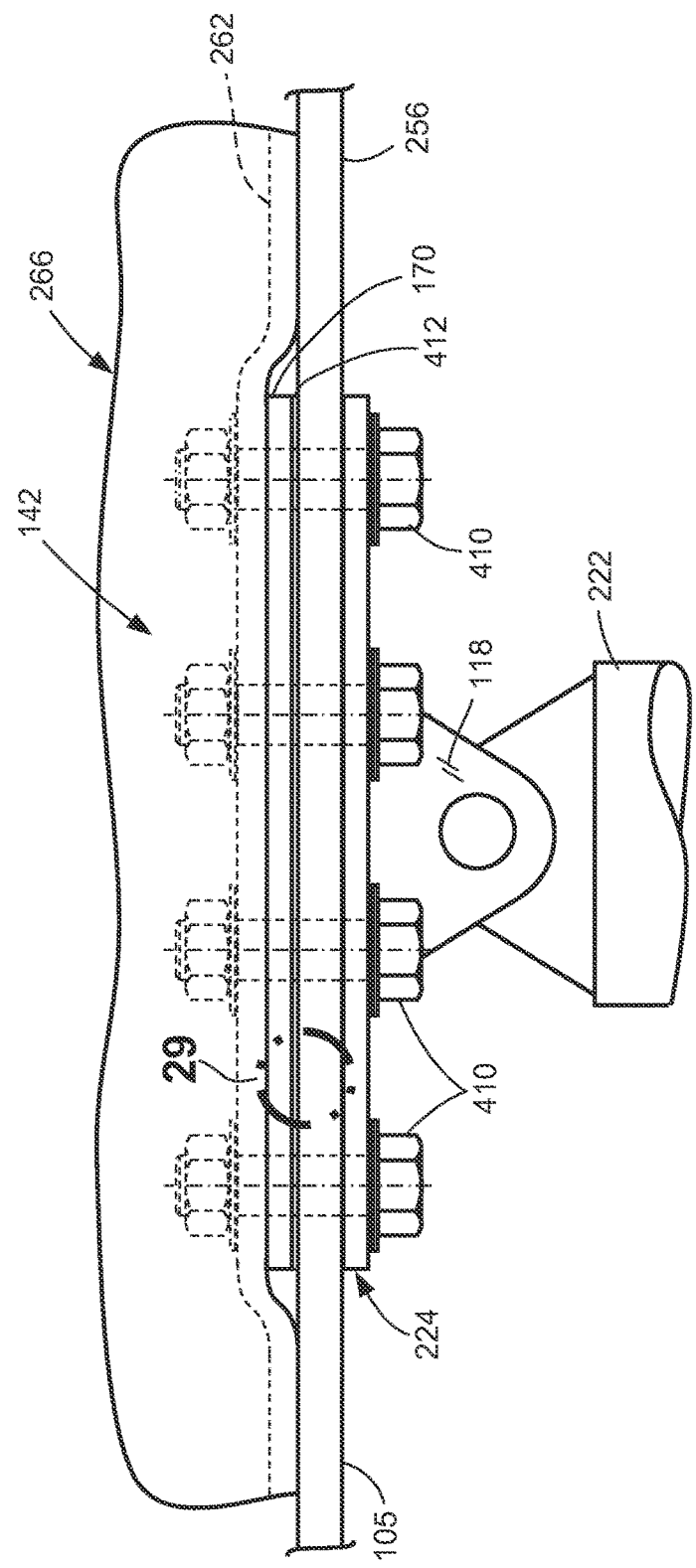
FIG. 28 is a forward-looking view of the landing gear attach fitting taken along line 28-28 of FIG. 26 and illustrating an example of the attach fitting base fastened to the wing assembly skin panel and rear spar via the net-area-tension fastener pattern.

In FIGS. 26-28, the primary load direction 136 of the load 134 that the landing gear attach fitting 224 applies to the wing assembly 250 may be generally aligned with the longitudinal axis 102 (FIG. 1) of the aircraft 100 (FIG. 1) and may be pointed in an aft direction. The load 134 applied by the landing gear attach fitting 224 on the wing assembly 250 may be the result of loads generated when the landing gear 220 wheels are moving along a runway surface during taxiing, takeoff, and/or landing of the aircraft 100. In the example shown, the fastener holes 144 of the net-area-tension fastener pattern 142 extend through the attach fitting base 114, and into the wing assembly skin panel 256, the internal doubler 170, and the spar flange 266 of the wing assembly rear spar 262. However, the net-area-tension fastener pattern 142 may extend into alternative types of internal structural members 180 of the wing assembly 250 such as the wing ribs (not shown), and is not limited to extending into the wing assembly rear spar 262.

The net-area-tension fastener pattern 142 includes three rows of fastener holes 144 including a first row 146, a second row 150 (i.e., intermediate row 148), and a third row 152 (i.e., the last row 154). As mentioned above, each of the rows is oriented generally perpendicular to the primary load direction 136. The first row 146 of fastener holes 144 have the smallest diameter, the third row 152 of fastener holes 144 have the largest diameter, and the second row 150 of fastener holes 144 have a diameter that is greater than the diameter of the fastener holes 144 of the first row 146, and less than the diameter of the fastener holes 144 in the last row 154.

FIG. 29 is a magnified view of the composite plies 420 at the interface between the wing assembly skin panel 256 and the internal doubler 170 which may be bonded to each other. For example, the internal doubler 170 may be bonded to the wing assembly skin panel 256 via co-bonding, or via secondary bonding using an adhesive layer 412. As mentioned above, the wing assembly skin panel 256 and the doubler 170 may each be configured as a laminate of composite plies 420. In the example shown, the doubler 170 and the wing assembly skin panel 256 may each include one or more 0-degree plies 428 at the interface between the doubler 170 and the wing assembly skin panel 256. Each 0-degree ply 428 may include fibers that are aligned with or are parallel to the primary load direction 136. The 0-degree plies 428 may improve the shear strength of the doubler 170 and wing assembly skin panel 256, and may facilitate the transfer of the load 134 from the doubler 170 into the wing assembly skin panel 256.

Referring to FIGS. 30-32, shown is an example of the implementation of one or more net-area-tension joints 140 for coupling a store mounting mechanism 400 to an underside of a wing assembly 250. In the example shown, the wing assembly 250 is the aircraft structure 104 and the store mounting mechanism 400 is the aircraft component 130 that is being coupled to the aircraft structure 104. In FIGS. 30-32, the store mounting mechanism 400 comprises a store pylon 404 configured to releasably support one or more stores (not shown) such as ordnance (e.g., missiles, rockets, flares, etc.), gun pods (e.g., canons), auxiliary fuel tanks, or any one of a variety of other types of stores. The store pylon 404 may include one or more store attach fittings 402 each configured to be fastened to the wing assembly 250 at a net-area-tension fastener pattern 142 formed in the wing assembly skin panel 256. As shown in FIG. 30, the store pylon 404 may be coupled to the wing assembly 250 via multiple store attach fittings 402.

Referring to FIGS. 31-32, the primary load direction 136 of the load 134 that each store attach fitting 402 applies to the wing assembly 250 may be generally aligned with the longitudinal axis 102 (FIG. 1) of the aircraft 100 (FIG. 1) and may be pointed in an aft direction. The load 134 applied by the store attach fittings 402 on the wing assembly 250 may be the result of aerodynamic drag on the stores and the store pylon 404 during flight. In the example shown, the net-area-tension fastener pattern 142 of each store attach fitting 402 may extend through the attach fitting base 114, and into the wing assembly skin panel 256, and, optionally, into an internal doubler 170 an/or and internal structural member 180 of the wing assembly 250. In the example shown, the internal structural member 180 may comprise a structural element of the wing assembly 250, such as a wing assembly front spar 260, a wing assembly rear spar (not shown), and/or a wing rib (not shown).

Referring still to FIG. 31-32, in the example shown, the net-area-tension fastener pattern 142 in the store attach fitting 402 includes two rows of fastener holes 144 including a first row 146 and a last row 154. Each row includes two fastener holes 144. As mentioned above, the row centerlines 162 are oriented generally perpendicular to the orientation of the primary load direction 136. Similar to the above-described net-area-tension fastener patterns 142 for attaching other types of aircraft components 130 to the wing assembly 250, the first row 146 of fastener holes 144 have a smaller diameter than the last row 154 of fastener holes 144. In addition, the first row of fastener holes 144 are located upstream of the last row 154 relative to the primary load direction 136.

Referring now to FIGS. 33-36, shown is an example of a composite wing assembly 250 in a multi-piece configuration, including a one-piece center wing structure 300 and a pair of outer wing structures 360. The outer wing structures 360 are configured to be removably coupled to the center wing structure 300 respectively at the center wing outboard ends 314. As described below, the center wing structure 300 may be configured as a relatively stiff structure to accommodate several highly-loaded major joints for attaching relatively heavy aircraft components 130 to the center wing structure 300. Examples of heavy aircraft components 130 that may be joined to the center wing structure 300 include the landing gear 220 (FIG. 25), the engines 230 (FIG. 22), and the fuselage 106 (FIG. 1). Advantageously, the center wing structure 300 may incorporate one or more of the above-described examples of the net-area-tension joint 140 (e.g., FIGS. s2, 22 and 25) for attaching one or more of the above-described aircraft components 130 in a structurally efficient manner.

The center wing structure 300 may have center wing upper and lower skin panels 328, 330, which may each be manufactured to have a substantially constant skin thickness 258, and which may simplify the manufacturing by avoiding the above-mentioned challenges associated with panel warpage and interlaminar stresses in conventional skin panels that are thickened with heavy, thick padup regions (not shown) at locations of major joints. Advantageously, manufacturing the center wing upper and lower skin panels 328, 330 to have a constant skin thickness 258 facilitates the use of structurally-efficient net-area-tension joints 140. As described above, the center wing upper and lower skin panels 328, 330 may be locally reinforced with easily installable internal doublers 170 (e.g., FIGS. 4, 20, 23, and 26) to locally increase the skin thickness 258 at the location of net-area-tension joints 140.

As described below, the substantially constant-thickness center wing upper and lower skin panels 328, 330 may be stiffened (i.e., in the spanwise direction) with discrete stiffening elements referred to herein as planks 340 (FIGS. 41-42. The combination of the planks 340 and each skin panel defines a plank-skin assembly 352. Advantageously, planks 340 have a relatively low profile or height, resulting in the planks 340 and associated center wing upper and lower skin panels 328, 330 each having a combined area centroid 356 (FIG. 42) that is nearer to the skin panel inner surface than the combined area centroid of conventional stringers (e.g., hat stringers—now shown) and associated center wing upper and lower skin panels. As described in greater detail below, the result of the area centroid 356 of each plank-skin panel assembly 352 being relatively close to the skin panel inner surface results in a larger wing effective thickness 357 than the wing effective thickness of a wing assembly that uses conventional stringers. Advantageously, a large wing effective thickness 357 results in an increase in the bending load-carrying capability of the center wing structure 300.

Referring still to FIGS. 33-36, shown in FIGS. 33-34 is the wing assembly 250 in an assembled state (FIG. 33), and in a disassembled state (FIG. 34). As mentioned above, the center wing structure 300 includes a pair of center wing outboard ends 314 and a pair of engine mounting locations 231 respectively on opposite sides of the wing centerline 253. The center wing structure 300 includes a center wing front spar 302 and a center wing rear spar 304 each formed of composite material and having a spar terminal end 306 at each of the center wing outboard ends 314.

Each one of the outer wing structures 360 includes an outer wing front spar 362 and an outer wing rear spar 364 each formed of composite material and configured to be coupled respectively to the center wing front spar 302 and the center wing rear spar 304 to define a wing joint 320 coupling the outer wing structure 360 to the center wing structure 300. The center wing structure 300 is configured such that the spar terminal ends 306 of the center wing front spar 302 and the center wing rear spar 304 at each wing joint 320 are located no further inboard than a vertical plane (not shown) coincident with the engine centerline 232 associated with the engine mounting location 231, and no further outboard of the engine centerline 232 that a wing joint maximum outboard distance 322 (FIG. 35), which is defined as 10 percent of the distance between the engine centerline 232 and a vertical plane (not shown) coincident with the wing centerline 253. The engine centerline 232 may be generally parallel to the wing centerline 253 when the aircraft 100 (FIG. 1) is viewed from a top-down perspective, and the distance between the engine centerline 232 and the wing centerline 253 may be measured perpendicular to the respective vertical planes.

Although FIGS. 33-36 show each wing joint 320 as defining a straight line from the wing leading edge to the wing trailing edge, and also showing each wing joint 320 as being substantially perpendicular (e.g., within 20 degrees) to the center wing front spar 302 and/or the center wing rear spar 304, the wing assembly 250 may be configured such that each wing joint 320 has a non-straight shape (not shown) from the wing leading edge to the wing trailing edge. For example, the portion of the wing joint 320 from the wing leading edge to the front spars may be parallel to the aircraft longitudinal axis 102. The wing joint 320 may be described as a field joint in which each outer wing structure 360 may be removable and replaceable at a maintenance facility, as distinguished from a permanent joint manufactured at an aircraft production facility. Further in this regard, each wing joint 320 may be configured such that each outer wing structure 360 may be removable from the center wing structure 300 via the removal of a plurality of mechanical fasteners 410 (FIG. 40), as described below.

Figure 35:
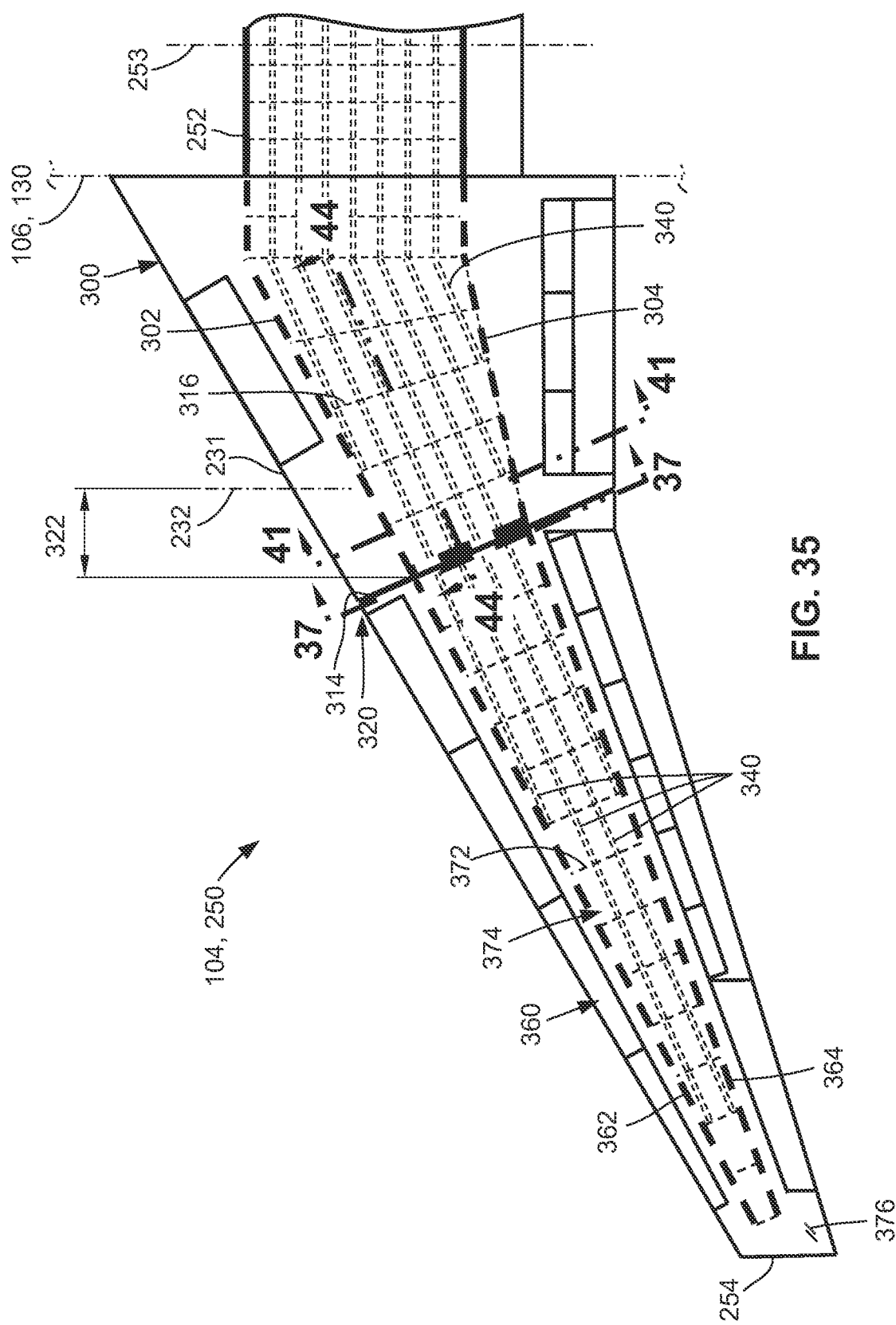
FIG. 35 is a plan view of an outer wing structure joined to the center wing structure at a wing joint.

The center wing structure 300 may include a center wing box 252 having one or more net-area-tension joints 140 as described above for coupling the fuselage 106 (i.e., the aircraft components 130—FIG. 35) to the wing assembly 250 (i.e., the aircraft structure 104—FIG. 35). In some examples, the center wing front spar 302 and the center wing rear spar 304 may extend continuously between the center wing outboard ends 314. Advantageously, by providing the wing assembly 250 in a multi-piece configuration having three major structural components (e.g., the center wing structure 300, and the two outer wing structures 360), each wing structure may be configured to accommodate the specific design criteria and loading conditions to which it will be subjected. For example, as mentioned above, the center wing structure 300 may be configured as a relatively stiff structure to accommodate highly loaded net-area-tension joints 140 for attaching the heavy aircraft components 130 such as the fuselage 106 (FIG. 2), the landing gear 220 (FIG. 25), and the engines 230 (FIG. 22) to the wing center structure 300. In contrast, the outer wing structures 360 may be moderately loaded and may be devoid of highly loaded joints, and may therefore be configured as relatively flexible structures for accommodating the dynamic loads associated with aeroelasticity performance requirements. The relatively flexible configuration of the outer wing structures 360 may result in a reduction in the structural mass of the wing assembly 250 relative to the structural mass of conventional wings.

Referring to FIGS. 36-40, the center wing structure 300 may include a plurality of center wing ribs 316 formed of composite material and each extending between the center wing front spar 302 and the center wing rear spar 304, and located at spaced intervals along the spanwise direction of the center wing structure 300. A plurality of center wing bays 326 are respectively defined between adjacent pairs of the center wing ribs 316. The center wing ribs 316 may include a center wing stout rib 318 at each of the center wing outboard ends 314 for accommodating the wing joint 320 between and outer wing structure 360 and the center wing structure 300, as described in greater detail below.

As mentioned above, the center wing structure 300 may include a center wing upper skin panel 328 and a center wing lower skin panel 330 each formed of composite material and coupled to the center wing front spar 302, the center wing rear spar 304, and the center wing ribs 316. The center wing upper skin panel 328 and the center wing lower skin panel 330 may each be comprised of acreage plies 422, which may be described as composite plies 420 that extend continuously in the chordwise direction from the center wing front spar 302 to the center wing rear spar 304, and continuously in the spanwise direction. For example the center wing upper skin panel 328 and/or the center wing lower skin panel 330 may extend at least from the location of the fuselage side to the center wing stout rib 318. As mentioned above, the front spars, the rear spars, and the wing ribs of the center wing structure 300 and/or the outer wing structures 360 may be comprised primarily of fabric plies. The center wing upper and lower skin panels 328, 330 and/or the outer wing upper and lower skin panels 376, 378 may be comprised primarily of unidirectional plies.

The acreage plies 422 define the skin thickness 258 (FIG. 38) of the center wing upper and lower skin panels 328, 330 and the outer wing upper and lower skin panels 376, 378 (FIG. 38). The skin thickness 258 of the acreage plies 422 of the center wing structure 300 and/or the outer wing structures 360 may be substantially constant (e.g., within 20 percent of each other at any spanwise location) which may simplify manufacturing of the skin panels by eliminating the need to incorporate ply drops (not shown) in the acreage plies 422 for gradually reducing the bending stiffness of the wing assembly 250 along the outboard direction.

Figure 36:
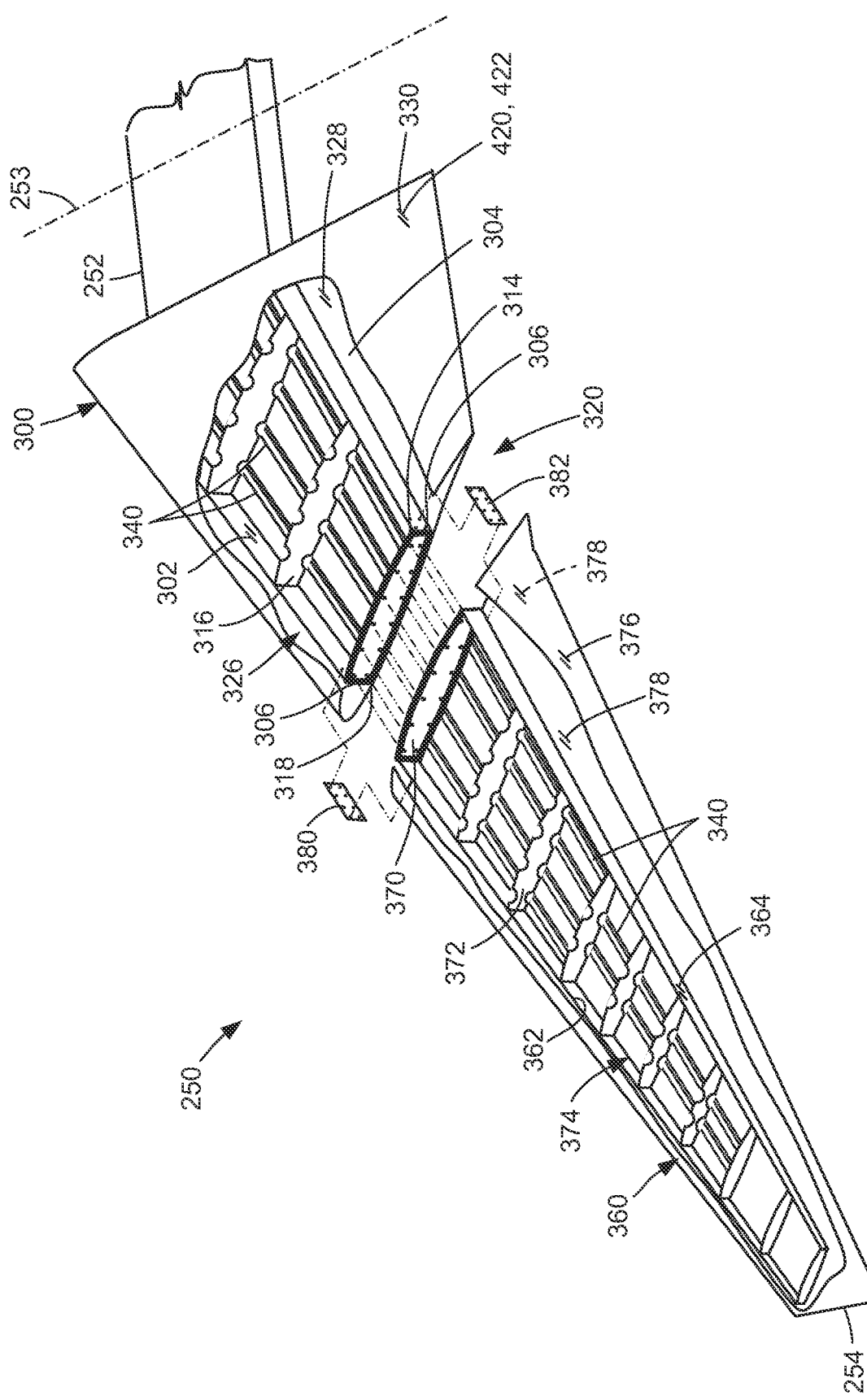
FIG. 36 is a partially cutaway perspective view of an outer wing structure separated from the center wing structure.

As shown in FIGS. 33-36, each outer wing structure 360 may include a plurality of outer wing ribs 372 each formed of composite material and extending between the outer wing front spar 362 and the outer wing rear spar 364. The outer wing ribs 372 may be located at spaced intervals along a spanwise direction and may define a plurality of outer wing bays 374 respectively between adjacent pairs of the outer wing ribs 372. The outer wing ribs 372 may include an outer wing stout rib 370 located at the outer wing inboard end 368. The outer wing stout rib 370 may be mechanically coupled in back-to-back arrangement (e.g., FIG. 40) with the center wing stout rib 318 at the wing joint 320 for attaching the outer wing structure 360 to the center wing structure 300. The outer wing stout rib 370 may be formed of metallic material to provide a strength capability that is higher than the strength capability of the remaining outer wing ribs 372. The increased strength capability of the outer wing stout rib 370 may facilitate the transfer loads between the outer wing structure 360 and the center wing structure 300. The outer wing front spar 362 and outer wing rear spar 364 may extend continuously between the outer wing stout rib 370 and the wing tip 254. The outer wing front spar 362 and the outer wing rear spar 364 of each outer wing structure 360 may be coupled respectively to the center wing front spar 302 and the center wing rear spar 304 at the wing joint 320 via a front spar splice plate 380 (FIGS. 36-38) and a rear spar splice plate 382 (FIG. 36-30).

The outer wing upper skin panel 376 (FIG. 36) and outer wing lower skin panel 378 (FIG. 36) may be coupled to the outer wing front spar 362, the outer wing rear spar 364, and the outer wing ribs 372 via bonding and/or mechanical fastening. As described above, the outer wing upper skin panel 376 and outer wing lower skin panel 378 may be comprised of acreage plies 422 which may extend continuously in a chordwise direction between the outer wing front spar 362 and outer wing spar, and continuously in a spanwise direction between the outer wing stout rib 370 and the wing tip 254. The skin thickness 258 of the acreage plies 422 of the outer wing upper and lower skin panels 376, 378 may be substantially constant, and may be significantly thinner (e.g., at least 25 percent) than the skin thickness 258 of the acreage plies 422 of the center wing upper and lower skin panels 328, 330. The relatively thin gauge of the outer wing upper and lower skin panels 376, 378 may improve the fatigue loading performance or durability of the skin panels relative to the fatigue loading performance of aluminum skin panels of conventional wings. Furthermore, the relatively thin gauge of the acreage plies 422 of the outer wing upper and lower skin panels 376, 378 may minimize or avoid the potential for interlaminar failure between the acreage plies 422. The skin thickness 258 of the outer wing upper and lower skin panels 376, 378 may be selected to provide the desired level of stiffness and stability, while being resistant to aerodynamic flutter. The minimum skin thickness 258 may be dictated by flammability requirements of the Federal Aviation Administration (FAA). For example, the center wing upper and lower skin panels 328, 330 and the outer wing upper and lower skin panels 376, 378 may each have a minimum of 32 composite plies 420, resulting in a skin thickness 258 that provides a level of structural integrity in compliance with FAA flammability requirements.

Referring to FIGS. 37-40, shown in FIG. 37 is a sectional view of the center wing structure 300 at the location of the center wing stout rib 318. FIG. 38 shows a forward portion of the center wing stout rib 318 coupled to the center wing front spar 302. FIG. 39 shows an aft portion of the center wing stout rib 318 coupled to the center wing rear spar 304. As shown in FIGS. 38-39, the center wing front spar 302 and the center wing rear spar 304 may each have a channel-shaped cross-section comprised of a spar web 264 interconnecting upper and lower spar outer flanges 310. In the example shown, each spar 302, 304 may have a multi-piece configuration comprising upper and lower spar chords 308 formed as individual components, and interconnected (e.g., via mechanical fasteners 410) by a spar web 264. Each spar chord 308 may have an L-shaped cross-section defined by a spar outer flange 310 and a spar inner flange 312 interconnected by a radius portion (not shown). However in other examples not shown, each spar may be formed as a unitary structure.

Referring still to FIGS. 38-39, shown also is an example of a splice configuration of the front spar splice plate 380 (FIG. 38) and rear spar splice plate 382 (FIG. 39) for respectively coupling (e.g., via mechanical fasteners 410) the spar terminal ends 306 of the front and rear spars 362, 364 (FIG. 36) of the outer wing structure 360 (FIG. 36) to the spar terminal ends 306 of the front and rear spars 302, 304 (FIG. 36) of the center wing structure 300. In the examples shown, each one of the splice plates 380, 382 may have a channel-shaped cross section having a splice web 384 interconnecting an opposing pair of splice flanges 386. The channel-shaped cross-section of each splice plate 380, 382 may be configured to nest inside the channel-shaped cross-section of the spars 302, 304, 362, 364. The splice web 384 of each splice plate 380, 382 may be horizontally oriented and may be placed in contact with the spar web 264 and/or spar inner flanges 312 of the spars 302, 304, 362, 364. The splice flanges 386 on the upper and lower sides of each splice plate 380, 382 may be placed in contact with the spar outer flanges 310 of the spars 302, 304, 362, 364. However, in other examples, the splice plates 380, 382 may be coupled to only the spar webs 264 of the spars 302, 304, 362, 364. In a still further example, instead of being nested inside the channel-shaped cross-sections of the spars 302, 304, 362, 364, the splice plates 380, 382 may be mounted on the outside of the spars 302, 304, 362, 364, which may be nested inside the splice plates 380, 382. Even further, instead of each splice plate 380, 382 being a unitary structure, one or both of the splice plates 380, 382 may have a multi-piece configuration, including a web splice plate (not shown) for interconnecting only the spar webs 264 of the spars 302, 304, 362, 364, a set of upper flange splice straps (not shown) for interconnecting the upper spar flanges of the spars 302, 304, 362, 364, and a set of lower flange splice straps (not shown) for interconnecting the lower spar flanges of the spars 302, 304, 362, 364. The mechanical coupling of the splice plates 380, 382 to the spars 302, 304, 362, 364 allows for field removal and/or replacement of an outer wing structure 360 from the center wing structure 300.

The center wing ribs 316 may be mechanically fastened to the center wing front spar 302 and center wing rear spar 304. At each wing joint 320, the center wing stout rib 318 may also be mechanically coupled to the front spar splice plate 380 and the rear spar splice plate 382. As mentioned above, the center wing upper and lower skin panels 328, 330 may be mechanically fastened and/or bonded to the center wing front spar 302, the center wing rear spar 304, and the center wing ribs 316.

Referring still to FIGS. 37-40, the outer wing front spar 362 and the outer wing rear spar 364 may be configured similar to the center wing front spar 302 and center wing rear spar 304. In addition, the outer wing stout rib 370 may be configured similar to the center wing stout rib 318. As mentioned above, the center wing stout rib 318 and the outer wing stout rib 370 may be formed of metallic material to provide a strength capability that is higher than the strength capability of the remaining wing ribs 268. For example, the center wing stout rib 318 and the outer wing stout rib 370 may each may be formed of steel, titanium or other high-strength alloy that is compatible with the composite material of the remaining wing ribs, spars, and skin panels of the center wing structure 300 and outer wing structure 360. However, the stout ribs 318, 370 may alternatively be formed of composite material.

As shown in FIG. 40, the center wing stout rib 318 and outer wing stout rib 370 may each have a channel-shaped cross-section defined by a rib web 270 interconnecting upper and lower rib flanges 272, although the stout ribs 318, 370 may be provided with alternative cross-sectional shapes. The rib webs 270 of the stout ribs 318, 370 may include matching hole patterns for receiving removable mechanical fasteners 410 (i.e., tension fasteners) for joining the center wing stout rib 318 to the outer wing stout rib 370 when the rib webs 270 are placed in back-to-back arrangement. When joined together, the center wing stout rib 318 and the outer wing stout rib 370 provide a path for the transfer of at least a portion of the loads from the outer wing structure 360 to the center wing structure 300, in addition to the load path provided by the front and rear spar splice plates 380, 382 joining the spars 362, 364 of the outer wing structure 360 to the spars 302, 304 of the center wing structure 300, as shown in FIGS. 37-39 and described above.

In addition to transferring loads across the wing joint 320, the center wing stout rib 318 and outer wing stout rib 370 may additionally accommodate differences in the bending stiffness of the outer wing structure 360 relative to the bending stiffness of the center wing structure 300. For example, for an aircraft 100 having high-aspect-ratio wings that are relatively shallow and which have a relatively short wing chord, the outer wing structure 360 may be moderately loaded such that structural sizing of the components of the outer wing structure 360 are based on dynamic loads, which are a function of mass and stiffness. The outer wing structure 360 may be generally flat and straight and may have less bending stiffness than the center wing structure 300 for complying with aeroelastic performance requirements, as mentioned above. In contrast, the center wing structure 300 may be highly-contoured and the net area-tension joints may be highly-loaded by heavy aircraft components 130 such as the fuselage 106 (FIG. 2), the engines 230 (FIG. 22), the landing gear 220 (FIG. 25), and/or other aircraft components 130.

Figure 41:
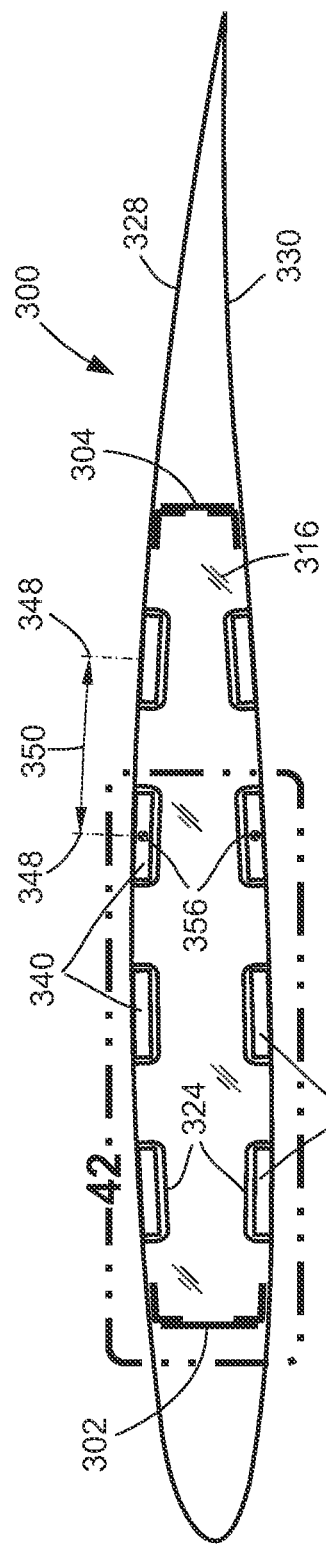
FIG. 41 is a sectional view of the center wing structure taken along line 41-41 of FIG. 35 and illustrating an example of a center wing upper skin panel and a center wing lower skin panel each stiffened by a plurality of planks bonded to the inner surfaces of the skin panels.
Figure 42:
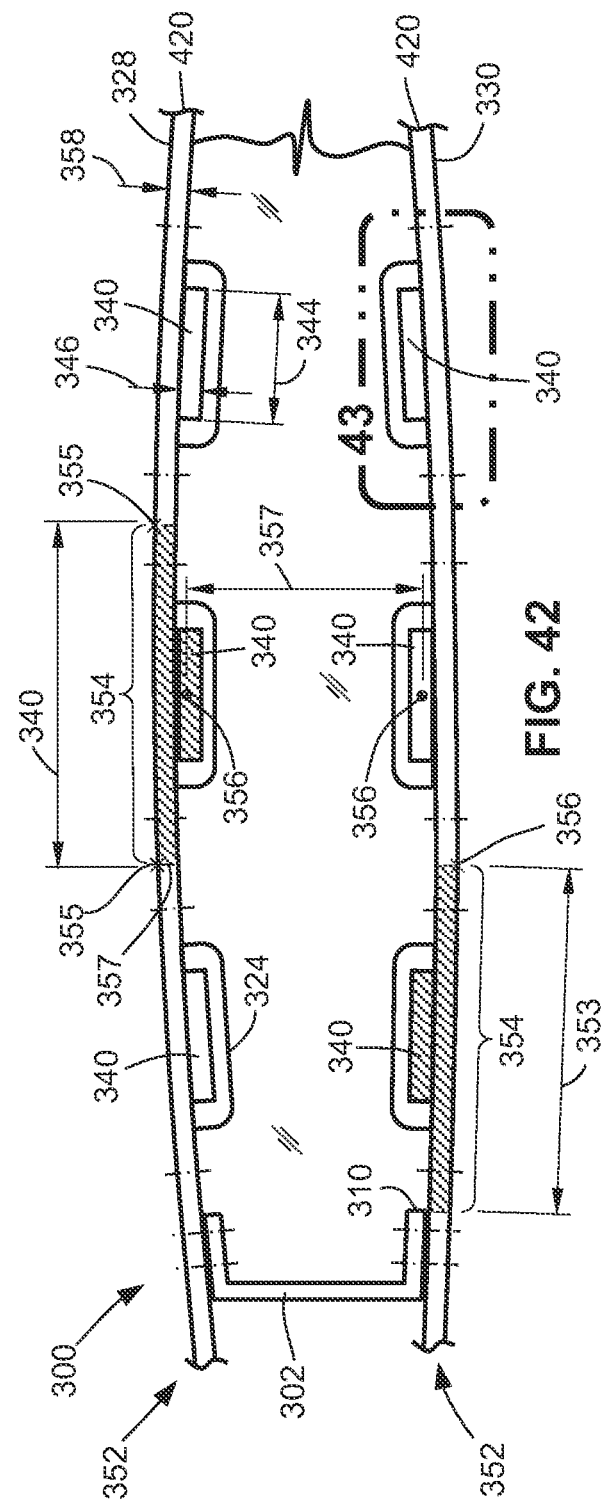
FIG. 42 is a magnified view of the portion of the center wing structure identified by reference numeral 42 of FIG. 41 and illustrating rib cutouts formed in a center wing rib to allow for passage of the planks through the center wing rib.

Referring to FIGS. 41-44, shown in FIG. 41 is a sectional view of the center wing structure 300 showing an example of a plurality of discrete stiffening elements referred to as planks 340 which are bonded to the inner surface of the center wing upper skin panel 328 and the center wing lower skin panel 330. Each one of the planks 340 comprises a stack of plank plies 342 (FIG. 43). Each plank ply 342 may be a unidirectional ply. The plank plies 342 in each plank 340 are narrower than the acreage plies 422 (FIG. 43) of the center wing upper and lower skin panels 328, 330. The planks 340 each extend in a spanwise direction. For example, one or more of the planks 340 may extend from the location of the fuselage side (e.g., a side of the center wing box 252) to the center wing stout rib 318 (FIG. 35). As shown in FIGS. 41-42, the center wing ribs 316 may include rib cutouts 324 to allow the planks 340 to pass through the center wing ribs 316. In an alternative example not shown, the rib flanges 272 (not shown) of the center wing ribs 316 may be locally contoured to match the outer geometry of the planks 340.

As shown in the figures, the planks 340 are spaced apart from each other in a chordwise direction. For example, each plank 340 has a plank centerline 348 extending along a lengthwise direction of the plank 340. The planks 340 may be spaced apart from each other at a chordwise spacing 350 (FIG. 41) of from 6-11 inches between the plank centerlines 348. More preferably, the planks 340 are spaced apart at a chordwise spacing 350 of from 8-10 inches. However, in other examples, the chordwise spacing 350 between the planks 340 may be less than 6 inches or more than 11 inches. The chordwise spacing 350 between the planks 340 is preferably uniform in order to maintain a uniform chordwise mass distribution of the center wing structure 300.

As shown in FIGS. 41-42, the planks 340 advantageously have a relatively low profile, resulting in the planks 340 and each skin panel (i.e., the plank-skin panel assembly 352) having a combined plank-skin area centroid 356 that is nearer to the inner surface of the skin panel than the combined area centroid associated with conventional stringers (e.g., hat stringers—not shown) due to the relatively high profile (e.g., large web height) of conventional stringers. Although the plank-skin area centroid 356 of a plank-skin panel assembly 352 is based on the cross-sectional area of all the planks 340 (on a skin panel) combined with the cross-sectional area of the skin panel between the front spar and the rear spar, in FIG. 42 for purposes of the present discussion, the plank-skin area centroid 356 of each plank-skin panel assembly 352 (i.e., upper and lower) is represented by the plank-skin portion cross-sectional area 354, which includes the cross-sectional area of a single plank 340 (i.e., the cross-hatched plank) combined with the cross-sectional area of a portion of the skin panel extending from each side of the cross-hatched plank 340. The width of the cross-hatched portion of the skin panel extends between the midpoints 355 respectively located between the cross-hatched plank 340 and the plank 340 on immediately opposite sides of the cross-hatched plank 340. The result of the plank-skin area centroid 356 being near the inner surface of the skin panel is a larger wing effective thickness 357 than the wing effective thickness of a wing assembly that uses conventional stringers for stiffening the skin panels. A larger wing effective thickness 357 corresponds to an increase in the bending load-carrying efficiency of the center wing structure 300.

Referring to FIG. 43, shown is an example of a plank 340 bonded to the inner surface of the center wing lower skin panel 330. Each plank 340 may be comprised of between 1-70 plank plies 342. Although FIG. 43 shows an example of a plank 340 having 12 plank plies 342, a skin panel 328, 330 may include one or more planks 340 each containing any number of plank plies 342. For example, a plank 340 may contain between 10-70 plank plies 342. As noted below, the quantity of plank plies 342 in a plank 340 may be dictated by the stiffness requirement at the spanwise location of the skin panel 328, 330. As mentioned above, the plank plies 342 may be unidirectional plies, which may include a combination of 0-degree plies 428 (FIG. 44) and non-0-degree plies. Preferably, the 0-degree plies 428 comprise the largest percentage of the plank plies 342 in each plank 340. The non-0-degree plies may include 90-degree plies, +45-degree plies, −45-degree plies, or other ply orientations. The 0-degree plies 428 have fibers oriented parallel to a lengthwise direction of the plank 340.

Each one of the planks 340 may have a plank width 344 (FIG. 43) of between 3-6 inches. However, a plank 340 may include one or more plank plies 342 having a plank width 344 of less than three inches or greater than 6 inches. In the example of FIG. 43, the plank plies 342 within the plank 340 have the same width, resulting in a rectangular cross-sectional shape for the plank 340. However, in other examples not shown, the plank plies 342 in a plank 340 may have different plank widths 344, and which may result in a non-rectangular cross-sectional shape. For example, a plank 340 may have a trapezoidal cross-sectional shape (not shown).

Referring to FIG. 42, each of the planks 340 may be configured to have a plank bending stiffness (i.e., in the spanwise direction) that is less than a combined plank-skin portion bending stiffness (i.e., in the spanwise direction) of the plank 340 and a skin panel portion 351 (i.e., of the upper skin panel 328 or lower skin panel 330) that is directly attached to and supported by the plank 340. Toward this end, each plank 340 may have a plank bending stiffness that is approximately 40-60 percent of the combined plank-skin portion bending stiffness. More preferably, the plank bending stiffness of each plank 340 is approximately 45-55 percent of the combined plank-skin portion bending stiffness. The plank bending stiffness may be the bending stiffness of the plank 340 at a spanwise location of maximum plank thickness (i.e., providing maximum plank stiffness). However, the plank bending stiffness of a plank 340 may be at any spanwise location along the plank 340. The combined plank-skin portion bending stiffness is the combined stiffness of the plank 340 and the associated skin panel portion 351 as measured at the same spanwise location as where the plank bending stiffness is measured.

Maintaining the plank bending stiffness at between 40-60 percent of the combined plank-skin portion bending stiffness limits the magnitude of peel-off forces in the bondline between the planks 340 and the skin panel 328, 330 to a level that prevents separation of the perimeter edges of the planks 340 from the inner surface of the skin panel 328, 330, while also preventing buckling of the unsupported segment of the skin panel 328, 330 between adjacent pairs of planks 340 when the center wing structure 300 is at limit load (i.e., the maximum load expected during service). The chordwise spacing 350 (FIG. 41) between the planks 340 may be set at a distance such that buckling in the unsupported segment of the skin panel 328, 330 between adjacent planks 340 occurs at or above limit load.

Referring still to FIG. 42, as mentioned above, each plank 340 may have a plank bending stiffness (i.e., in the spanwise direction) that is approximately 40-60 percent of the combined plank-skin portion bending stiffness (i.e., in the spanwise direction). The cross-sectional area of one of the planks 340 and associated skin panel portion 351 is represented by the crosshatched area in the upper skin panel 328 and lower skin panel 330 in FIG. 42, and identified as the plank-skin portion cross-sectional area 354. For planks 340 that are located between a pair of planks 340, the skin panel portion 351 has a panel portion width 353 that extends between midpoints 355 respectively located on opposite sides of the plank 340. Each midpoint 355 is located midway between the edges of adjacent planks 340, as shown in the upper skin panel 328 of FIG. 42. For planks 340 that are located between a spar (e.g., the center wing front spar 302 or the center wing rear spar 304) and another plank 340, the panel portion width 353 extends between the spar outer flange 310 on one side of the plank 340 and, on an opposite side of the plank 340, the midpoint 355 between the edges of the adjacent planks 340, as shown in the lower skin panel 330 of FIG. 42. In each example, the panel portion width 353 of the skin panel portion 351 is centered on the plank 340.

The magnitude of the bending stiffness of a skin panel portion 351 may be dictated at least in part by the ply composition, ply quantity, and ply stacking sequence of the composite plies 420 that make up the skin panel 328, 330, and by the plank-skin portion cross-sectional area 354, which may be a function of the skin thickness 258 and the panel portion width 353 and/or chordwise spacing 350 (FIG. 41). Similarly, the magnitude of the plank bending stiffness of a plank 340 may be dictated at least in part by the ply composition, ply quantity, and ply stacking sequence of the composite plies 420 that make up the plank 340, and also by the size (e.g., plank width 344, plank height 346) of the plank 340.

Referring to FIG. 44, shown is a spanwise sectional view of the center wing lower skin panel 330 showing the substantially constant-thickness acreage plies 422 that make up the skin panel 330. Also shown are the plank plies 342 of the plank 340, and which are bonded to the inner surface of the skin panel. A similar arrangement may be provided for the center wing upper skin panel 328. As shown in FIG. 44, the plank 340 has a plank thickness that may be tapered in a spanwise direction for reducing the plank stiffness. In this regard, the planks 340 in the center wing structure 300 may include a ply drop 358 in one or more of the plank plies 342 as a means for gradually reducing the bending stiffness of the skin panel 330 along the spanwise direction. The spanwise locations of the ply drops 358 may be selected to create a desired bending stiffness profile of the skin panel 330 along the spanwise direction, and may be based on predicted loads on the outer wing structures 360 (e.g., aerodynamic wing loading) during flight. Although not shown, one or more of the planks 340 may include a plank thickness that is substantially constant along the spanwise direction. Preferably, the planks 340 mounted to a skin panel 328, 330 have the same configuration (e.g., same width, same cross-sectional shape, same ply stackup, and/or same material composition) to simplify manufacturing and/or to maintain uniformity in the chordwise mass distribution of the center wing structure 300.

Referring briefly to FIGS. 35-36, in some examples, the outer wing structure 360 may include planks 340 on the outer wing upper skin panel 376 and/or on the outer wing lower skin panel 378. The planks 340 of the skin panels 376, 378 of the outer wing structure 360 may be configured similar to the arrangement of the planks 340 on the skin panels 328, 330 of the center wing structure 300. However, as indicated above, the planks 340 the skin panels 376, 378 of the outer wing structure 360 may have a reduced plank bending stiffness relative to the plank bending stiffness of planks 340 of the center wing structure 300 due to increased aeroelasticity requirements of the outer wing structure 360. Although FIG. 35 shows the planks 340 of the outer wing structure 360 aligned with the planks 340 of the center wing structure 300, the planks 340 may optionally be misaligned. Although not shown, the outer wing structure 360 may include one or more fuel tanks for supplying fuel to the engines 230. In some examples, the planks 340 in the outer wing structure 360 may be terminated at (or inboard of) the outermost end of the outermost fuel tank in the outer wing structure 360. For example, each outer wing structure 360 may be devoid of planks 340 outboard of a vent tank (not shown) that may be included in an outboard portion of the outer wing structure 360.

In some examples, the skin panels 328, 330, 376, 378 of the center wing structure 300 and/or the outer wing structures 360 may include stringers (not shown) mounted on top of the planks 340 to increase the stiffness of the skin panels 328, 330, 376, 378. Each stringer may extend along the spanwise direction and may be as long as, or shorter than, the length of the plank 340 on which they are mounted. Such stringers may be provided as blade stringers having a single stringer flange and a single stringer web protruding from the stringer flange. However, the stringers may be provided in alternative cross-sectional shapes, such as a hat-section stringer.

Referring to FIGS. 45-49, shown in FIG. 45 is an example of a turbine incorporating one or more net-area-tension joints 140 as disclosed herein. In the example shown, the turbine is a wind turbine 470 as may be used for generating electricity. The wind turbine 470 may include a plurality of blades 472 each coupled to a central blade hub 478. The blades 472 and blade hub 478 may be rotatably coupled to a generator (not shown for generating electricity during rotation of the blades 472 as a result of airflow (i.e., wind) flowing over the blades 472.

FIG. 46 is a side view of an example of one of the blades 472 attached to the central blade hub 478. The blade 472 has a blade axis 476 (FIG. 47) extending along a lengthwise direction of the blade 472. The blade 472 has a blade skin panel 474 which defines the outer contour of the blade 472. In the example shown, the blade skin panel 474 may be formed of composite material, and may be the primary load-carrying structure of the blade 472. During rotation of the blade 472, aerodynamic pressure on the blade 472 may be transferred by the blade skin panel 474 into the blade hub 478 via a hub attach fitting 480.

FIG. 47 is a magnified view of the net-area-tension joint 140 between the blade 472 and the blade hub 478 via the hub attach fitting 480, with fasteners omitted for clarity. The net-area-tension joint 140 comprises a net-area-tension fastener pattern 142 extending circumferentially around the hub attach fitting 480 and into the blade skin panel 474. In the example shown, the net-area-tension fastener pattern 142 includes a first row 146 of fastener holes 144, and a last row 154 of fastener holes 144. As mentioned above, each of the rows is oriented generally perpendicular to the primary load direction 136. The first row 146 of fastener holes 144 have the smallest diameter, and the last row 154 of fastener holes 144 have a diameter that is larger than the diameter of the fastener holes 144 of the first row 146. The spacing ratio of the fastener holes 144 in the first row 146 are greater than the spacing ratio of the fastener holes 144 in the last row 154. In one example, the spacing ratio of the first row 146 may be no less than 5.

Although FIG. 47 shows the net-area-tension fastener pattern 142 having only two rows of fastener holes 144 extending circumferentially around the hub attach fitting 480, the net-area-tension fastener pattern 142 may include more than two rows of fastener holes 144. For example, the net-area-tension fastener pattern 142 may include one or more intermediate rows (not shown). Furthermore, even though the fastener holes 144 in the first row 146 are shown axially aligned with the fastener holes 144 in the last row 154, the net-area-tension fastener pattern 142 may be configured such that the fastener holes 144 in the last row 154 and/or any intermediate rows are axially non-aligned with the fastener holes 144 in the first row 146.

Referring to FIGS. 47-49, the load 134 exerted by the hub attach fitting 480 onto the blade skin panel 474 may be in opposition to centrifugal force (not shown) generated by the blade 472 during rotation, and which is directed away from the center of the blade hub 478 (i.e., the center of rotation). In this regard, the primary load direction 136 at the net-area-tension fastener pattern 142 is aligned with the blade axis 476. FIG. 48 is a sectional view showing fasteners 410 installed in the fastener holes 144 of the net-area-tension fastener pattern 142. In the example shown, the blade skin panel 474 and the hub attach fitting 480 each have a circular cross-sectional shape at the net-area-tension fastener pattern 142. However, the blade skin panel 474 and the hub attach fitting 480 may have alternative cross-sectional shapes. The load 134 (i.e., in opposition to centrifugal force of the blade 472) is assumed to be uniformly circumferentially distributed into the fasteners 410 coupling the blade skin panel 474 to the hub attach fitting 480. FIG. 49 shows the first row 146 of fastener holes 144 located upstream of the last row 154 of fastener holes 144 relative to the primary load direction 136.

Any one or more limitations associated with the above-described examples of net-area-tension fastener patterns 142 may be implemented in the net-area-tension joint 140 of FIG. 49. For example, in FIGS. 4 and 49, the fastener holes 144 in each row may be spaced apart from the fastener holes 144 of an immediately adjacent row by a row spacing 164 (e.g., FIG. 5) of at least two times the hole diameter 158 (e.g., FIG. 5) of the fastener holes 144 in the row having larger diameter fastener holes 144. Alternatively or additionally, the fastener holes 144 in the first row 146 may have a hole diameter 158 approximately equivalent to the skin thickness to 58 of the blade skin panel 474. Although not shown, each blade 472 may include a discrete doubler bonded to a side of the blade skin panel 474 opposite the mounting location of the hub attach fitting 480, and the net-area-tension fastener pattern 142 may extend through the doubler and the blade skin panel 474.

Referring to FIG. 50, shown is a method 500 of manufacturing an aircraft structure 104. Step 502 of the method includes forming a net-area-tension fastener pattern 142 in a skin panel 105 of an aircraft structure 104. The net-area-tension fastener pattern 142 is configured to receive fasteners 410 defining a net-area-tension joint 140 coupling a component attach fitting 132 of an aircraft component 130. Above-described examples of the aircraft structure 104 include a wing assembly 250 to which may be attached an aircraft component 130, such as a fuselage 106, a landing gear 220, an engine 230, or a store mounting mechanism 400. In some examples, the wing assembly 250 may be provided in a multi-piece configuration including a center wing structure 300 and a pair of outer wing structures 360 configured to be removably coupled to the center wing structure 300 as shown in FIGS. 33-36. The center wing structure 300 may include center wing upper and skin panels 328, 330 that are constant thickness, and which may be stiffened by a plurality of planks 340 as described above. In another example, the aircraft structure 104 may be a fuselage 106 to which may be attached an aircraft component 130 such as a vertical stabilizer 210, a horizontal stabilizer 200, and/or other aircraft components 130.

As described above, a net-area-tension fastener pattern 142 includes two or more generally parallel rows of fastener holes 144, including a first row 146 and a last row 154. Each row is oriented generally perpendicular to a primary load direction 136 of a load 134 that the aircraft component 130 is capable of exerting on the skin panel 105 via the net-area-tension joint 140. The first row 146 is located upstream of the last row 154 relative to the primary load direction 136. In each net-area-tension fastener pattern 142, each row has at least two fastener holes 144. The fastener holes 144 in each row may be of equal diameter or of slightly dissimilar diameters. In some examples, the fastener holes 144 in the first row 146 may be formed at a diameter that is approximately equivalent (e.g., within 30 percent) to the skin thickness 258 of the skin panel 105 at the location of the fastener holes 144. The diameter of the fastener holes 144 in the first row 146 and the last row 154 are respectively the smallest and largest in the net-area-tension fastener pattern 142. The fastener holes 144 in each row are spaced apart at a spacing ratio of hole spacing 156 to hole diameter 158. The spacing ratio of the first row 146 is greater than the spacing ratio of the last row 154.

In some examples, step 502 of forming the net-area-tension fastener pattern 142 may include forming one or more intermediate rows 148 of fastener holes 144 between the first row 146 and the last row 154. As shown in the above-described examples of FIGS. 5, 24, and 27, the diameter of the fastener holes 144 in each subsequent row incrementally increases along the primary load direction 136. For example, in FIGS. 5, 24, and 27, the diameter of the fastener holes 144 in the second row 150 are larger than the diameter of the fasteners 410 in the first row 146, and the fastener holes 144 in the third row 152 are larger than the diameter of the fastener holes 144 in the second row 150.

The spacing ratio of each subsequent row incrementally decreases along the primary load direction 136. For example, in FIGS. 5, 24 and 27, the spacing ratio of the fastener holes 144 in the second row 150 are larger than the spacing ratio of the fastener holes 144 in the first row 146, and the spacing ratio of the fastener holes 144 in the third row 152 are larger than the spacing ratio of fastener holes 144 in the second row 150. The fastener holes 144 in the first row 146 may have a spacing ratio of no less than 5 and, more preferably, between approximately 5-6. The spacing ratio of each of the one or more intermediate rows 148 may be greater than 3 and less than 5. For example, the spacing ratio of the intermediate row(s) 148 may be approximately 4 (i.e., within 30 percent). The spacing ratio of the last row 154 may be no less than 3 and, more preferably, the spacing ratio of the last row 154 is approximately 3 (i.e., within 30 percent).

In some examples, step 502 of forming the net-area-tension fastener pattern 142 may include spacing the rows apart at a row spacing 164 of at least two times the diameter of the fastener holes 144 in the row that has the larger diameter fastener holes 144. The row spacing 164 between adjacent rows may be measured from row centerline 162 to row centerline 162. In still further examples, the method may include staggering the fastener holes 144 in at least two rows relative to one another. For example, FIG. 21 shows an example of a net-area-tension fastener pattern 142 in which the first row 146 has three fastener holes 144 and the second row 150 has four fastener holes 144 that are staggered relative to the first row 146 of fastener holes 144. Although in FIGS. 5, 24 and 27, the fastener holes 144 in immediately-adjacent rows are shown aligned with each other, in other examples, the fastener holes 144 in immediately-adjacent rows may be offset or staggered relative to each other.

The method may optionally include coupling a discrete doubler 170 to a side of the skin panel 105 opposite the mounting location of the component attach fitting 132 at the net-area-tension fastener pattern 142. The method may include forming the net-area-tension fastener pattern 142 through at least a portion of the doubler 170. For example, each of FIGS. 4, 16, 20, 23, 26, 28 and 32 shows an entirety of the net-area-tension fastener pattern 142 extending through the doubler 170. The doubler 170 may assist the skin panel 105 in transferring the load 134 from the aircraft component 130 into the aircraft structure 104. In some examples, the doubler 170 may be mounted on the inner surface or inner mold line of the skin panel 105 in order to preserve the aerodynamic contour of the outer mold line of the skin panel 105. The doubler 170 may be bonded to the skin panel 105 by means of co-bonding. Alternatively, the doubler 170 may be secondary bonded to the skin panel 105 using an adhesive layer 412 (FIG. 29). As described above, the doubler 170 may be formed of composite plies 420, which may be primarily unidirectional plies, although the doubler 170 may include fabric plies. To improve the shear-load transfer capability between the doubler 170 and the skin panel 105, the doubler 170 and the skin panel 105 may each have a 0-degree ply at the respective interfacing surfaces of the doubler 170 and the skin panel 105. The fibers of each 0-degree ply may be oriented generally parallel to the primary load direction 136.

As described above, the doubler 170 may have a doubler thickness 172 (FIG. 4) that is no greater than a skin thickness 258 (FIG. 4) of the skin panel 105 at the location of the net-area-tension fastener pattern 142. The doubler thickness 172 is preferably less than the skin thickness 258 to ensure that the doubler stiffness is less than the skin thickness 258 to minimize peel stresses in the bondline (e.g., adhesive layer 412) between the doubler 170 and the skin panel 105. In some examples, the doubler 170 may have a doubler main portion 174 and a doubler tapered portion 176 extending from the doubler main portion 174 and located downstream of the doubler main portion 174 relative to the primary load direction 136. The doubler thickness 172 may taper or reduce within the doubler tapered portion 176. For example, a doubler main portion 174 having a thickness of 0.25 inch may taper to a thickness of less than 0.010 inch within the doubler tapered portion 176. By including a doubler tapered portion 176, peel stresses in the bondline may be reduced to prevent separation that may otherwise initiate at the perimeter edge of the doubler 170. The doubler 170 may optionally include a doubler reduced thickness portion 178 which may be of constant thickness and which may extend from the doubler tapered portion 176 to the perimeter edge of the doubler 170. The doubler reduced thickness portion 178 may provide additional distance over which peel stresses in the bondline may be reduced. The fastener holes 144 of the net-area-tension fastener pattern 142 may be confined to the doubler main portion 174, and may not be located in the doubler tapered portion 176 or the doubler reduced thickness portion 178.

Step 502 of forming the net-area-tension fastener pattern 142 may include forming the net-area-tension fastener pattern 142 in a manner such that the fastener holes 144 in the doubler 170 each have an edge distance 160 of at least one hole diameter 158. The edge distance 160 may be measured from the doubler 170 edge to the center of the hole nearest the doubler edge. Due to the difference in diameters of the fastener holes 144 in different rows of the net-area-tension fastener pattern 142, the fastener holes 144 in some rows (e.g., the first row 146) may have an edge distance 160 that is much greater than the diameter of the fastener holes 144 in that row.

Step 502 of forming the net-area-tension fastener pattern 142 may optionally include extending at least one row of fastener holes 144 through an internal structural member 180 located on a side of the skin panel 105 opposite the component attach fitting 132. For example, FIG. 4 shows two rows of the net-area-tension fastener pattern 142 extending through the lower spar flange 266 of the wing assembly rear spar 262. Mechanical fasteners 410 extending through the fastener holes 144 in the internal structural member 180 may assist in transferring load 134 from the aircraft component 130 to the aircraft structure 104. The method may additionally include coupling a backup fitting 182 to the skin panel 105 and the internal structural member 180. For example, as described above, FIG. 23 shows a backup fitting 182 coupled to the spar web 264 and the wing assembly skin panel 256 of the wing assembly 250. Although not coupled to the doubler 170, the backup fitting 182 may still assist in transferring load 134 from the engine rear attach fitting 240 (e.g., component attach fitting 132) into the wing assembly 250 (e.g., the aircraft structure 104). In some examples, the backup fitting 182 may configured as a bathtub fitting having three or more sides coupled to one or more structural elements of the wing assembly 250. For example, a backup fitting 182 of a wing assembly 250 may be coupled to the wing assembly skin panel 256, the spar web 264 of a spar, and the rib web 270 of a wing rib 268.

Figure 51:
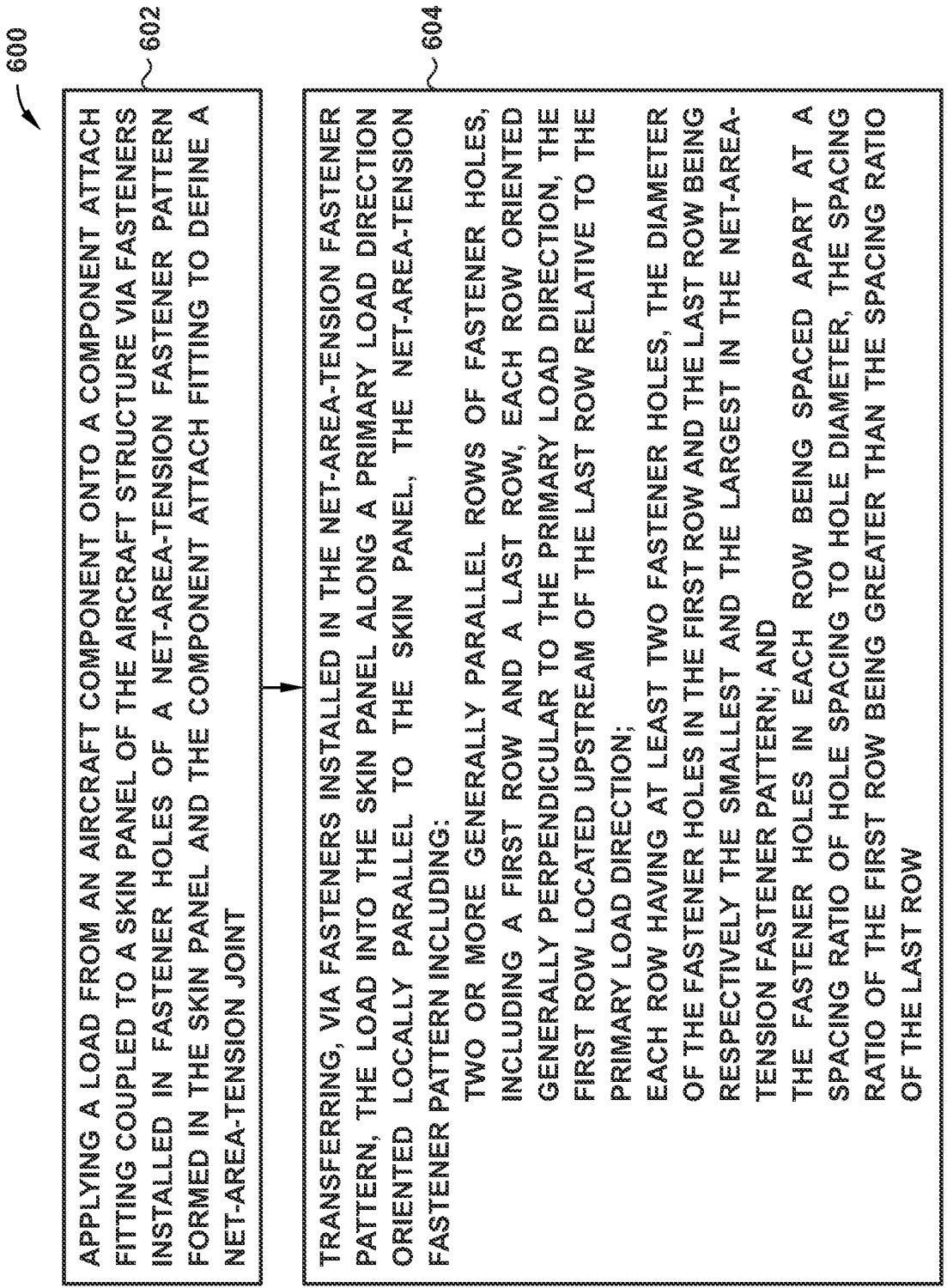
FIG. 51 is a flowchart of operations included in a method of transferring load into an aircraft structure.

Referring to FIG. 51, shown is a flowchart of operations included in a method 600 of transferring load 134 into an aircraft structure 104. The method 600 includes step 602 of applying a load 134 from an aircraft component 130 onto a skin panel 105 of the aircraft structure 104 having a net-area-tension fastener pattern 142 (described above) of fastener holes 144 formed in the skin panel 105 and a component attach fitting 132 of the aircraft component 130. For example, step 602 may include applying a load 134 from a fuselage 106, a landing gear 220, an engine 230, or a store mounting mechanism 400 onto a fuselage skin panel 110 of a fuselage 106 having the net-area-tension fastener pattern 142 formed in the fuselage skin panel 110 and respectively a fuselage attach fitting 112, a landing gear attach fitting 224, an engine 230 attach fitting, or a store attach fitting 402. In a further example, step 602 may include applying a load 134 from a horizontal stabilizer 200 or a vertical stabilizer 210 onto a fuselage skin panel 110 of a fuselage 106 having a net-area-tension fastener pattern 142 formed in the fuselage skin panel 110 and respectively a horizontal stabilizer attach fitting 204 or a vertical stabilizer attach fitting 216.

Step 604 of the method 600 includes transferring, via fasteners 410 installed in the net-area-tension fastener pattern 142, the load 134 into the skin panel 105 along a primary load direction 136 oriented locally parallel to the skin panel 105. In the example where the aircraft structure 104 is a wing assembly 250, step 604 may include transferring load 134 from the fuselage 106 into the wing assembly 250 along an aft direction oriented parallel to the aircraft longitudinal axis 102, as shown in FIG. 4. In another example, step 604 may include transferring load 134 from an engine 230 into the wing assembly 250 along a forward direction oriented parallel to the wing centerline 253. For examples where the aircraft structure 104 is a fuselage 106, step 604 may include transferring load 134 from a vertical stabilizer 210 into the fuselage 106 along a lateral direction oriented perpendicular to the aircraft longitudinal axis 102. In another example, step 604 may include transferring load 134 from a horizontal stabilizer 200 into the fuselage 106 along a vertical direction, or along a direction perpendicular to the longitudinal axis 102 of the aircraft 100.

The disclosure includes example embodiments in accordance with the following clauses:

Clause 1. An aircraft structure 104 of an aircraft 100, comprising:
  a skin panel 105;
  a net-area-tension fastener pattern 142 formed in the skin panel 105 and configured to receive fasteners 410 defining a net-area-tension joint 140 for coupling a component attach fitting 132 of an aircraft component 130 to the skin panel 105, the net-area-tension fastener pattern 142 including:
    two or more generally parallel rows of fastener holes 144, including a first row 146 and a last row 154, each row oriented generally perpendicular to a primary load direction 136 of a load 134 that the aircraft component 130 is capable of exerting on the skin panel 105 via the net-area-tension joint 140, the first row 146 located upstream of the last row 154 relative to the primary load direction 136;
    each row having at least two fastener holes 144, the diameter of the fastener holes 144 in the first row 146 and the last row 154 being respectively the smallest and the largest in the net-area-tension fastener pattern 142; and
    the fastener holes 144 in each row being spaced apart at a spacing ratio of hole spacing 156 to hole diameter 158, the spacing ratio of the first row 146 being greater than the spacing ratio of the last row 154.

Clause 2. The aircraft structure 104 of Clause 1, wherein:
  the net-area-tension fastener pattern 142 includes one or more intermediate rows 148 of fastener holes 144 located between the first row 146 and the last row 154.
  the diameter of the fastener holes 144 in each subsequent row incrementally increasing along the primary load direction 136; and
  the spacing ratio of each subsequent row incrementally decreasing along the primary load direction 136.

Clause 3. The aircraft structure 104 of Clause 1 or 2, wherein:
  the spacing ratio of the first row 146 is no less than 5.

Clause 4. The aircraft structure 104 of any of Clauses 1-3, wherein:
  the fastener holes 144 in each row are spaced apart from the fastener holes 144 of an immediately adjacent row by a row spacing 164 of at least two times the diameter of the fastener holes 144 in the row having larger diameter fastener holes 144.

Clause 5. The aircraft structure 104 of any of Clauses 1-4, wherein:
  the fastener holes 144 in the first row 146 have a diameter approximately equivalent to a skin thickness 258 of the skin panel 105.

Clause 6. The aircraft structure 104 of any of Clauses 1-5, further comprising:
  a discrete doubler 170 bonded to a side of the skin panel 105 opposite a mounting location of the component attach fitting 132; and
  the net-area-tension fastener pattern 142 extending through the doubler 170 and the skin panel 105.

Clause 7. The aircraft structure 104 of Clause 6, wherein:
  the doubler 170 has a doubler thickness 172 that is no greater than a skin thickness 258 of the skin panel 105 at a location of the net-area-tension fastener pattern 142.

Clause 8. The aircraft structure 104 of any of Clauses 1-7, further comprising:
  an internal structural member 180 located on a side of the skin panel 105 opposite the component attach fitting 132; and
  at least one row of fastener holes 144 in the net-area-tension fastener pattern 142 extending through the internal structural member 180.

Clause 9. The aircraft structure 104 of any of Clauses 1-8, wherein:
  the aircraft structure 104 is a wing assembly 250 having a wing assembly skin panel 256 and a wing centerline 253:
  the aircraft component 130 is one of the following:
    a fuselage 106, the component attach fitting 132 comprising at least one fuselage attach fitting 112 configured to be fastened to the wing assembly skin panel 256 at the net-area-tension fastener pattern 142, the primary load direction 136 at the net-area-tension fastener pattern 142 is oriented generally parallel to the wing centerline 253 and extending in an aft direction;
    a landing gear 220, the component attach fitting 132 comprising a landing gear attach fitting 224 configured to be fastened to the wing assembly skin panel 256 at the net-area-tension fastener pattern 142, the primary load direction 136 at the net-area-tension fastener pattern 142 is oriented generally parallel to the wing centerline 253 and extending in an aft direction;
    an engine 230, the component attach fitting 132 comprising at least one of an engine attach fitting 236, 240 configured to be fastened to the wing assembly skin panel 256 at the net-area-tension fastener pattern 142, the primary load direction 136 at the net-area-tension fastener pattern 142 is oriented generally parallel to the wing centerline 253 and extending in a forward direction;

a store mounting mechanism 400, the component attach fitting 132 comprising a store attach fitting 402 configured to be fastened to the wing assembly skin panel 256 at the net-area-tension fastener pattern 142, the primary load direction 136 at the net-area-tension fastener pattern 142 is oriented generally parallel to the wing centerline 253 and extending in an aft direction.

Clause 10. The aircraft structure 104 of Clause 9, wherein the wing assembly 250 comprises:

a center wing structure 300, including:

a pair of center wing outboard ends 314 and a pair of engine mounting locations 231 respectively on opposite sides of a wing centerline 253;

a center wing front spar 302 and a center wing rear spar 304 each having a spar terminal end 306 at each of the center wing outboard ends 314;

a center wing upper skin panel 328 and a center wing lower skin panel 330 each coupled to the center wing front spar 302 and the center wing rear spar 304, and each comprised of acreage plies 422 and having a panel thickness that is constant;

one or more planks 340 bonded to at least one of the center wing upper skin panel 328 and the center wing lower skin panel 330 and extending in a spanwise direction, each plank 340 comprised of a stack of plank plies 342 of narrower width than the acreage plies 422;

a pair of outer wing structures 360 respectively couplable to the pair of outboards ends, each outer wing structure 360 including:

an outer wing front spar 362 and an outer wing rear spar 364 configured to be coupled respectively to the center wing front spar 302 and the center wing rear spar 304 to define a wing joint 320 coupling the outer wing structure 360 to the center wing structure 300; and wherein the center wing structure 300 is configured such that the spar terminal ends 306 of the center wing front spar 302 and the center wing rear spar 304 at each wing joint 320 are located no further inboard than an engine centerline 232 associated with the engine mounting location 231, and no further outboard of the engine centerline 232 than ten percent of a distance between the engine centerline 232 and the wing centerline 253.

Clause 11. The aircraft structure 104 of any of Clauses 1-10, wherein:

the aircraft structure 104 is a fuselage 106 having a fuselage skin panel 110 and a longitudinal axis 102;

the aircraft component 130 is one of the following:

a horizontal stabilizer 200, the component attach fitting 132 comprising at least one horizontal stabilizer attach fitting 204 configured to be fastened to the fuselage skin panel 110, the primary load direction 136 at the net-area-tension fastener pattern 142 is generally vertically oriented; and a vertical stabilizer 210, the component attach fitting 132 comprising at least one vertical stabilizer attach fitting 216 configured to be fastened to the fuselage skin panel 110, the primary load direction 136 at the net-area-tension fastener pattern 142 is generally horizontally oriented and generally perpendicular to the longitudinal axis 102.

Clause 12. A structure 103, comprising:

a skin panel 105;

a net-area-tension fastener pattern 142 formed in the skin panel 105 and configured to receive fasteners 410 defining a net-area-tension joint 140 for coupling a component attach fitting 132 of a component 128 to the skin panel 105, the net-area-tension fastener pattern 142 including:

two or more generally parallel rows of fastener holes 144, including a first row 146 and a last row 154, each row oriented generally perpendicular to a primary load direction 136 of a load 134 that the component 128 is capable of exerting on the skin panel 105 via the net-area-tension joint 140, the first row 146 located upstream of the last row 154 relative to the primary load direction 136;

each row having at least two fastener holes 144, the diameter of the fastener holes 144 in the first row 146 and the last row 154 being respectively the smallest and the largest in the net-area-tension fastener pattern 142; and the fastener holes 144 in each row being spaced apart at a spacing ratio of hole spacing 156 to hole diameter 158, the spacing ratio of the first row 146 being greater than the spacing ratio of the last row 154.

Clause 13. The structure 103 of Clause 12, wherein:

the net-area-tension fastener pattern 142 includes one or more intermediate rows 148 of fastener holes 144 located between the first row 146 and the last row 154.

the diameter of the fastener holes 144 in each subsequent row incrementally increasing along the primary load direction 136; and the spacing ratio of each subsequent row incrementally decreasing along the primary load direction 136.

Clause 14. The structure 103 of Clause 12 or 13, wherein:

the structure 103 is a blade 472 of a wind turbine 470, the blade 472 having a blade skin panel 474 and a blade axis 476; and the component 128 is a blade hub 478, the component attach fitting 132 comprising a hub attach fitting 480 configured to be fastened to the blade skin panel 474, the primary load direction 136 at the net-area-tension fastener pattern 142 is aligned with the blade axis 476.

Clause 15. A method of manufacturing an aircraft structure 104 of an aircraft 100, comprising:

forming a net-area-tension fastener pattern 142 in a skin panel 105, the net-area-tension fastener pattern 142 configured to receive fasteners 410 defining a net-area-tension joint 140 coupling a component attach fitting 132 of an aircraft component 130 to the skin panel 105, the net-area-tension fastener pattern 142 including:

two or more generally parallel rows of fastener holes 144, including a first row 146 and a last row 154, each row oriented generally perpendicular to a primary load direction 136 of a load 134 that the aircraft component 130 is capable of exerting on the skin panel 105 via the net-area-tension joint 140, the first row 146 located upstream of the last row 154 relative to the primary load direction 136;

each row having at least two fastener holes 144, the diameter of the fastener holes 144 in the first row 146 and the last row 154 being respectively the smallest and the largest in the net-area-tension fastener pattern 142, the diameter of the fastener holes 144 in subsequent rows incrementally increasing in size along the primary load direction 136; and the fastener holes 144 in each of the rows being spaced apart at a spacing ratio of hole spacing 156 to hole diameter 158, the spacing ratio of the first row 146 being greater than the spacing ratio of the last row 154.

Clause 16. The method of Clause 15, wherein forming the net-area-tension fastener pattern 142 comprises:

forming the net-area-tension fastener pattern 142 to include one or more intermediate rows 148 of fastener holes 144 located between the first row 146 and the last row 154;

the diameter of the fastener holes 144 in each subsequent row incrementally increasing along the primary load direction 136; and the spacing ratio of each subsequent row incrementally decreasing along the primary load direction 136.

Clause 17. The method of Clause 15 or 16, wherein forming the net-area-tension fastener pattern 142 comprises:

forming the fastener holes 144 in the first row 146 at a spacing ratio of no less than 5.

Clause 18. The method of any of Clauses 15-17, wherein forming the net-area-tension fastener pattern 142 comprises:

spacing 350 the fastener holes 144 in each row apart from the fastener holes 144 of an immediately adjacent row by a row spacing 164 of at least two times the diameter of the fastener holes 144 in the row having larger diameter fastener holes 144.

Clause 19. The method of any of Clauses 15-18, wherein forming the net-area-tension fastener pattern 142 comprises:

forming the fastener holes 144 in the first row 146 with a diameter that is approximately equivalent to a skin thickness 258 of the skin panel 105 of the fastener holes 144 in the first row 146.

Clause 20. The method of any of Clauses 15-19, further comprising:

coupling a discrete doubler 170 to a side of the skin panel 105 opposite a mounting location of the component attach fitting 132; and extending the net-area-tension fastener pattern 142 through the doubler 170 and the skin panel 105.

Clause 21. The method of Clause 20, wherein:

the doubler 170 has a doubler thickness 172 that is no greater than a skin thickness 258 of the skin panel 105 at a location of the net-area-tension fastener pattern 142.

Clause 22. The method of any of Clauses 15-21, wherein forming the net-area-tension fastener pattern 142 comprises:

forming the net-area-tension fastener pattern 142 in a wing assembly skin panel 256 of a wing assembly 250 having a wing centerline 253:

the aircraft component 130 is one of the following:

a fuselage 106, the component attach fitting 132 comprising at least one fuselage attach fitting 112 configured to be fastened to the wing assembly skin panel 256 at the net-area-tension fastener pattern 142, the primary load direction 136 at the net-area-tension fastener pattern 142 is oriented generally parallel to the wing centerline 253 and extending in an aft direction;

a landing gear 220, the component attach fitting 132 comprising a landing gear attach fitting 224 configured to be fastened to the wing assembly skin panel 256 at the net-area-tension fastener pattern 142, the primary load direction 136 at the net-area-tension fastener pattern 142 being oriented generally parallel to the wing centerline 253 and extending in an aft direction;

an engine 230, the component attach fitting 132 comprising at least one of an engine attach fitting 236, 240 configured to be fastened to the wing assembly skin panel 256 at the net-area-tension fastener pattern 142, the primary load direction 136 at the net-area-tension fastener pattern 142 is oriented generally parallel to the wing centerline 253 and extending in a forward direction;

a store mounting mechanism 400, the component attach fitting 132 comprising a store attach fitting 402 configured to be fastened to the wing assembly skin panel 256 at the net-area-tension fastener pattern 142, the primary load direction 136 at the net-area-tension fastener pattern 142 is oriented generally parallel to the wing centerline 253 and extending in an aft direction.

Clause 23. The method of any of Clauses 15-22, wherein forming the net-area-tension fastener pattern 142 comprises:

forming the net-area-tension fastener pattern 142 in a fuselage skin panel 110 of a fuselage 106 having a longitudinal axis 102;

the aircraft component 130 is one of the following:

a horizontal stabilizer 200, the component attach fitting 132 comprising at least one horizontal stabilizer attach fitting 204 configured to be fastened to the fuselage skin panel 110 at the net-area-tension fastener pattern 142, the primary load direction 136 is generally vertically oriented;

a vertical stabilizer 210, the component attach fitting 132 comprising at least one vertical stabilizer attach fitting 216 configured to be fastened to the fuselage skin panel 110 at the net-area-tension fastener pattern 142, the primary load direction 136 is generally horizontally oriented and generally perpendicular to the longitudinal axis 102 in a lateral direction.

Clause 24. The method of any of Clauses 15-23, further comprising:

bonding one or more planks 340 to an inner surface of at least one of a center wing upper skin panel 328 and a center wing lower skin panel 330 of a center wing structure 300, each plank 340 extending in a spanwise direction and comprised of a stack of plank plies 342, each of the center wing upper skin panel 328 and the center wing lower skin panel 330 is comprised of acreage plies 422 having a panel thickness that is constant along a spanwise direction, the plank plies 342 having a narrower width than the acreage plies 422;

coupling the center wing upper skin panel 328 and the center wing lower skin panel 330 to a center wing front spar 302 and the center wing rear spar 304 of the center wing structure 300;

coupling an outer wing front spar 362 and an outer wing rear spar 364 of each of a pair of outer wing structures 360 respectively to the center wing front spar 302 and the center wing rear spar 304 of the center wing structure 300 to define a pair of wing joints 320 on opposing center wing outboard ends 314; and wherein the center wing structure 300 has an engine mounting location 231 on each of opposing sides of a wing centerline 253, and a spar terminal end 306 of the center wing front spar 302 and the center wing rear spar 304 at each wing joint 320 are located no further inboard than an engine centerline 232 associated with the engine mounting location 231, and no further outboard of the engine centerline 232 than ten percent of a distance between the engine centerline 232 and the wing centerline 253.

Clause 25. A method of transferring load 134 into an aircraft structure 104 of an aircraft 100, comprising:
applying a load 134 from an aircraft component 130 onto a skin panel 105 of the aircraft structure 104 having a net-area-tension fastener pattern 142 of fastener holes 144 formed in the skin panel 105 and a component attach fitting 132 of the aircraft component 130;
transferring, via fasteners 410 installed in the net-area-tension fastener pattern 142, the load 134 into the skin panel 105 along a primary load direction 136 oriented locally parallel to the skin panel 105, the net-area-tension fastener pattern 142 including:
two or more generally parallel rows of fastener holes 144, including a first row 146 and a last row 154, each row oriented generally perpendicular to the primary load direction 136, the first row 146 located upstream of the last row 154 relative to the primary load direction 136;
each row having at least two fastener holes 144, the diameter of the fastener holes 144 in the first row 146 and the last row 154 being respectively the smallest and the largest in the net-area-tension fastener pattern 142; and
the fastener holes 144 in each row being spaced apart at a spacing ratio of hole spacing 156 to hole diameter 158, the spacing ratio of the first row 146 being greater than the spacing ratio of the last row 154.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An aircraft structure, comprising:
a skin panel;
a net-area-tension fastener pattern formed in the skin panel and configured to receive fasteners defining a net-area-tension joint for coupling a component attach fitting of an aircraft component to the skin panel, the net-area-tension fastener pattern including:
three or more generally parallel rows of fastener holes, including a first row, a last row, and one or more intermediate rows of fastener holes located between the first row and the last row;
each row being oriented generally perpendicular to a shear load direction of a shear load that the aircraft component is capable of exerting on the skin panel via the net-area-tension joint;
the first row being located on a side of the net-area-tension fastener pattern upstream of the last row relative to the shear load direction;
each row having at least two fastener holes, the diameter of the fastener holes in the first row and the last row being respectively the smallest and the largest in the net-area-tension fastener pattern;
the diameter of the fastener holes in each subsequent row incrementally increasing along the shear load direction;
the fastener holes in each row being spaced apart at a spacing ratio of hole spacing to hole diameter, the spacing ratio of the first row being greater than the spacing ratio of the last row and
the spacing ratio of each subsequent row incrementally decreasing along the shear load direction.

2. The aircraft structure of claim 1, wherein:
the spacing ratio of the first row is no less than 5.

3. The aircraft structure of claim 1, wherein:
the fastener holes in each row are spaced apart from the fastener holes of an immediately adjacent row by a row spacing of at least two times the diameter of the fastener holes in the row having larger diameter fastener holes.

4. The aircraft structure of claim 1, wherein:
the fastener holes in the first row have a diameter approximately equivalent to a skin thickness of the skin panel of the fastener holes in the first row.

5. The aircraft structure of claim 1, further comprising:
a discrete doubler bonded to a side of the skin panel opposite a mounting location of the component attach fitting; and
the net-area-tension fastener pattern extending through the doubler and the skin panel.

6. The aircraft structure of claim 5, wherein:
the doubler has a doubler thickness that is no greater than a skin thickness of the skin panel at a location of the net-area-tension fastener pattern.

7. The aircraft structure of claim 1, further comprising:
an internal structural member located on a side of the skin panel opposite the component attach fitting; and
at least one row of fastener holes in the net-area-tension fastener pattern extending through the internal structural member.

8. The aircraft structure of claim 1, wherein:
the spacing ratio of the intermediate rows is greater than 3 and less than 5.

9. A structure, comprising:
a skin panel;
a component having a component attach fitting;
a net-area-tension fastener pattern formed in the skin panel and configured to receive fasteners defining a net-area-tension joint for coupling the component attach fitting to the skin panel, the net-area-tension fastener pattern including:
three or more generally parallel rows of fastener holes, including a first row, a last row, and one or more intermediate rows of fastener holes located between the first row and the last row;
each row being oriented generally perpendicular to a shear load direction of a shear load that the aircraft component is capable of exerting on the skin panel via the net-area-tension joint;
the first row being located on a side of the net-area-tension fastener pattern upstream of the last row relative to the shear load direction;
each row having at least two fastener holes, the diameter of the fastener holes in the first row and the last row being respectively the smallest and the largest in the net-area-tension fastener pattern;
the diameter of the fastener holes in each subsequent row incrementally increasing along the shear load direction;
the fastener holes in each row being spaced apart at a spacing ratio of hole spacing to hole diameter, the spacing ratio of the first row being greater than the spacing ratio of the last row; and
the spacing ratio of each subsequent row incrementally decreasing along the shear load direction.

10. The structure of claim 9, wherein:
the structure is a blade of a wind turbine, the blade having a blade skin panel and a blade axis; and
the component is a blade hub, the component attach fitting comprising a hub attach fitting configured to be fastened to the blade skin panel, the shear load direction at the net-area-tension fastener pattern is aligned with the blade axis.

11. The structure of claim 9, wherein:
the spacing ratio of the intermediate rows is greater than 3 and less than 5.

12. A method of manufacturing an aircraft structure of an aircraft, comprising:
forming a net-area-tension fastener pattern in a skin panel, the net-area-tension fastener pattern configured to receive fasteners defining a net-area-tension joint coupling a component attach fitting of an aircraft component to the skin panel, the net-area-tension fastener pattern including:
three or more generally parallel rows of fastener holes, including a first row, a last row, and one or more intermediate rows of fastener holes located between the first row and the last row;
each row being oriented generally perpendicular to a shear load direction of a shear load that the aircraft component is capable of exerting on the skin panel via the net-area-tension joint;
the first row being located on a side of the net-area-tension fastener pattern upstream of the last row relative to the shear load direction;
each row having at least two fastener holes, the diameter of the fastener holes in the first row and the last row being respectively the smallest and the largest in the net-area-tension fastener pattern;
the diameter of the fastener holes in each subsequent row incrementally increasing along the shear load direction;
the fastener holes in each row being spaced apart at a spacing ratio of hole spacing to hole diameter, the spacing ratio of the first row being greater than the spacing ratio of the last row; and
the spacing ratio of each subsequent row incrementally decreasing along the shear load direction.

13. The method of claim 12, wherein forming the net-area-tension fastener pattern comprises:
forming the fastener holes in the first row at a spacing ratio of no less than 5.

14. The method of claim 12, wherein forming the net-area-tension fastener pattern comprises:
spacing the fastener holes in each row apart from the fastener holes of an immediately adjacent row by a row spacing of at least two times the diameter of the fastener holes in the row having larger diameter fastener holes.

15. The method of claim 12, wherein forming the net-area-tension fastener pattern comprises:
forming the fastener holes in the first row with a diameter that is approximately equivalent to a skin thickness of the skin panel of the fastener holes in the first row.

16. The method of claim 12, further comprising:
coupling a discrete doubler to a side of the skin panel opposite a mounting location of the component attach fitting; and
extending the net-area-tension fastener pattern through the doubler and the skin panel.

17. The method of claim 16, wherein:
the doubler has a doubler thickness that is no greater than a skin thickness of the skin panel at a location of the net-area-tension fastener pattern.

18. The method of claim 12, wherein forming the net-area-tension fastener pattern comprises:
forming the net-area-tension fastener pattern in a wing assembly skin panel of a wing assembly having a wing centerline:
the aircraft component is one of the following:
a fuselage, the component attach fitting comprising at least one fuselage attach fitting, the net-area-tension fastener pattern configured to fasten the fuselage attach fitting to the wing assembly skin panel, the shear load direction at the net-area-tension fastener pattern is oriented generally parallel to the wing centerline and extending in an aft direction;
a landing gear, the component attach fitting comprising a landing gear trunnion, the net-area-tension fastener pattern configured to fasten the landing gear trunnion to the wing assembly skin panel, the shear load direction at the net-area-tension fastener pattern being oriented generally parallel to the wing centerline and extending in an aft direction;
an engine, the component attach fitting comprising at least one of an engine attach fitting, the net-area-tension fastener pattern configured to fasten the engine attach fitting to the wing assembly skin panel, the shear load direction at the net-area-tension fastener pattern is oriented generally parallel to the wing centerline and extending in a forward direction;
a store mounting mechanism, the component attach fitting comprising a store attach fitting, the net-area-tension fastener pattern configured to fasten the store attach fitting to the wing assembly skin panel, the shear load direction at the net-area-tension fastener pattern is oriented generally parallel to the wing centerline and extending in an aft direction.

19. The method of claim 12, wherein forming the net-area-tension fastener pattern comprises:
forming the net-area-tension fastener pattern in a fuselage skin panel of a fuselage having a longitudinal axis;
the aircraft component is one of the following:
a horizontal stabilizer, the component attach fitting comprising at least one horizontal stabilizer attach fitting, the net-area-tension fastener pattern configured to fasten the horizontal stabilizer attach fitting to the fuselage skin panel, the shear load direction is generally vertically oriented;
a vertical stabilizer, the component attach fitting comprising at least one vertical stabilizer attach fitting, the net-area-tension fastener pattern configured to fasten the vertical stabilizer attach fitting to the fuselage skin panel, the shear load direction is generally horizontally oriented and generally perpendicular to the longitudinal axis in a lateral direction.

20. The method of claim 12, wherein forming the net-area-tension fastener pattern comprises:
forming the fastener holes in the intermediate rows at a spacing ratio of greater than 3 and less than 5.

* * * * *